United States Patent
Takano et al.

(10) Patent No.: US 9,847,920 B2
(45) Date of Patent: Dec. 19, 2017

(54) COMMUNICATION CONTROL DEVICE, COMMUNICATION CONTROL METHOD, AND COMPUTER READABLE STORAGE MEDIUM FOR SPECIFYING AN UPPER LIMIT OF A NETWORK CONNECTION

(71) Applicant: FUJITSU LIMITED, Kawasaki-shi, Kanagawa (JP)

(72) Inventors: Yosuke Takano, Kawasaki (JP); Naoki Oguchi, Kawasaki (JP); Ryoichi Mutoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/435,486

(22) Filed: Feb. 17, 2017

(65) Prior Publication Data
US 2017/0244615 A1 Aug. 24, 2017

(30) Foreign Application Priority Data
Feb. 24, 2016 (JP) ................................. 2016-033092

(51) Int. Cl.
*H04L 12/26* (2006.01)
*H04L 12/825* (2013.01)
*H04L 12/863* (2013.01)

(52) U.S. Cl.
CPC .......... *H04L 43/04* (2013.01); *H04L 43/0829* (2013.01); *H04L 47/25* (2013.01); *H04L 47/54* (2013.01)

(58) Field of Classification Search
CPC ..... H04L 43/04; H04L 43/0829; H04L 47/25; H04L 47/54
See application file for complete search history.

(56) References Cited

U.S. PATENT DOCUMENTS 7,571,253 B2 * 8/2009 Lee .................... H04N 21/2343
370/493
2003/0031129 A1 * 2/2003 Dutkiewicz ......... H04L 12/5695
370/230
(Continued)

FOREIGN PATENT DOCUMENTS

JP 2008-278207 11/2008
JP 2012-175561 9/2012

OTHER PUBLICATIONS

Constantine Dovrolis, et al., "A measurement tool for the available bandwidth of network paths", [online] Internet Search Feb. 19, 2016, <http://www.cc.gatech.edu/-dovrolis/bw-est/pathload.html>, 2006, 1 pg.

*Primary Examiner* — Jenee Holland
(74) *Attorney, Agent, or Firm* — Oblon, McClelland, Maier & Neustadt, L.L.P.

(57) ABSTRACT

A communication control device including: a memory, and a processor coupled to the memory and the processor configured to: transmit packets from the communication control device to a network device at each of a plurality of transmission rates, acquire a plurality of index values respectively indicating amounts of packet loss at the plurality of transmission rates, specify, among the plurality of transmission rates, a first transmission rate on which a corresponding index value among the plurality of index values has a dependence, and specify an upper limit of a vacant band between the communication control device and the network device based on the first transmission rate.

11 Claims, 36 Drawing Sheets

(56) References Cited

U.S. PATENT DOCUMENTS

| | | | |
|---|---|---|---|
| 2006/0209872 A1* | 9/2006 | Matsui | H04M 1/2535 370/437 |
| 2006/0280205 A1* | 12/2006 | Cho | H04L 1/0009 370/473 |
| 2007/0008883 A1* | 1/2007 | Kobayashi | H04L 47/40 370/230 |
| 2007/0177500 A1* | 8/2007 | Chang | H04W 72/1226 370/229 |
| 2008/0031277 A1* | 2/2008 | Walter | H04L 41/12 370/469 |
| 2008/0065734 A1* | 3/2008 | Yu | H04L 12/587 709/206 |
| 2008/0192724 A1* | 8/2008 | Kondo | H04L 47/10 370/345 |
| 2009/0049327 A1* | 2/2009 | Chung | G06F 1/3203 713/600 |
| 2012/0213069 A1 | 8/2012 | Oguchi et al. | |
| 2013/0142243 A1* | 6/2013 | Minoda | H04N 21/2402 375/226 |
| 2015/0117186 A1* | 4/2015 | Uchida | H04W 28/20 370/230 |

\* cited by examiner

FIG. 1
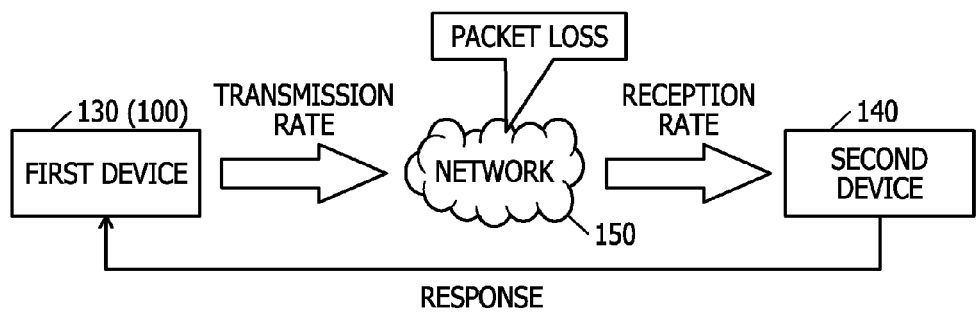
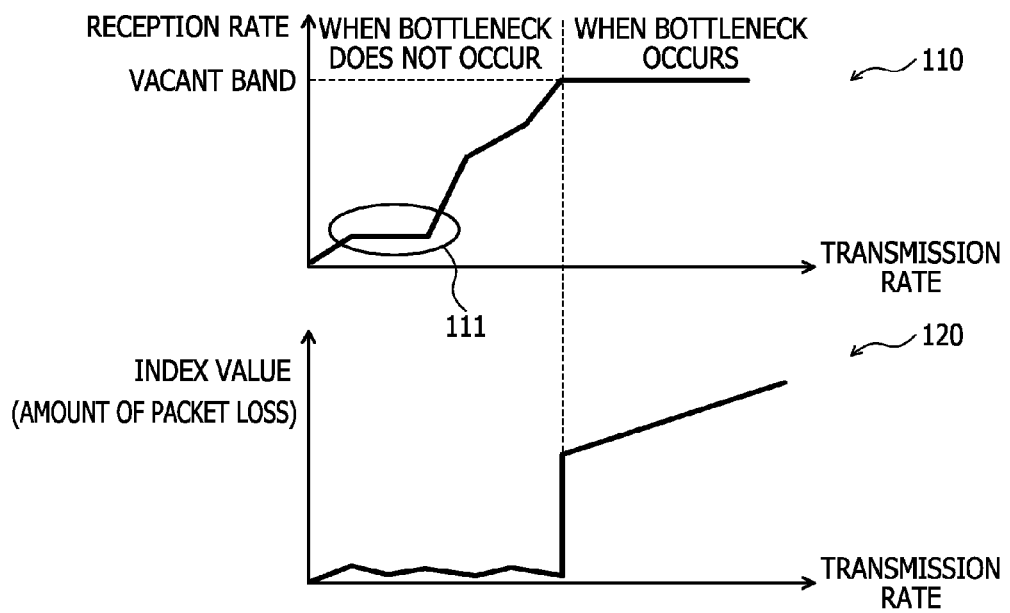

FIG. 5

| ITEM | LESS THAN UPPER LIMIT OF VACANT BAND | UPPER LIMIT OF VACANT BAND OR MORE |
| --- | --- | --- |
| TRANSMISSION RATE | $S_1 \sim S_{k-1}$ | $S_k \sim S_n$ |
| RECEPTION RATE | $P_1 \sim P_{k-1}$ | $P_k \sim P_n$ |
| PACKET LOSS RATE | $Per_1 \sim Per_{k-1}$ | $Per_k \sim Per_n$ |
| PROPORTION DETERMINATION | × | ○ |

FIG. 16

| ITEM | LESS THAN UPPER LIMIT OF VACANT BAND | UPPER LIMIT OF VACANT BAND OR MORE |
|---|---|---|
| TRANSMISSION RATE | $S_1 \sim S_{k-1}$ | $S_k \sim S_n$ |
| RECEPTION RATE | $P_1 \sim P_{k-1}$ | $P_k \sim P_n$ |
| PACKET LOSS RATE | $Per_1 \sim Per_{k-1}$ | $Per_k \sim Per_n$ |
| CORRELATION DETERMINATION | × | ○ |

|  | LESS THAN UPPER LIMIT OF VACANT BAND | UPPER LIMIT OF VACANT BAND OR MORE |
| --- | --- | --- |
| TRANSMISSION RATE | $S_1 \sim S_{k-1}$ | $S_k \sim S_n$ |
| RECEPTION RATE | $P_1 \sim P_{k-1}$ | $P_k \sim P_n$ |
| AVERAGE RTT | $t_1 \sim t_{k-1}$ | $t_1 \sim t_n$ |
| CORRELATION DETERMINATION | × | ○ |

COMMUNICATION CONTROL DEVICE, COMMUNICATION CONTROL METHOD, AND COMPUTER READABLE STORAGE MEDIUM FOR SPECIFYING AN UPPER LIMIT OF A NETWORK CONNECTION

CROSS-REFERENCE TO RELATED APPLICATION

This application is based upon and claims the benefit of priority of the prior Japanese Patent Application No. 2016-033092, filed on Feb. 24, 2016, the entire contents of which are incorporated herein by reference.

FIELD

The embodiments discussed herein are related to an vacant band specification program, an vacant band specification device, and an vacant band specification method.

BACKGROUND

In the related art, there is a technology for specifying an upper limit of an vacant band in a network that connects devices. For example, there is a binary search technology of path load for specifying an upper limit of an vacant band in a network based on comparison of a transmission rate with a reception rate in magnitude.

For example, as the related art, there is a technology for estimating an available bandwidth of a channel by transmitting a test stream to a reception node, receiving the returned test stream, measuring quality information such as the round-trip time or a packet loss rate, and applying the quality information to a NW analysis model.

An example of the related art includes Japanese Laid-open Patent Publication No. 2008-278207.

SUMMARY

According to an aspect of the invention, a communication control device includes a memory, and a processor coupled to the memory and the processor configured to: transmit packets from the communication control device to a network device at each of a plurality of transmission rates, acquire a plurality of index values respectively indicating amounts of packet loss at the plurality of transmission rates, specify, among the plurality of transmission rates, a first transmission rate on which a corresponding index value among the plurality of index values has a dependence, and specify an upper limit of a vacant band between the communication control device and the network device based on the first transmission rate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an explanatory diagram illustrating an example of an vacant band specification method according to an embodiment;

FIG. 5 is an explanatory diagram illustrating an example of the stored content of a management table according to Embodiment 1;

FIG. 16 is an explanatory diagram illustrating an example of the stored content of a management table according to Embodiment 2;

FIG. 26 is an explanatory diagram illustrating an example of the stored content of a management table according to Embodiment 3;

DESCRIPTION OF EMBODIMENTS

Figure 2:
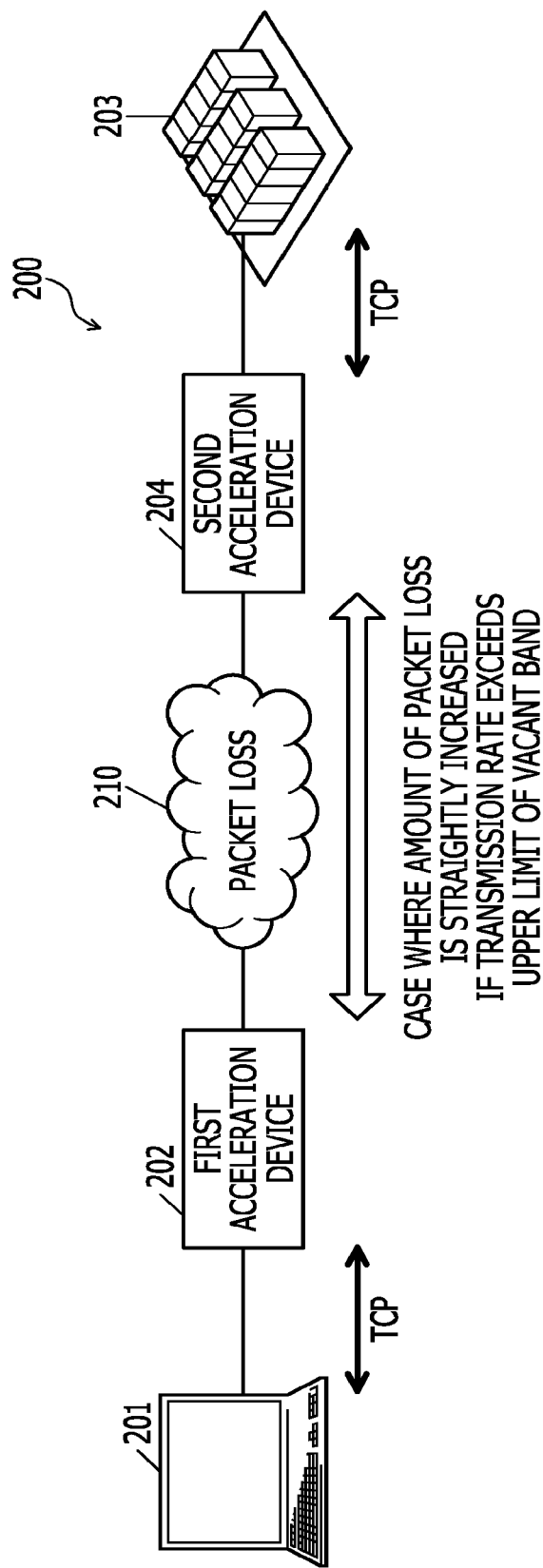
FIG. 2 is an explanatory diagram illustrating an example of a communication system according to Embodiment 1.

However, in the aforementioned related art, it is difficult to accurately specify the upper limit of the vacant band in some cases. For example, the reception rate may be decreased by the packet loss, a searching approach to the binary search based on the comparison of the transmission rate with the reception rate in magnitude may be wrong, and a value less than an actual upper limit may be specified as the upper limit of the vacant band.

One aspect of the disclosure is to provide an vacant band specification program, an vacant band specification device, and an vacant band specification method capable of accurately specifying an upper limit of an vacant band.

Hereinafter, embodiments of an vacant band specification program, an vacant band specification device, and an vacant band specification method will be described in detail with reference to the drawings.

Example of Vacant Band Specification Method According to Embodiment

FIG. 1 is an explanatory diagram illustrating an example of an vacant band specification method according to an embodiment. In FIG. 1, the vacant band specification device 100 is a computer that specifies an upper limit of an vacant band of a network 150 that connects the vacant band specification device and an opposing device.

Here, as illustrated in graphs 110 and 120, if a transmission rate when packets are transmitted in the network 150 increases, a reception rate also tends to increase until the transmission rate reaches the upper limit of the vacant band. Meanwhile, as illustrated in the graphs 110 and 120, after the transmission rate reaches the upper limit of the vacant band, packets are discarded as many as the transmission rate exceeds the upper limit of the vacant band, and the reception rate tends not to increase.

The transmission rate is a value indicating a data amount transmitted for a unit time. A unit of the transmission rate is, for example, bits per second (bps). The reception rate is a value indicating a data amount received for a unit time. A unit of the reception rate is, for example, bps.

Thus, for example, a case where an upper limit of an vacant band is searched for by acquiring a reception rate when packets are transmitted at a predetermined transmission rate and determining whether or not the upper limit of the vacant band is greater than the transmission rate through the comparison of the transmission rate with the reception rate in magnitude is considered.

Specifically, in a case where the transmission rate is greater than the reception rate, it is determined that the upper limit of the vacant band is less than the transmission rate. In a case where the transmission rate is equal to or less than the reception rate, it is determined that the upper limit of the vacant band is greater than the transmission rate.

However, in this case, it is difficult to specify the upper limit of the vacant band of the network 150 with accuracy. Specifically, if packet loss occurs in the network 150, the reception rate decreases, and thus, it is difficult to determine whether or not the upper limit of the vacant band is greater than a predetermined transmission rate in some cases. The pass loss means that the packet does not reach a destination.

In the example of the graph 110, an increase in the reception rate is suppressed by the packet loss in a range of reference sign 111, and it is difficult to determine whether or not the upper limit of the vacant band is greater than the transmission rate for the transmission rate included in the range of reference sign 111 in some cases.

More specifically, in the network 150 including a radio section, the packet loss may occur due to electromagnetic interference or phasing in the radio section, and thus, it is difficult to determine whether or not the upper limit of the vacant band is greater than a predetermined transmission rate in some cases. As a result, a value less than an actual maximum value is specified as the upper limit of the vacant band, and thus, it is difficult to more efficiently use the network 150.

Thus, in the present embodiment, an vacant band specification method capable of specifying the upper limit of the vacant band of the network 150 with accuracy even though the packet loss occurs and the reception rate becomes low will be described.

In the example of FIG. 1, a case where the vacant band specification device 100 specifies the upper limit of the vacant band of the network 150 that connects the first device 130 and a second device 140 as the opposing device of the first device 130 will be described.

Here, the vacant band specification device 100 may be the first device 130. An example in which the vacant band specification device 100 is the first device 130 may refer to Embodiment 1, Embodiment 2, or Embodiment 3 to be described below. The vacant band specification device 100 may be the second device 140. The vacant band specification device 100 may be a third device (not illustrated) different from the first device 130 or the second device 140.

Here, specifically, a case where the vacant band specification device 100 specifies the upper limit of the vacant band of the network 150 that connects the vacant band specification device and the second device 140 as the opposing device by using the example in which the vacant band specification device 100 is the first device 130 will be described.

(1-1) The vacant band specification device 100 causes the packets to be transmitted from the first device 130 to the second device 140 at a plurality of transmission rates. For example, the plurality of transmission rates is previously set to the vacant band specification device 100. Specifically, the plurality of transmission rates is transmission rates between the maximum transmission rate and the minimum transmission rate which are previously set to the vacant band specification device 100.

For example, the maximum transmission rate is the maximum value of the data amount capable of being transmitted by the vacant band specification device 100 for a unit time. For example, the minimum transmission rate is, for example, 0.1 mega bits per second (Mbps). For example, the vacant band specification device 100 transmits a plurality of packets to the second device 140 from the vacant band specification device 100 at the plurality of transmission rates.

(1-2) The vacant band specification device 100 acquires an index value indicating of the amount of packet loss at each transmission rate. The index value indicating the amount of packet loss is, for example, a packet loss rate indicating a percentage of packets which are not received by the second device 140 with respect to the transmitted packets. For example, the vacant band specification device 100 receives the packet loss rate when the packets are transmitted at the plurality of transmission rates from the second device 140. An example in which the vacant band specification device 100 uses the packet loss rate as the index value indicating the amount of packet loss may refer to Embodiment 1 or Embodiment 2 to be described below.

In a case where the network 150 includes the radio section, a device as one end of the radio section may retransmit the packets when the packet loss occurs in the radio section, and the second device 140 may be difficult to recognize the packet loss. Meanwhile, since the device as one end of the radio section retransmits the packets, a time taken for the packets transmitted from the first device 130 to be received by the second device 140 increases, and a time taken for the second device 140 to respond to the first device 130 tends to increase.

Thus, the index value indicating the amount of packet loss may be, for example, the round trip time (RTT). An example in which the vacant band specification device 100 uses the RTT as the index value indicating the amount of packet loss may refer to Embodiment 3 to be described below.

(1-3) The vacant band specification device 100 specifies the transmission rate, among the plurality of transmission rates, in a case where the transmission rate and the index value indicating the amount of packet loss have a dependence relation, based on the index value for each transmission rate. For example, the dependence relation is a proportional relation. An example in which the vacant band specification device 100 uses the proportional relation as the dependence relation may refer to Embodiment 1 to be described below.

The dependence relation may be, for example, a correlation. For example, in a case where a correlation coefficient between a transmission rate group and an index value group corresponding to the transmission rate group is equal to or greater than a threshold, the vacant band specification device 100 specifies the transmission rate of the transmission rate group as the transmission rates in a case where the transmission rate and the index value have the correlation. An example in which the vacant band specification device 100 uses the correlation as the dependence relation may refer to Embodiment 2 to be described below.

(1-4) The vacant band specification device 100 specifies the upper limit of the vacant band between the first device 130 and the second device 140 based on the specified result. Here, as illustrated in the graph 120, if the transmission rate increases, the packets tend to be randomly discarded until the transmission rate reaches the upper limit of the vacant band. In other words, the transmission rate and the index value indicating the amount of packet loss are difficult to have the dependence relation until the transmission rate reaches the upper limit of the vacant band. Thus, the vacant band specification device 100 may determine that the transmission rate other than the transmission rate in a case where the transmission rate and the index value have the specified dependence relation is equal to or less than the upper limit of the vacant band.

As illustrated in the graphs 110 and 120, if the transmission rate increases, the packets tends to be discarded as many as the transmission rate exceeds the upper limit of the vacant band after the transmission rate reaches the upper limit of the vacant band. In other words, in a case where the transmission rate exceeds the upper limit of the vacant band, the transmission rate and the index value indicating the amount of packet loss tend to have the dependence relation. Thus, the vacant band specification device 100 may determine that the transmission rates in a case where the transmission rate and the index value have the specified dependence relation is equal to or greater than the upper limit of the vacant band.

Based on these factors, for example, the vacant band specification device 100 specifies the minimum value of the transmission rates in a case where the transmission rate and the index value have the specified dependence relation, as the upper limit of the vacant band between the vacant band specification device and the second device 140 as the opposing device. For example, the vacant band specification device 100 may specify a value which is less than the transmission rate in a case where the transmission rate and the index value have the specified dependence relation and is greater than the transmission rate other than the transmission rate in a case where the transmission rate and the index value have the specified dependence relation, as the upper limit of the vacant band.

Accordingly, the vacant band specification device 100 can specify the upper limit of the vacant band of the network 150 even without referring to the reception rate. Therefore, the vacant band specification device 100 can improve accuracy in specifying the upper limit of the vacant band of the network 150 in which the packet loss easily occurs and the reception rate is easily disturbed. For example, the vacant band specification device 100 can keep a range of reference sign 111 of the graph 110 from being specified as the upper limit of the vacant band.

The vacant band specification device 100 may transmit, to the second device 140, the packets at a new transmission rate which is less than the transmission rate in a case where the transmission rate and the index value have the specified dependence relation and is greater than the transmission rate other than the transmission rate in a case where the transmission rate and the index value have the specified dependence relation. The vacant band specification device 100 may further improve accuracy in specifying the upper limit of the vacant band by acquiring the index value corresponding to the new transmission rate and specifying whether or not the new transmission rate is the transmission rate in a case where the transmission rate and the index value have the dependence relation.

Description of Embodiment 1

Hereinafter, Embodiment 1 will be described. In Embodiment 1, a case where the vacant band specification device 100 uses the proportional relation as the dependence relation between the transmission rate and the index value indicating the amount of packet loss will be described.

Example of Communication System 200 According to Embodiment 1

Hereinafter, an example of the communication system 200 according to Embodiment 1 to which the vacant band specification device 100 illustrated in FIG. 1 is applied will be described with reference to FIG. 2.

FIG. 2 is an explanatory diagram illustrating an example of the communication system 200 according to Embodiment 1. In FIG. 2, the communication system 200 includes a first calculation device 201, a first acceleration device 202, a second calculation device 203, and a second acceleration device 204.

In the communication system 200, the first acceleration device 202 and the second acceleration device 204 are connected via a wired or wireless network 210. The network 210 is, for example, a local area network (LAN), a wire area network (WAN), or the Internet.

The first calculation device 201 is connected to the first acceleration device 202. The first calculation device 201 is a computer which communicates with the first acceleration device 202 by a transmission control protocol (TCP) and transmits or receives packets to or from the second calculation device 203 via the first acceleration device 202.

The first acceleration device 202 is a computer that increases the transmission rate up to the upper limit of the vacant band of the network 210 by replacing the TCP with a high-speed communication protocol and utilizes the network 210 more efficiently. Thus, the first acceleration device 202 tends to be desired to specify the upper limit of the vacant band of the network 210. For example, the first acceleration device 202 corresponds to the first device 130 illustrated in FIG. 1.

The second calculation device 203 is a computer that is connected to the second acceleration device 204, communicates with the second acceleration device 204 by the TCP, and transmits or receives the packets to or from the first calculation device 201 via the second acceleration device 204.

The second acceleration device 204 is a computer that increases the transmission rate up to the upper limit of the vacant band of the network 210 by replacing the TCP with a high-speed communication protocol and utilizes the network 210 more efficiently. Thus, the second acceleration device 204 tends to be desired to specify the upper limit of the vacant band of the network 210. For example, the second acceleration device 204 corresponds to the second device 140 illustrated in FIG. 1.

In the following description, a case where the first acceleration device 202 operates as the vacant band specification device 100 and specifies the upper limit of the vacant band of the network 210 will be described. The second acceleration device 204 may also operate as the vacant band specification device 100.

(Hardware Configuration Example of First Acceleration Device 202)

Hereinafter, a hardware configuration example of the first acceleration device 202 included in the communication system 200 illustrated in FIG. 2 will be described with reference to FIG. 3.

Figure 3:
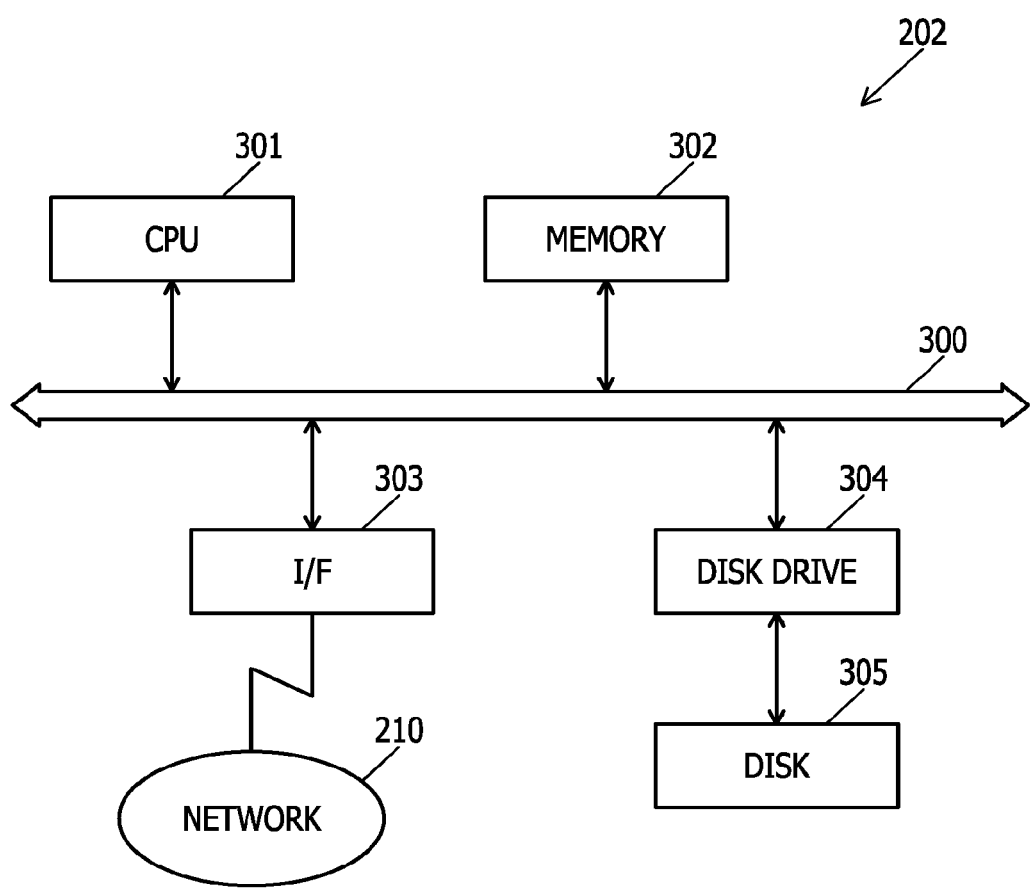
FIG. 3 is a block diagram illustrating a hardware configuration example of a first acceleration device.

FIG. 3 is a block diagram illustrating the hardware configuration example of the first acceleration device 202. In FIG. 3, the first acceleration device 202 includes a central processing unit (CPU) 301, a memory 302, an interface (I/F) 303, a disk drive 304, and a disk 305. The respective elements are connected via a bus 300.

Here, the CPU 301 controls the entire first acceleration device 202. For example, the memory 302 includes a read-only memory (ROM), a random-access memory (RAM), and a flash ROM. Specifically, the flash ROM or the ROM stores various programs, and the RAM is used as a work area of the CPU 301. The program stored in the memory 302 is loaded to the CPU 301, and causes the CPU 301 to perform a process on which coding is already performed.

The I/F 303 is connected to the network 210 through a communication channel, and is connected to another computer (for example, the second acceleration device 204 illustrated in FIG. 2) via the network 210. The I/F 303 controls input and output of data from another computer through the network 210 and an internal interface. The I/F 303 is, for example, a network interface card (NIC), or a LAN card.

The disk drive 304 controls reading or writing of data in the disk 305 under the control of the CPU 301. The disk drive 304 is, for example, a magnetic disk drive. The disk 305 is a non-volatile memory that stores data written under the control of the disk drive 304. The disk 305 is, for example, a magnetic disk or an optical disk.

The first acceleration device 202 may include, for example, a solid state drive (SSD), a semiconductor memory, a keyboard, a mouse, and a display in addition to the above-mentioned elements. The first acceleration device 202 may include the SSD and the semiconductor memory instead of the disk drive 304 and the disk 305.

(Hardware Configuration Example of Second Acceleration Device 204)

For example, the hardware configuration example of the second acceleration device 204 included in the communication system 200 illustrated in FIG. 2 is the same as the hardware configuration example of the first acceleration device 202 illustrated in FIG. 3, and thus, the description thereof will be omitted.

(Hardware Configuration Example of First Calculation Device 201 or Second Calculation Device 203)

For example, the hardware configuration example of the first calculation device 201 or the second calculation device 203 included in the communication system 200 illustrated in FIG. 2 is the same as the hardware configuration example of the first acceleration device 202 illustrated in FIG. 3, and thus, the description thereof will be omitted.

(Functional Configuration Example of Vacant Band Specification Device 100)

Hereinafter, a functional configuration example of the vacant band specification device 100 according to Embodiment 1 will be described with reference to FIG. 4.

Figure 4:
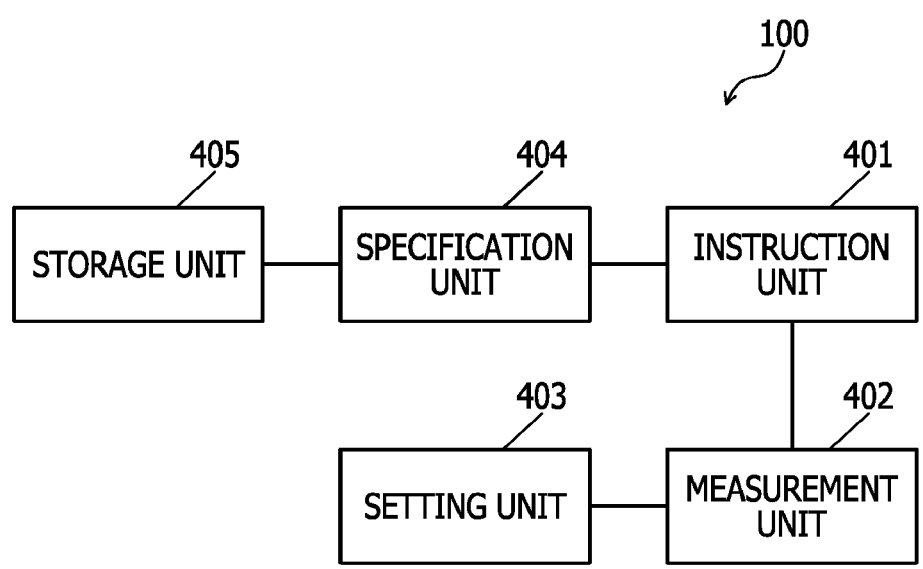
FIG. 4 is a block diagram illustrating a functional configuration example of the vacant band specification device.

FIG. 4 is a block diagram illustrating a functional configuration example of the vacant band specification device 100. The vacant band specification device 100 includes an instruction unit 401, a measurement unit 402, a setting unit 403, a specification unit 404, and a storage unit 405. For example, the instruction unit 401 to the storage unit 405 are functions of a control unit, and the functions thereof are realized by causing the CPU 301 to execute the programs stored in a storage device such as the memory 302 or the disk 305 illustrated in FIG. 3 or by the I/F 303. The processing results of the respective functional units are stored in, for example, a storage area of the memory 302 or the disk 305.

The instruction unit 401 notifies the measurement unit 402 of a measurement request for measurement of the index value indicating the amount of packet loss. For example, in a case where the communication between the first device 130 and the second device 140 is time out and the communication between the first device 130 and the second device 140 is not performed, the instruction unit 401 notifies the measurement unit 402 of the measurement request. The first device 130 and the second device 140 are the device as one end of the network 210 and the device as the other end thereof which are targets for specifying the upper limit of the vacant band. For example, the second device 140 has at least any one of a function of measuring the reception rate, a function of measuring the packet loss rate, and a function of responding that the packets are received.

Any one of the first device 130 and the second device 140 may be the vacant band specification device 100. The first device 130 is, for example, the first acceleration device 202 illustrated in FIG. 2. The second device 140 is, for example, the second acceleration device 204 illustrated in FIG. 2. Accordingly, the instruction unit 401 can generate a trigger for starting the measurement of the measurement unit 402. The vacant band specification device 100 may not include the instruction unit 401, and the function of the instruction unit 401 may be included in the measurement unit 402 or the specification unit 404.

The measurement unit 402 transmits the packets from the first device 130 to the second device 140 at the plurality of transmission rates. The plurality of transmission rates is the transmission rates calculated by dividing the transmission rate into sections from preset maximum transmission rate $S_n$ to minimum transmission rate $S_1$. For example, the measurement unit 402 transmits the packets from the first device 130 to the second device 140 at the plurality of transmission rates $S_1$ to $S_n$ under the control of the setting unit 403.

Specifically, if the vacant band specification device 100 is the first acceleration device 202, the measurement unit 402 transmits test packets from the vacant band specification device to the second acceleration device 204 at the plurality of transmission rates $S_1$ to $S_n$. The test packets are, for example, a plurality of packets. The test packet is, for example, a packet prepared by the vacant band specification device 100 in order to specify the upper limit of the vacant band. For example, the test packet may be a packet transmitted from the first calculation device 201 to the second calculation device 203 during an operation of the first calculation device 201. Accordingly, the measurement unit 402 can check whether or not the amount of packet loss occurring in the network 210 by sending the packets to the network 210.

Specifically, if the vacant band specification device 100 is the second acceleration device 204, the measurement unit 402 transmits a transmission request for the test packets at the plurality of transmission rates $S_1$ to $S_n$, to the first acceleration device 202. Accordingly, the measurement unit 402 can transmit the test packets from the first acceleration device 202 to the vacant band specification device. Accordingly, the measurement unit 402 can check whether or not the amount of packet loss occurring in the network 210 by sending the packets to the network 210.

Specifically, if the vacant band specification device 100 is a management device, the measurement unit 402 transmits a transmission request for the test packets at the plurality of transmission rates $S_1$ to $S_n$ to the second acceleration device 204, to the first acceleration device 202. The management device is a device that is neither the first device 130 nor the second device 140, and is, for example, a device that is neither the first acceleration device 202 nor the second acceleration device 204. Accordingly, the measurement unit 402 can transmit the test packets to the second acceleration device 204 from the first acceleration device 202. Accordingly, the measurement unit 402 can check whether or not the amount of packet loss occurring in the network 210 by sending the packets to the network 210.

For example, the measurement unit 402 may acquire a reception rate corresponding to the transmission rate when the packets are transmitted whenever the packets are transmitted. The measurement unit 402 transmits the packets to the second device 140 from the first device 130 while gradually increasing the transmission rate from the minimum transmission rate by a predetermined amount until at least a ratio of an increase in the reception rate to an increase in the transmission rate is equal to or less than a predetermined value.

More specifically, the measurement unit 402 transmits the test packets while gradually increasing the transmission rate from the minimum transmission rate by the predetermined amount. In this case, the measurement unit 402 determines whether or not the ratio of the increase in the reception rate to the increase in the transmission rate is equal to or less the predetermined value. The predetermined value is, for example, a value when the increase in the reception rate with respect to the increase in the transmission rate halves. The measurement unit 402 transmits the test packets a predetermined number of times after the ratio of the increase in the reception rate to the increase in the transmission rate is equal to or less than the predetermined value, and then stops transmitting the test packets. Accordingly, the measurement unit 402 may change the transmit rate until the transmission rate reaches the maximum transmission rate and may not transmit the packets, and thus, it is possible to reduce the number of times the packets are transmitted.

For example, the measurement unit 402 may acquire a reception rate corresponding to the transmission rate when the packets are transmitted whenever the packets are transmitted. The measurement unit 402 transmits the packets from the first device 130 to the second device 140 while gradually decreasing the transmission rate from the maximum transmission rate by a predetermined amount until at least a ratio of a decrease in the reception rate to a decrease in the transmission rate is equal to or greater than a predetermined value.

More specifically, the measurement unit 402 transmits the test packets while gradually decreasing the transmission rate from the maximum transmission rate by the predetermined amount. In this case, the measurement unit determines whether or not the ratio of the decrease in the reception rate to the decrease in the transmission rate is equal to or greater than the predetermined value. The predetermined value is, for example, a value when the decrease in the reception rate with respect to the decrease in the transmission rate halves. The measurement unit 402 transmits the test packets a predetermined number of times after the ratio of the decrease in the reception rate to the decrease in the transmission rate is equal to or greater than the predetermined value, and then stops transmitting the test packets. Accordingly, the measurement unit 402 may change the transmit rate until the transmission rate reaches the maximum transmission rate and may not transmit the packets, and thus, it is possible to reduce the number of times the packets are transmitted.

The setting unit 403 receives the transmission rate used when the measurement unit 402 transmits the packets, and controls the transmission rate used when the measurement unit 402 transmits the packets. Accordingly, the setting unit 403 can cause the measurement unit 402 to transmit the packets at the plurality of transmission rates. The vacant band specification device 100 may not include the setting unit 403, and the function of the setting unit 403 may be included in the measurement unit 402.

The measurement unit 402 acquires the index value indicating the amount of packet loss for each transmission rate. The index value is, for example, a value indicating a percentage of packets which are not received by the second device 140 with respect to the packets transmitted from the first device 130 to the second device 140. The index value is, for example, a packet loss rate.

Specifically, if the vacant band specification device 100 is the first acceleration device 202, the measurement unit 402 receives the packet loss rates corresponding to the plurality of transmission rates $S_1$ to $S_n$ from the second acceleration device 204. Accordingly, the measurement unit 402 can ascertain the amount of packet loss occurring in the network 210.

Specifically, if the vacant band specification device 100 is the second acceleration device 204, the measurement unit 402 measures the packet loss rates corresponding to the plurality of transmission rates $S_1$ to $S_n$ in response to the reception of the test packets at the plurality of transmission rates $S_1$ to $S_n$. Accordingly, the measurement unit 402 can ascertain the amount of packet loss occurring in the network 210.

Specifically, if the vacant band specification device 100 is the management device, the measurement unit 402 receives the packet loss rates corresponding to the plurality of transmission rates $S_1$ to $S_n$ from the second acceleration device 204. Accordingly, the measurement unit 402 can ascertain the amount of packet loss occurring in the network 210.

For example, the index value may be a value indicating a time from when the packets are transmitted from the first device 130 to when a response from the second device 140 in response to the packets transmitted from the first device 130 is received. The index value is, for example, the RTT.

Specifically, if the vacant band specification device 100 is the first acceleration device 202, the measurement unit 402 receives a response from the second acceleration device 204 which receives the test packets at the plurality of transmission rates $S_1$ to $S_n$. The measurement unit 402 measures the RTTs corresponding to the plurality of transmission rates $S_1$ to $S_n$ based on the response from the second acceleration device 204. Accordingly, the measurement unit 402 can ascertain the amount of packet loss occurring in the network 210.

Specifically, if the vacant band specification device 100 is the second acceleration device 204, the measurement unit 402 transmits a response to the first acceleration device 202 in response to the reception of the test packets at the plurality of transmission rates $S_1$ to $S_n$. The measurement unit 402 receives the RTTs corresponding to the plurality of transmission rates $S_1$ to $S_n$ which are measured by the first acceleration device 202 from the first acceleration device 202. Accordingly, the measurement unit 402 can ascertain the amount of packet loss occurring in the network 210.

Specifically, if the vacant band specification device 100 is the management device, the measurement unit 402 receives the RTTs corresponding to the plurality of transmission rates $S_1$ to $S_n$ from the first acceleration device 202. Accordingly, the measurement unit 402 can ascertain the amount of packet loss occurring in the network 210.

The specification unit 404 specifies the transmission rate, among the plurality of transmission rates, in a case where the transmission rate and the index value indicating the amount of packet loss have the dependence relation, based on the index value for each transmission rate. The transmission rates in a case where the transmission rate and the index value have the dependence relation is a transmission rate of the plurality of transmission rates $S_1$ to $S_n$, which is included in a range in which the index value indicating the amount of packet loss monotonously increases depending on the increase in the transmission rate.

For example, the specification unit 404 calculates slopes of the packet loss rates of the transmission rates including the minimum transmission rate $S_1$ to the predetermined transmission rate $S_n$ (n=2, 3, . . . , and n) among the plurality of transmission rates $S_1$ to $S_n$. Subsequently, the specification unit 404 specifies any combination of adjacent transmission rates $S_{k-1}$ and $S_k$ of which the slopes are comparatively greatly changed. Specifically, the specification unit 404 specifies the combination of the transmission rate $S_{k-1}$ and the transmission rate $S_k$ of which an absolute value of a difference between the slopes is equal to or greater than a threshold e.

The specification unit 404 specifies a range of the specified transmission rate $S_k$ to the maximum transmission rate $S_n$, as a range of transmission rates $S_{max}$ to $S_n$ in a case where the transmission rate and the index value have the proportional relation. $S_{max}$ means a maximum value of the values which may become the upper limit of the vacant band. The specification unit 404 specifies a range of the minimum transmission rate $S_1$ to the specified transmission rate $S_{k-1}$, as a range of transmission rates $S_1$ to $S_{min}$ in a case where the transmission rate and the index value do not have the correlation. $S_{min}$ means a minimum value of the values which may become the upper limit of the vacant band. Accordingly, the specification unit 404 can specify a range of $S_{min}$ to $S_{max}$ of the values which may become the upper limit of the vacant band.

the transmission rates in a case where the transmission rate and the index value have the dependence relation may be a transmission rate of the plurality of transmission rates $S_1$ to $S_n$, which is included in the range in which the correlation coefficient between the transmission rate and the index value indicating the amount of packet loss has a comparatively greatly fixed value. The specification unit 404 calculates the correlation coefficients of the minimum transmission rate $S_1$ to the predetermined transmission rate $S_n$ (n=2, 3, . . . , and n) among the plurality of transmission rates $S_1$ to $S_n$. Subsequently, the specification unit 404 specifies any combination of adjacent transmission rates $S_{k-1}$ and $S_k$ of which the correlation coefficients are comparatively greatly changed.

Specifically, the specification unit 404 specifies the combination of the transmission rate $S_{k-1}$ and the transmission rate $S_k$ of which an absolute value of a difference between the correlation coefficients is equal to or greater than a threshold e. Specifically, the specification unit 404 may specify the combination of the transmission rate $S_{k-1}$ and the transmission rate $S_k$ of which the correlation coefficient corresponding to the transmission rate $S_k$ is equal to or greater than a threshold R and the absolute value of the difference between the correlation coefficients is equal to or greater than the threshold e.

The specification unit 404 specifies the specified range of the transmission rate $S_k$ to the maximum transmission rate $S_n$, as a range of transmission rates $S_{max}$ to $S_n$ in a case where the transmission rate and the index value have the correlation. The specification unit 404 specifies a range of the minimum transmission rate $S_1$ to the transmission rate $S_{k-1}$, as a range of transmission rates $S_1$ to $S_{min}$ in a case where the transmission rate and the index value do not have the correlation. Accordingly, the specification unit 404 can specify a range of $S_{min}$ to $S_{max}$ of the values which may become the upper limit of the vacant band.

For example, the specification unit 404 may specify the transmission rates in a case where the transmission rate and the index value have the dependence relation based on the index value, among the index values for the respective transmission rates, in a case where the ratio of the increase in the reception rate to the increase in the transmission rate is equal to or less than the predetermined value. For example, the specification unit 404 calculates a difference between reception rates of the adjacent transmission rates $S_{k-1}$ and $S_k$ among the plurality of transmission rates $S_1$ to $S_n$ in sequence from the minimum transmission rate $S_1$. The specification unit 404 specifies the transmission rates in a case where the transmission rate and the index value have the dependence relation based on the index values corresponding to the transmission rates between the minimum transmission rate $S_1$ and the transmission rate $S_{k+a}$ after "a" number of transmission rates from the transmission rate $S_k$ when the difference between the reception rates is equal to or less than a predetermined value. Accordingly, the specification unit 404 can reduce a processing amount by reducing the number of index values used for calculating the correlation coefficient.

The specification unit 404 specifies the transmission rate, among the plurality of transmission rates, in a case where the transmission rate and the index value indicating the amount of packet loss have the dependence relation based on other index values acquired by removing components having a predetermined frequency or more from the index values for the respective transmission rates. For example, the specification unit 404 calculates signals acquired by reducing components having a predetermined frequency or more by inputting signals acquired by arranging the index values for the respective transmission rates in a sequence of time to a low-pass filter. The low-pass filter may be realized by hardware, or may be realized by software.

The specification unit 404 uses the detected signals as the index values for the respective transmission rates. Accordingly, the specification unit 404 can change the index value to an index value of which the fluctuation is suppressed in a case where the index value indicating the amount of packet loss is fluctuated due to a factor randomly occurring in the network 210. For example, the randomly occurred factor is communication of another device that uses the network 210.

The specification unit 404 specifies the upper limit of the vacant band between the first device 130 and the second device 140 based on the specified result. For example, in a case where the range of the transmission rates $S_{max}$ to $S_n$ in a case where the transmission rate and the index value have the correlation, the specification unit 404 specifies the transmission rate $S_{max}$ as the upper limit of the vacant band. For example, the specification unit 404 may specify a center value $(S_{min} S_{max})/2$ of the range of $S_{min}$ to $S_{max}$ of the values which may become the upper limit of the vacant band, as the upper limit of the vacant band. Accordingly, the specification unit 404 may accurately specify the upper limit of the vacant band for the network 210 in which the packet loss easily occurs and which is difficult to ascertain a change in the reception rate depending on a change in the transmission rate with accuracy.

The storage unit 405 stores the result specified by the specification unit 404. For example, the storage unit 405 stores the result specified by the specification unit 404 in a management table to be described below in FIG. 5. Accordingly, the storage unit 405 can cause the result specified by the specification unit 404 to be referred to. The vacant band specification device 100 may not include the storage unit 405, and the function of the storage unit 405 may be included in the specification unit 404.

The measurement unit 402 may transmit the packets from the first device 130 to the second device 140 at another transmission rate which is less than the transmission rate in a case where the transmission rate and the index value have the dependence relation and is greater than the transmission rate in a case where the transmission rate and the index value do not have the dependence relation.

For example, the measurement unit 402 transmits the packets from the first device 130 to the second device 140 at the transmission rate $S_a$ which is less than the transmission rate $S_{max}$ in a case where the transmission rate and the index value have the dependence relation and is greater than the transmission rate $S_{min}$ in a case where the transmission rate and the index value do not have the dependence relation. Accordingly, the measurement unit 402 can transmit the test packets in order to acquire the index value used when the range of $S_{min}$ to $S_{max}$ of the values which may become the upper limit of the vacant band is further narrowed.

The measurement unit 402 may acquire the index value indicating the amount of packet loss at another transmission rate. For example, the measurement unit 402 acquires the packet loss rate at the transmission rate $S_a$. For example, the measurement unit 402 may not acquire the RTT at the transmission rate $S_a$. Accordingly, the measurement unit 402 can acquire the index value used when the range of $S_{min}$ to $S_{max}$ of the values which may become the upper limit of the vacant band is further narrowed.

The specification unit 404 may specify whether or not another transmission rate is the transmission rate in a case where the transmission rate and the index value have the dependence relation based on the index value at another transmission rate. The specification unit 404 may determine whether or not the transmission rate $S_a$ is the transmission rate in a case where the transmission rate and the index value have the dependence relation and the transmission rate as $S_{max}$. Accordingly, the measurement unit 402 can further narrow the range of $S_{min}$ to $S_{max}$ of the values which may become the upper limit of the vacant band.

The specification unit 404 specifies the upper limit of the vacant band between the first device 130 and the second device 140 based on the range of $S_{min}$ to $S_{max}$ of the values with which the upper limit of the narrowed vacant band can be acquired. For example, the specification unit 404 specifies a center value $(S_{min} S_{max})/2$ of the range of $S_{min}$ to $S_{max}$ of the values which may become the upper limit of the vacant band. Accordingly, the specification unit 404 can specify the upper limit of the vacant band with more accuracy.

(Flow for Specifying Upper Limit of Vacant Band of Network 210)

Hereinafter, a flow for specifying the upper limit of the vacant band of the network 210 according to Embodiment 1 will be described with reference to FIGS. 5 to 10.

FIG. 5 is an explanatory diagram illustrating an example of the stored content of a management table 500 according to Embodiment 1. For example, the management table 500 is realized by the storage area such as the memory 302 or the disk 305 illustrated in FIG. 3. As illustrated in FIG. 5, the management table 500 includes fields such as the transmission rate, the reception rate, the packet loss rate, and proportion determination.

The proportion determination is a flag indicating whether or not the transmission rate, the reception rate, and the packet loss rate associated with the proportion determination are information in a case where the transmission rate and the packet loss rate have the proportional relation. For example, the proportion determination is "o" in a case where the transmission rate and the packet loss rate have the proportional relation, and is "x" in a case where the transmission rate and the packet loss rate do not have the proportional relation. The transmission rate is a transmission rate range in a case where the proportional relation is expressed by the proportion determination. The reception rate is a reception rate range in a case where the proportional relation is expressed by the proportion determination. The packet loss rate is a packet loss rate range in a case where the proportional relation is expressed by the proportion determination.

The management table 500 may classify the transmission rates into a range of the transmission rates in a case where the transmission rate and the packet loss rate have the proportional relation and a range of the transmission rates in a case where the transmission rate and the packet loss rate do not have the proportional relation, and may manage the classified transmission rate ranges. In other words, the management table 500 may classify the transmission rates into a range of the transmission rates which are equal to or greater than the upper limit of the vacant band and a range of the transmission rates which are less than the upper limit of the vacant band, and may manage the classified transmission rate ranges.

Figure 6:
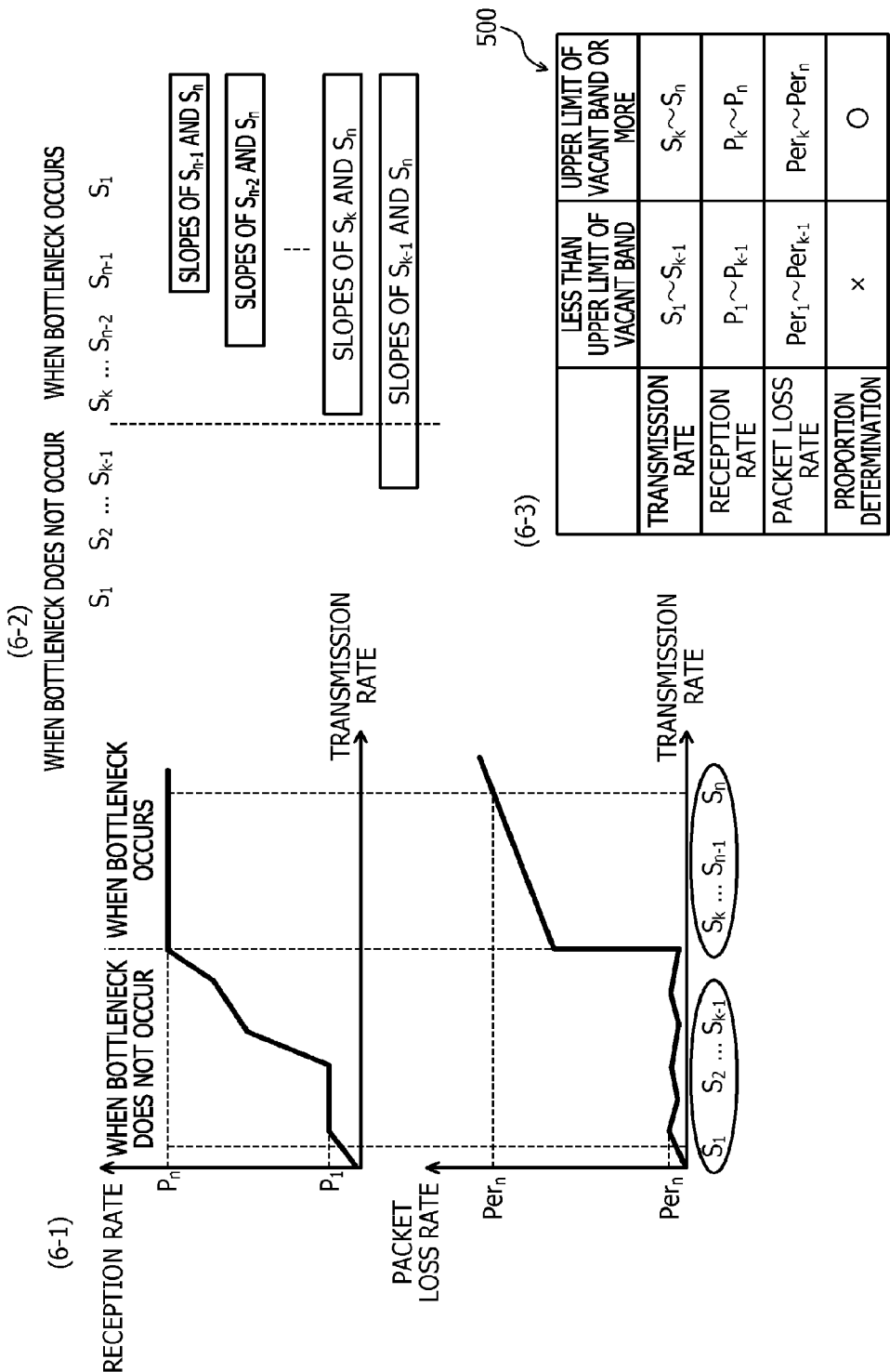
FIG. 6 is an explanatory diagram illustrating an example in which the upper limit of the vacant band according to Embodiment 1 is specified.

FIG. 6 is an explanatory diagram illustrating an example in which the upper limit of the vacant band according to Embodiment 1 is specified. In FIG. 6, (6-1) the first acceleration device 202 acquires the preset maximum transmission rate $S_n$ and minimum transmission rate $S_1$. Subsequently, the first acceleration device 202 divides the transmission rates between the maximum transmission rate $S_n$ and the minimum transmission rate $S_1$, and calculates n number of transmission rates $S_1$ to $S_n$.

As illustrated in FIG. 6, an example in which the transmission rates $S_1$ to $S_{k-1}$ of n number of transmission rates $S_1$ to $S_n$ are equal to or less than the vacant band and the transmission rates $S_k$ to $S_n$ thereof are equal to or greater than the vacant band will be described. In the following description, the first acceleration device 202 may classify n number of transmission rates $S_1$ to $S_n$ into the transmission rates $S_1$ to $S_{k-1}$ which are equal to or less than the vacant band and the transmission rates $S_k$ to $S_n$ which are equal to or greater than the vacant band.

Here, the first acceleration device 202 transmits the measurement request of the reception rate and the packet loss rate to the second acceleration device 204. The first acceleration device 202 transmits the test packets to the second acceleration device 204 at n number of calculated transmission rates $S_1$ to $S_n$ after the measurement request is transmitted. The test packets are, for example, a plurality of packets.

Meanwhile, the second acceleration device 204 measures reception rates $P_1$ to $P_n$ and packet loss rates $Per_1$ to $Per_n$ which correspond to the transmission rates $S_1$ to $S_n$, and transmits the measured values to the first acceleration device 202. The first acceleration device 202 receives the reception rates $P_1$ to $P_n$ and the packet loss rates $Per_1$ to $Per_n$ which correspond to the transmission rates $S_1$ to $S_n$.

(6-2) The first acceleration device 202 specifies the transmission rate of the transmission rates $S_1$ to $S_n$, in a case where the transmission rate and the packet loss rate have the proportion relation based on the received packet loss rate $Per_1$ to $Per_n$. In other words, the first acceleration device 202 specifies the transmission rates in a case where the transmission rate and the packet loss rate do not have the proportion relation. Here, FIG. 7 will be described.

Figure 7:
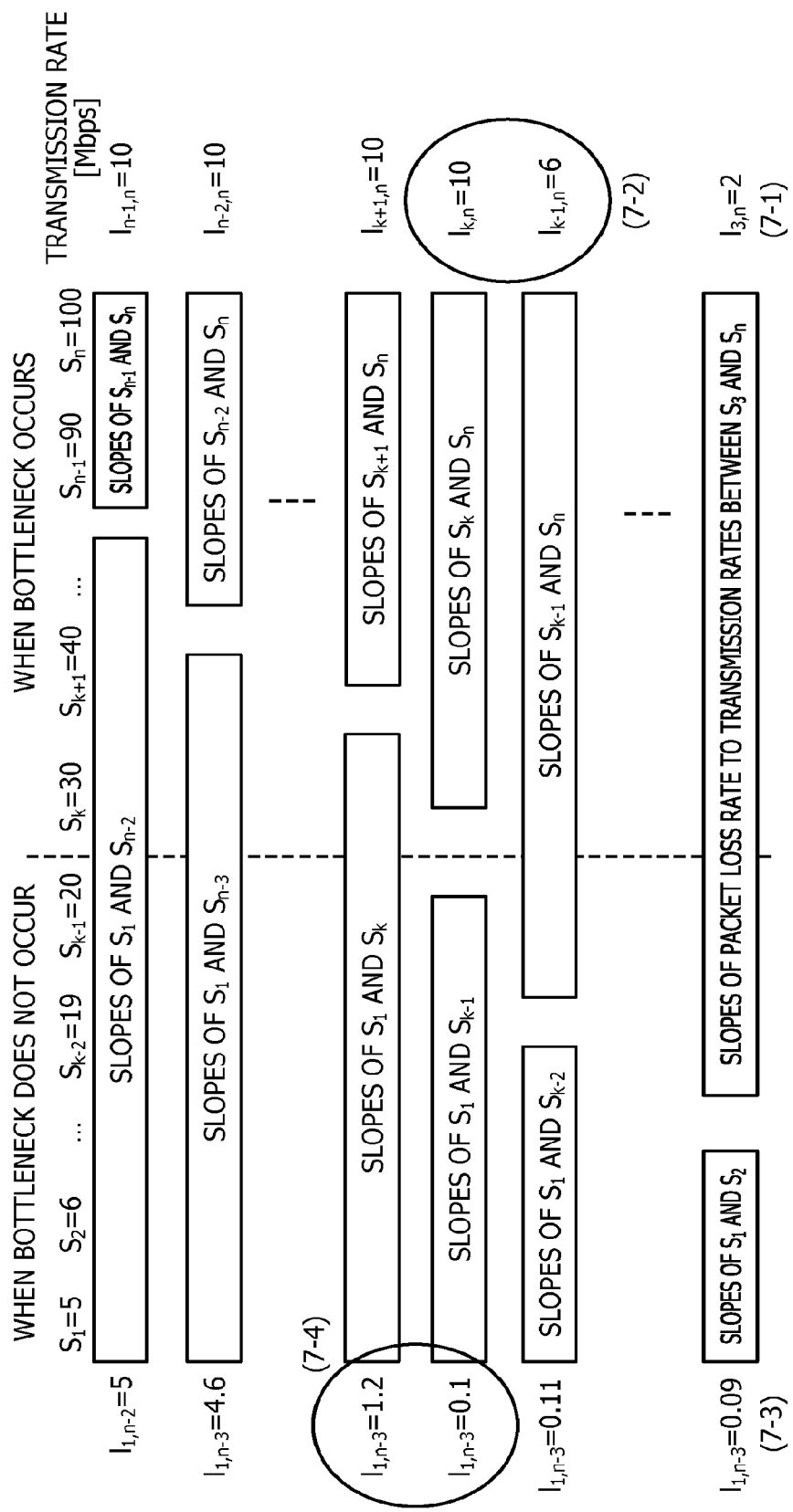
FIG. 7 is an explanatory diagram illustrating an example in which the transmission rate in a case where the transmission rate and the packet loss rate have the proportion relation is specified.

FIG. 7 is an explanatory diagram illustrating an example in which the transmission rate in a case where the transmission rate and the packet loss rate have the proportion relation is specified. In FIG. 7, (7-1) the first acceleration device 202 substitutes the transmission rate $S_n$, the transmission rate $S_x$, the packet loss rate $Per_n$, and the packet loss rate $Per_k$ in the following expression (1) while sequentially changing a variable x to n−1, n−2, . . . , and 1. Accordingly, the first acceleration device 202 calculates the slope $I_{x,n}$ of the packet loss rate between the transmission rate $S_n$ and the transmission rate $S_x$ for each of x=n−1, n−2, . . . , and 1.

$$I_{x,n} = \frac{Per_n - Per_x}{S_n - S_x} \quad (1)$$

Here, when the variable x is sequentially changed to n−1, n−2, . . . , and 1, since the transmission rate in which the transmission rate and the packet loss rate have the proportional relation is within a section "upper limit of vacant band to $S_n$" for a period during which the transmission rate $S_x$ is equal to or greater than the upper limit of the vacant band, the slop $I_{x,n}$ tends to have a fixed value. When the transmission rate $S_x$ is less than the upper limit of the vacant band, the slope $I_{x,n}$ tends to be comparatively greatly changed.

(7-2) Thus, the first acceleration device 202 specifies the transmission rates $S_k$ to $S_n$ until the slope $I_{x,n}$ has a fixed value and the slope $I_{x,n}$ is changed, as the transmission rates in a case where the transmission rate and the packet loss rate have the proportional relation, based on the slope $I_{x,n}$. Meanwhile, the first acceleration device 202 specifies the remaining transmission rates $S_1$ to $S_{k-1}$, as the transmission rates in a case where the transmission rate and the packet loss rate have the proportional relation.

For example, the first acceleration device 202 calculates a difference between the slope $I_{x,n}$ and a slope $I_{x-1,n}$, and determines whether or not the difference is equal to or greater than the threshold e. The threshold e is, for example, 20. The first acceleration device 202 specifies the transmission rate $S_x$ to the maximum transmission rate $S_n$ corresponding to the slope $I_{x,n}$ when the difference is equal to or greater than the threshold e, as the transmission rates in a case where the transmission rate and the packet loss rate have the proportional relation. The first acceleration device 202 specifies the minimum transmission rate $S_1$ to the transmission rate $S_{x-1}$ corresponding to the slope $I_{x-1,n}$ when the difference is equal to or greater than the threshold e, as the transmission rates in a case where the transmission rate and the packet loss rate do not have the proportional relation.

(7-3) The first acceleration device 202 may substitute the transmission rate $S_x$, the transmission rate $S_1$, the packet loss rate $Per_k$, and the packet loss rate $Per_1$ in the following expression (2) while sequentially changing the variable x to 2, 3, . . . , and n. Accordingly, the first acceleration device 202 calculates a slope $I_{1,x}$ between the transmission rates $S_x$ and $S_1$ for each x=2, 3, . . . , and n.

$$I_{1,x} = \frac{Per_x - Per_1}{S_x - S_1} \quad (2)$$

Here, when the variable x is sequentially changed to 2, 3, . . . , and n, since the transmission rate in which the transmission rate and the packet loss rate do not have the proportional relation is within a section of "$S_1$ to upper limit of vacant band" for a period during which the transmission rate $S_x$ is less than the upper limit of the vacant band, the slope $I_{1,x}$ tends to have a fixed value. When the transmission rate $S_x$ is greater than the upper limit of the vacant band, the slope $I_{1,x}$ tends to be comparatively greatly changed.

(7-4) Thus, the first acceleration device 202 specifies the transmission rates $S_1$ to $S_{k-1}$ until the slope $I_{1,x}$ has a fixed value and the slope $I_{1,x}$ is changed, based on the slope $I_{1,x}$. The first acceleration device 202 sets the specified transmission rates $S_1$ to $S_{k-1}$ as the transmission rates in a case where the transmission rate and the packet loss rate do not have the proportional relation. Meanwhile, the first acceleration device 202 specifies the remaining transmission rates $S_k$ to $S_n$ as the transmission rates in a case where the transmission rate and the packet loss rate have the proportional relation.

For example, the first acceleration device 202 calculates a difference between the slope $I_{1,x}$ and the slope $I_{1,x-1}$, and determines whether or not the difference is equal to or greater than the threshold e. The first acceleration device 202 specifies the transmission rate $S_x$ to the maximum transmission rate $S_n$ corresponding to the slope $I_{1,x}$ when the difference is equal to or greater than the threshold e, as the transmission rates in a case where the transmission rate and the packet loss rate have the proportional relation. The first acceleration device 202 specifies the minimum transmission rate $S_1$ to the transmission rate $S_{x-1}$ corresponding to the slope $I_{1,x-1}$ when the difference is equal to or greater than the threshold e, as the transmission rates in a case where the transmission rate and the packet loss rate do not have the proportional relation.

Although it has been described in this example that the first acceleration device 202 specifies the transmission rate in which the transmission rate and the packet loss rate have the proportional relation by using Expression (1) or Expression (2), the disclosure is not limited thereto. For example, in a case where the transmission rates in a case where the transmission rate and the packet loss rate have the proportional relation is not able to be specified by using Expression (1), the first acceleration device 202 may use Expression (2).

For example, the first acceleration device 202 may specify the transmission rates in a case where the transmission rate and the packet loss rate have the proportional relation by using Expression (1), and may specify the transmission rates in a case where the transmission rate and the packet loss rate have the proportional relation by using Expression (2). The first acceleration device 202 may improve the accuracy in specifying the transmission rates in a case where the transmission rate and the packet loss rate have the proportional relation based on the specified transmission rate in a case where the transmission rate and the packet loss rate have the proportional relation. Here, FIG. 8 will be described.

Figure 8:
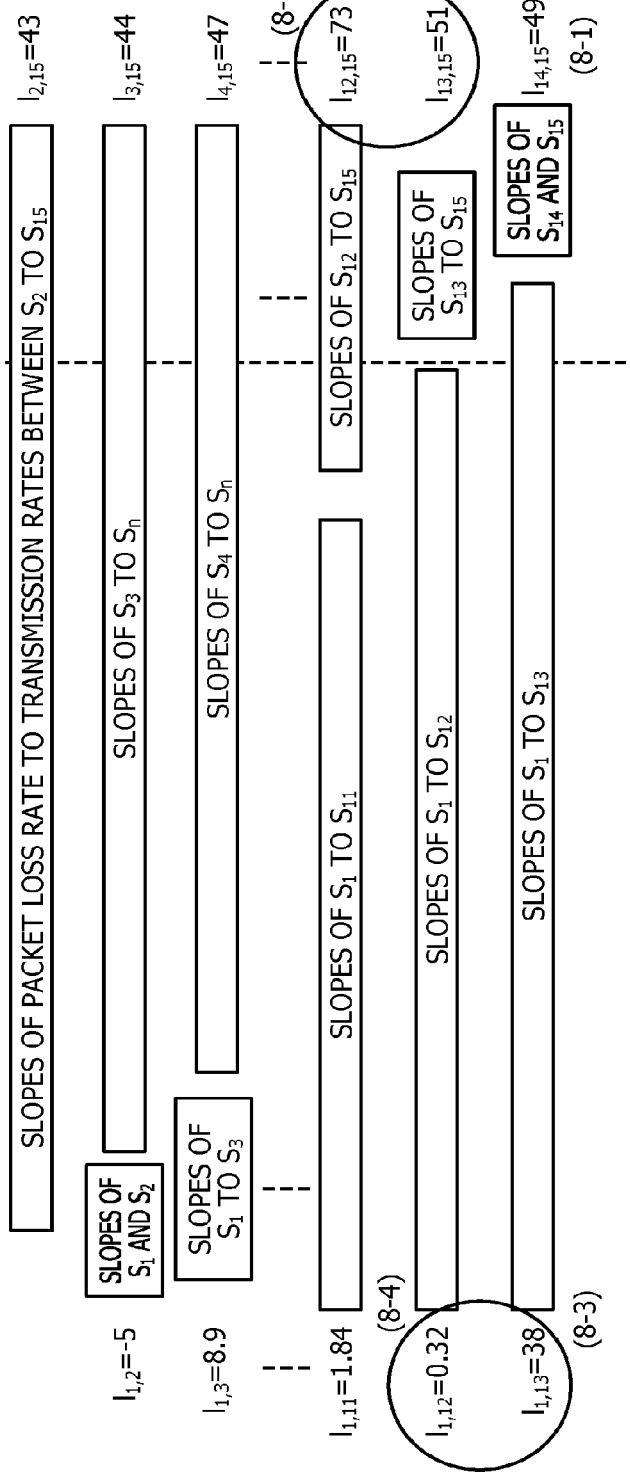
FIG. 8 is an explanatory diagram illustrating another example in which the transmission rate in a case where the transmission rate and the packet loss rate have the proportion relation is specified.

FIG. 8 is an explanatory diagram illustrating another example in which the transmission rate in a case where the transmission rate and the packet loss rate have the proportional relation is specified. A table illustrated in FIG. 8 is a measurement result using the test packets, and data of the transmission rates and the packet loss rates at measurement points of time defined by the respective item number are stored.

In FIG. 8, (8-1) the first acceleration device 202 uses Expression (3) instead of Expression (1). The first acceleration device 202 substitutes the transmission rate $S_n$, the transmission rate $S_k$, the packet loss rate $Per_n$, and the packet loss rate $Per_k$ in the following expression (3) while sequentially changing the variable x to n–1, n–2, . . . , and 1. Accordingly, the first acceleration device 202 calculates the slope $I_{x,n}$ between the transmission rate $S_n$ and the transmission rate $S_k$ for each of x=n–1, n–2, . . . , and 1.

$$I_{x,n} = \frac{Per_n - Per_x}{\log_{10} S_n - \log_{10} S_x} \quad (3)$$

(8-2) Thus, the first acceleration device 202 specifies the transmission rates $S_k$ to $S_n$ until the slope $I_{x,n}$ has a fixed value and the slope $I_{x,n}$ is changed, as the transmission rates in a case where the transmission rate and the packet loss rate have the proportional relation, based on the slope $I_{x,n}$. Meanwhile, the first acceleration device 202 specifies the remaining transmission rates $S_1$ to $S_{k-1}$, as the transmission rates in a case where the transmission rate and the packet loss rate have the proportional relation.

For example, the first acceleration device 202 calculates a difference between the slope $I_{x,n}$ and the slope $I_{x-1,n}$, and determines whether or not the difference is equal to or greater than the threshold e. The first acceleration device 202 specifies the transmission rate $S_x$ to the maximum transmission rate $S_n$ corresponding to the slope $I_{x,n}$ when the difference is equal to or greater than the threshold e, as the transmission rates in a case where the transmission rate and the packet loss rate have the proportional relation. The first acceleration device 202 specifies the minimum transmission rate $S_1$ to the transmission rate $S_{x-1}$ corresponding to the slope $I_{x-1,n}$ when the difference is equal to or greater than the threshold e, as the transmission rates in a case where the transmission rate and the packet loss rate do not have the proportional relation.

(8-3) The first acceleration device 202 uses Expression (4) instead of Expression (2). The first acceleration device 202 may substitute the transmission rate $S_x$, the transmission rate $S_1$, the packet loss rate $Per_k$, and the packet loss rate $Per_1$ in the following expression (4) while sequentially changing the variable x to 2, 3, . . . , and n. Accordingly, the first acceleration device 202 calculates the slope $I_{1,x}$ between the transmission rate $S_x$ and the transmission rate $S_1$ for each of x=2, 3, . . . , and n.

$$I_{1,x} = \frac{Per_x - Per_1}{\log_{10} S_x - \log_{10} S_1} \quad (4)$$

(8-4) The first acceleration device 202 specifies the transmission rates $S_1$ to $S_{k-1}$ until the slope $I_{1,x}$ has a fixed value and the slope $I_{1,x}$ is changed, as the transmission rates in a case where the transmission rate and the packet loss rate do have the proportion relation, based on the slope $I_{1,x}$. Meanwhile, the first acceleration device 202 specifies the remaining transmission rates $S_k$ to $S_n$ as the transmission rates in a case where the transmission rate and the packet loss rate have the proportional relation.

For example, the first acceleration device 202 calculates a difference between the slope $I_{1,x}$ and the slope $I_{1,x-1}$, and determines whether or not the difference is equal to or greater than the threshold e. The first acceleration device 202 specifies the transmission rate $S_x$ to the maximum transmission rate $S_n$ corresponding to the slope $I_{1,x}$ when the difference is equal to or greater than the threshold e, as the transmission rates in a case where the transmission rate and the packet loss rate have the proportional relation. The first acceleration device 202 specifies the minimum transmission rate $S_1$ to the transmission rate $S_{x-1}$ corresponding to the slope $I_{1,x-1}$ when the difference is equal to or greater than the threshold e, as the transmission rates in a case where the transmission rate and the packet loss rate do not have the proportional relation. Now, the description is referred back to FIG. 6.

In FIG. 6, (6-3) the first acceleration device 202 stores the specified result in the management table 500. For example, the first acceleration device 202 sets the transmission rates $S_k$ to $S_n$ in a case where the transmission rate and the packet loss rate have the specified proportional relation in the fields of the transmission rates corresponding to the proportion determination "o".

For example, the first acceleration device 202 sets the reception rates $P_k$ to $P_n$ corresponding to the transmission rates $S_k$ to $S_n$ in a case where the transmission rate and the packet loss rate have the specified proportional relation in the fields of the reception rates corresponding to the proportion determination "o". For example, the first acceleration device 202 sets the packet loss rates $Per_k$ to $Per_n$ corresponding to the transmission rates $S_k$ to $S_n$ in a case where the transmission rate and the packet loss rate have the specified proportional relation in the fields of the packet loss rates corresponding to the proportion determination "o".

Meanwhile, for example, the first acceleration device 202 sets the transmission rates $S_1$ to $S_{k-1}$ in a case where the transmission rate and the packet loss rate do not have the specified proportional relation in the fields of the transmission rates corresponding to the proportion determination "x".

For example, the first acceleration device 202 sets the reception rates $P_1$ to $P_{k-1}$ in a case where the transmission rates $S_1$ to $S_{k-1}$ and the packet loss rate do not have the specified proportional relation in the fields of the reception rates corresponding to the proportion determination "x". For example, the first acceleration device 202 sets the packet loss rates $Per_1$ to $Per_{k-1}$ in a case where the transmission rates $S_1$ to $S_{k-1}$ and the packet loss rate do not have the specified proportional relation in the fields of the packet loss rates corresponding to the proportion determination "x".

Accordingly, the first acceleration device 202 can manage the transmission rates $S_k$ to $S_n$ which are equal to or greater than the upper limit of the vacant band and the transmission rates $S_1$ to $S_{k-1}$ which are less than the upper limit of the vacant band. In other words, the first acceleration device 202 can store the range of the transmission rates $S_{k-1}$ to $S_k$, as the range of the transmission rates $S_{min}$ to $S_{max}$ which may become the upper limit of the vacant band.

Here, the first acceleration device 202 may specify any one transmission rate within the range of the transmission rates $S_{min}$ to $S_{max}$ which may become the upper limit of the vacant band, as the upper limit of the vacant band. For example, the first acceleration device 202 specifies the $S_{max}=S_k$, as the upper limit of the vacant band. For example, the first acceleration device 202 may specify $(S_{min}+S_{max})/2$, the upper limit of the vacant band.

As a result, the first acceleration device 202 can accurately specify the upper limit of the vacant band of the network 210 in which the packet loss easily occurs and the reception rate is easily disturbed. The first acceleration device 202 may further narrow the range of the transmission rates $S_{min}$ to $S_{max}$ which may become the upper limit of the vacant band, and may further improve the accuracy in specifying the upper limit of the vacant band. Here, FIG. 9 will be described.

Figure 9:
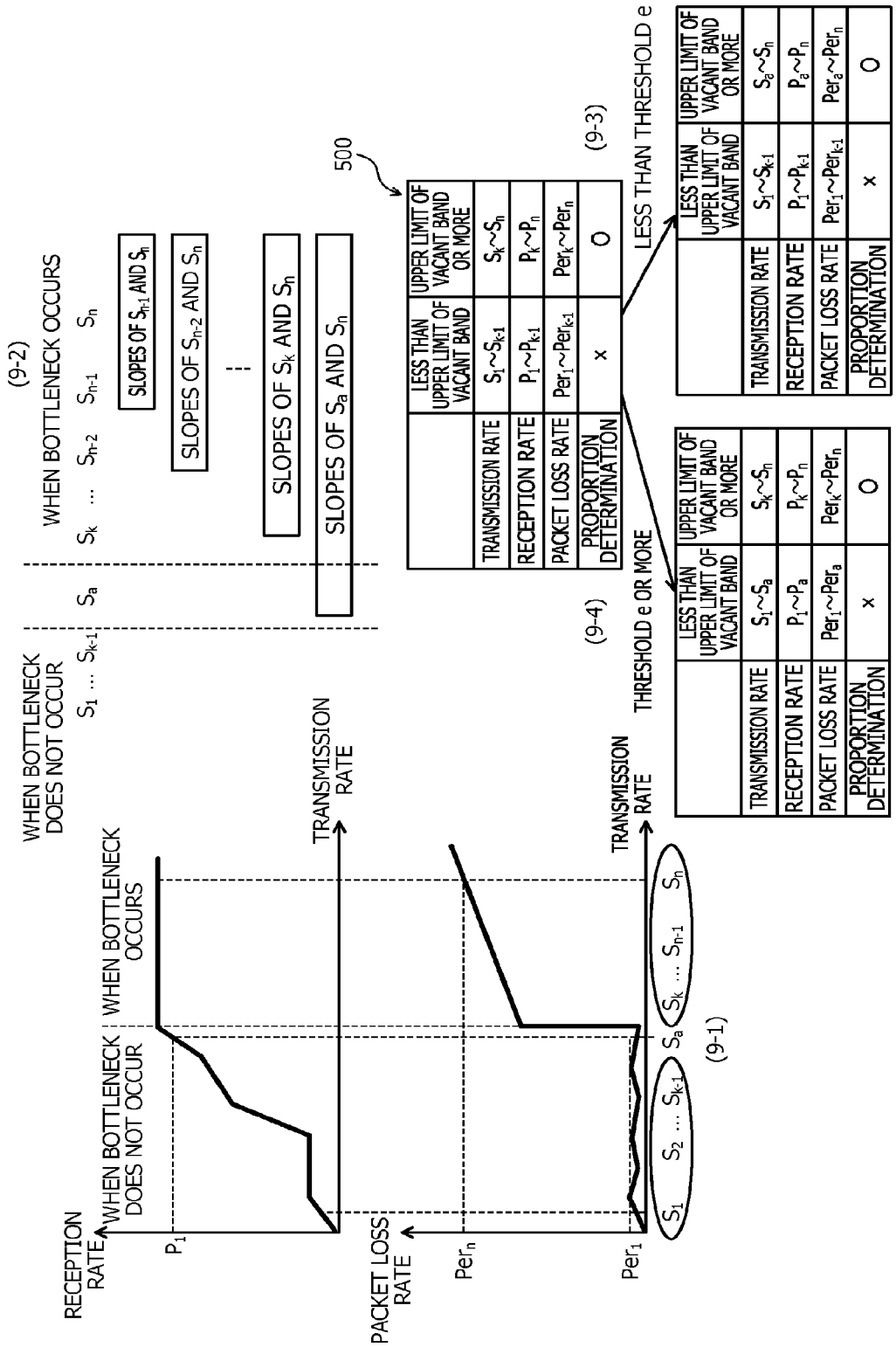
FIG. 9 is a (first) explanatory diagram illustrating an example in which the upper limit of the vacant band according to Embodiment 1 is more accurately specified.
Figure 10:
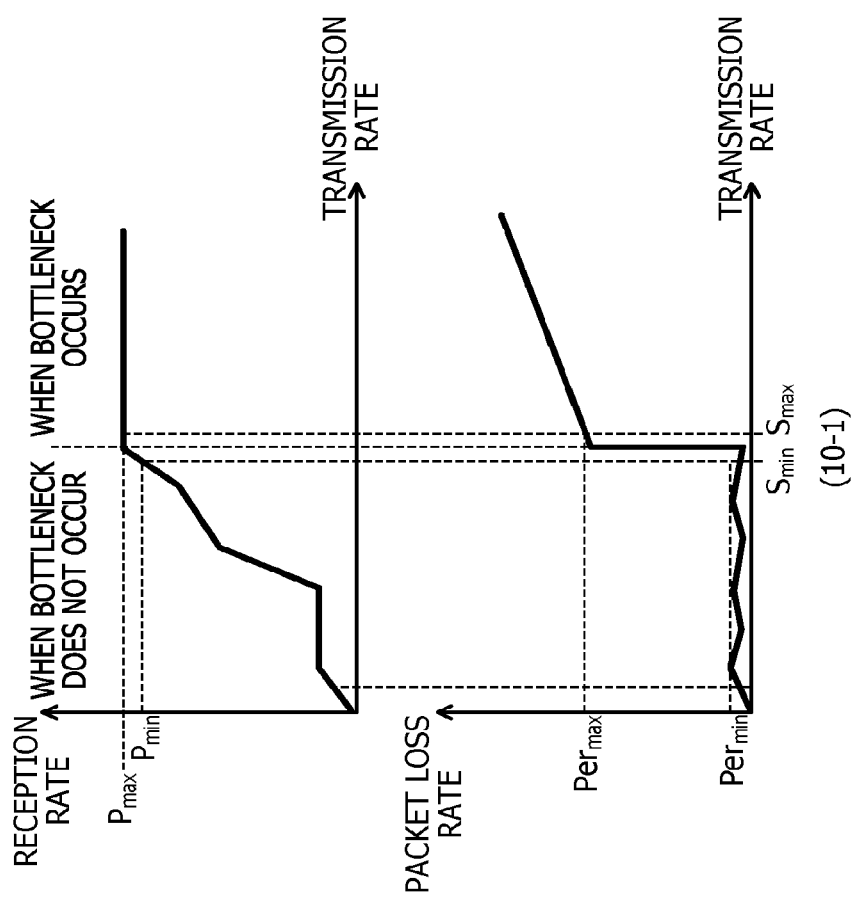
FIG. 10 is a (second) explanatory diagram illustrating an example in which the upper limit of the vacant band according to Embodiment 1 is more accurately specified.

FIGS. 9 and 10 are explanatory diagrams illustrating examples in which the upper limit of the vacant band according to Embodiment 1 is more accurately specified. In FIG. 9, (9-1) the first acceleration device 202 acquires the packet loss rates of the transmission rate $S_a=(S_{min}+S_{max})/2$ which is a center value of the range of the transmission rates $S_{min}$ to $S_{max}=S_{k-1}$ to $S_k$ which may become the upper limit of the vacant band.

For example, the first acceleration device 202 transmits the measurement request of the reception rate and the packet loss rate to the second acceleration device 204. The first acceleration device 202 transmits the test packets to the second acceleration device 204 at the transmission rate $S_a$ after the measurement request is transmitted. Meanwhile, the second acceleration device 204 measures the packet loss rate $Per_a$ and the reception rate $P_a$ corresponding to the transmission rate $S_a$, and transmits the measured result to the first acceleration device 202. The first acceleration device 202 receives the packet loss rate $Per_a$ and the reception rate $P_a$ corresponding to the transmission rate $S_a$.

(9-2) The first acceleration device 202 specifies whether the transmission rate Sa is the transmission rate in a case where the transmission rate and the packet loss rate have the proportional relation or the transmission rate in which the transmission rate and the packet loss rate do not have the proportional relation, based on the received packet loss rate $Per_a$. Specifically, the first acceleration device 202 calculates the slope $I_{a,n}$ between the transmission rates $S_n$ and the transmission rate $S_a$, similarly to FIG. 7 or 8.

The first acceleration device 202 specifies whether the range of the transmission rates $S_{min}$ to $S_{max}$ that may be the upper limit of the vacant band is the range of the transmission rates $S_{k-1}$ to $S_a$ or the range of the transmission rates $S_a$ to $S_k$.

(9-3) If a change between the slope $I_{x,k}$ and the slope $I_{x,a}$ is comparatively small, the first acceleration device 202 specifies the transmission rates $S_a$ to $S_n$ as the transmission rates in a case where the transmission rate and the packet loss rate have the proportional relation. For example, if the difference between the slope $I_{x,k}$ and the slope $I_{x,a}$ is less than the threshold e, the first acceleration device 202 specifies the transmission rates $S_a$ to $S_n$ as the transmission rates in a case where the transmission rate and the packet loss rate have the proportional relation. Meanwhile, the first acceleration device 202 specifies the remaining transmission rates $S_1$ to $S_{k-1}$, as the transmission rates in a case where the transmission rate and the packet loss rate have the proportional relation.

The first acceleration device 202 updates the management table 500 based on the specified result. For example, since the transmission rates $S_a$ to $S_n$ are specified as the transmission rates in a case where the transmission rate and the packet loss rate have the proportional relation, the first acceleration device 202 updates the fields of the transmission rates corresponding to the proportion determination "o" with the transmission rates $S_a$ to $S_n$.

For example, the first acceleration device 202 sets the reception rates $P_a$ to $P_n$ corresponding to the transmission rates $S_a$ to $S_n$ in a case where the transmission rate and the packet loss rate have the specified proportional relation in the fields of the reception rates corresponding to the proportion determination "o". For example, the first acceleration device 202 sets the packet loss rates $Per_a$ to $Per_n$ corresponding to the transmission rates $S_a$ to $S_n$ in a case where the transmission rate and the packet loss rate have the specified proportional relation in the fields of the packet loss rates corresponding to the proportion determination "o".

(9-4) If the change between the slope $I_{x,k}$ and the slope $I_{x,a}$ is comparatively great, the first acceleration device 202 specifies the transmission rates $S_k$ to $S_n$ as the transmission rate in which the transmission rate and the packet loss rate have the proportional relation. If the difference between the slope $I_{x,k}$ and the slope $I_{x,a}$ is equal to or greater than the threshold e, the first acceleration device 202 specifies the transmission rates $S_k$ to $S_n$ as the transmission rate in which the transmission rate and the packet loss rate have the proportional relation. The first acceleration device 202 specifies the remaining transmission rates $S_1$ to $S_a$, as the transmission rates in a case where the transmission rate and the packet loss rate do not have the proportional relation.

For example, since the transmission rates $S_1$ to $S_a$ are specified as the transmission rate in which the transmission rate and the packet loss rate do not have the proportion relation, the first acceleration device 202 updates the fields of the transmission rates corresponding to the proportion determination "x" with the transmission rates $S_1$ to $S_a$.

For example, the first acceleration device 202 sets the reception rates $P_1$ to $P_a$ corresponding to the transmission rates $S_1$ to $S_a$ in a case where the transmission rate and the packet loss rate have the specified proportional relation in the fields of the reception rates corresponding to the proportion determination "x". For example, the first acceleration device 202 sets the packet loss rates $Per_1$ to $Per_a$ corresponding to the transmission rates $S_1$ to $S_a$ in a case where the transmission rate and the packet loss rate have the specified proportional relation in the fields of the packet loss rates corresponding to the proportion determination "x".

Accordingly, the first acceleration device 202 can specify whether the range of the transmission rates $S_{min}$ to $S_{max}$ which may become the upper limit of the vacant band is the range of the transmission rates $S_a$ to $S_k$ or the range of the transmission rates $S_{k-1}$ to $S_a$, and can store the specified range. In other words, the first acceleration device 202 can narrow the range of the transmission rates $S_{min}$ to $S_{max}$ which may become the upper limit of the vacant band to the range of the transmission rates $S_a$ to $S_k$ or the range of the transmission rates $S_{k-1}$ to $S_a$ from the range of the transmission rates $S_{k-1}$ to $S_k$.

Here, the first acceleration device 202 may specify any one transmission rate within the range of the transmission rates $S_{min}$ to $S_{max}$ which may become the upper limit of the vacant band, as the upper limit of the vacant band. For example, the first acceleration device 202 specifies the $S_{max}=S_k$, as the upper limit of the vacant band. Here, FIG. 10 will be described.

In FIG. 10, (10-1) the first acceleration device 202 determines whether or not to further narrow the range of the transmission rates $S_{min}$ to $S_{max}$ which may become the upper limit of the vacant band. For example, if the difference between $S_{min}$ and $S_{max}$ is equal to or greater than a threshold T, the first acceleration device 202 determines to further narrow the range of the transmission rates $S_{min}$ to $S_{max}$ which may become the upper limit of the vacant band. In a case where it is determined to further narrow the range, the first acceleration device 202 further narrows the range of the transmission rates $S_{min}$ to $S_{max}$, similarly to FIG. 9.

Meanwhile, if the difference between $S_{min}$ and $S_{max}$ is less than the threshold T, the first acceleration device 202 determines not to narrow the range of the transmission rates $S_{min}$ to $S_{max}$ which may become the upper limit of the vacant band.

(10-2) If it is determined not to narrow the range, the first acceleration device 202 specifies any one transmission rate within the range of the transmission rates $S_{min}$ to $S_{max}$ which may become the upper limit of the vacant band, as the upper limit of the vacant band. For example, the first acceleration device 202 specifies the $S_{max}=S_k$, as the upper limit of the vacant band.

As a result, the first acceleration device 202 can more accurately specify the upper limit of the vacant band of the network 210 in which the packet loss easily occurs and the reception rate is easily disturbed. Thus, the first acceleration device 202 can efficiently utilize the network 210.

Example of Specification Process Procedure According to Embodiment 1

Hereinafter, an example of a specification process procedure according to Embodiment 1 for specifying the upper limit of the vacant band of the network 210 will be described with reference to FIGS. 11 and 12.

Figure 11:
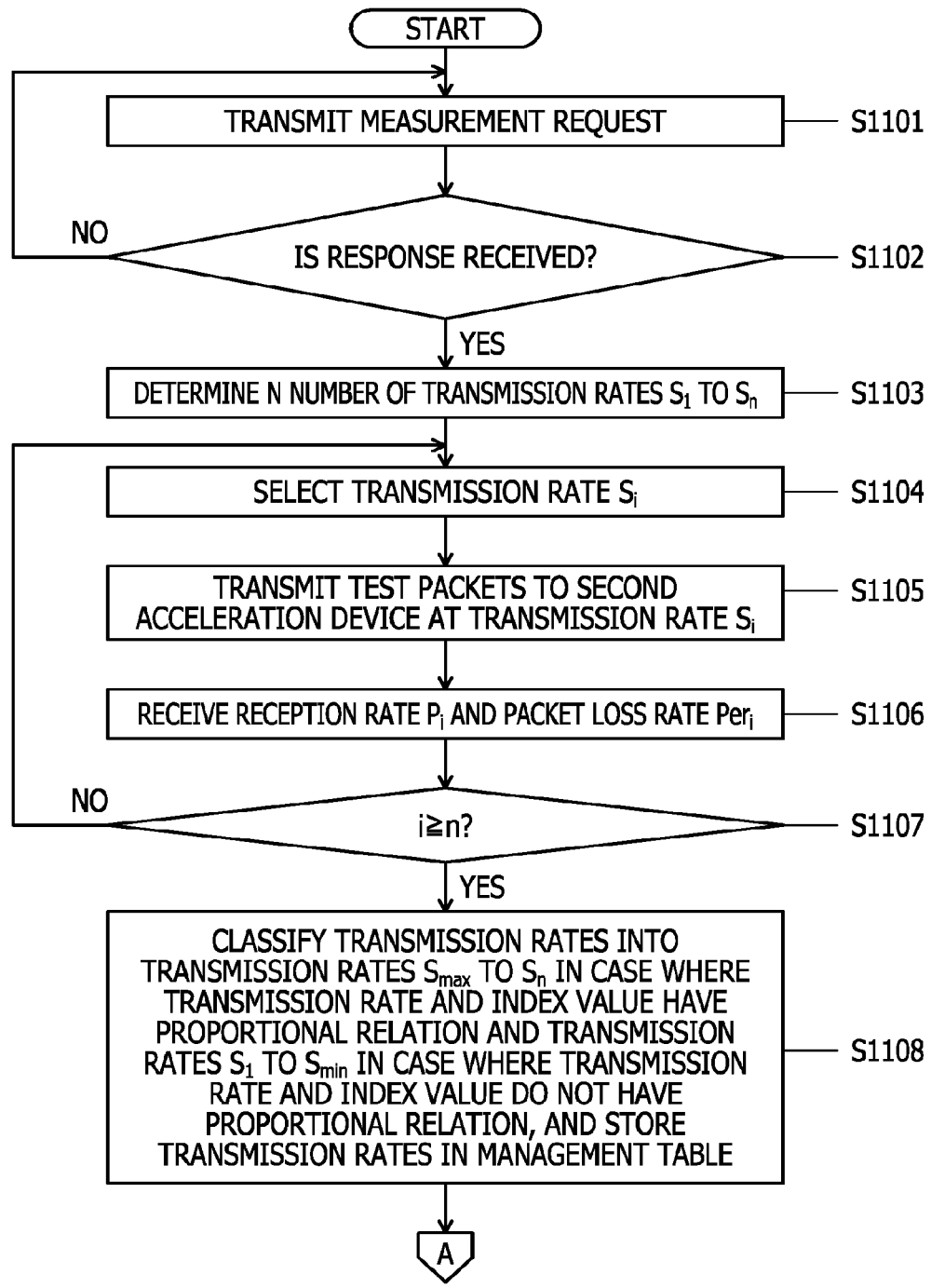
FIG. 11 is a (first) flowchart illustrating an example of a specification process procedure according to Embodiment 1.
Figure 12:
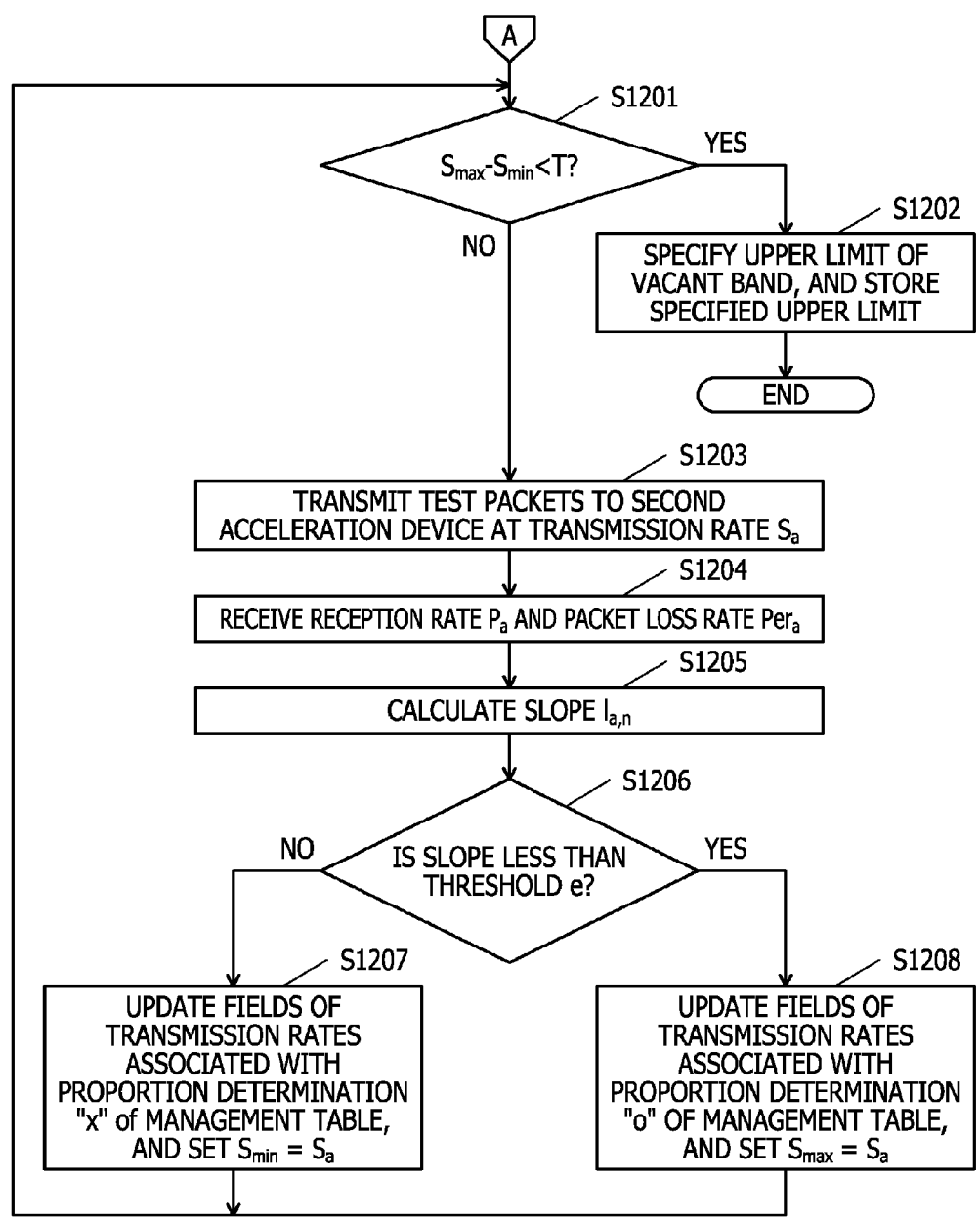
FIG. 12 is a (second) flowchart illustrating an example of the specification process procedure according to Embodiment 1.

FIGS. 11 and 12 are flowcharts illustrating examples of the specification process procedure according to Embodiment 1. In FIG. 11, the first acceleration device 202 transmits the measurement request of the reception rate and the packet loss rate to the second acceleration device 204 (step S1101). Subsequently, the first acceleration device 202 determines whether or not the response is received from the second acceleration device 204 (step S1102). Here, in a case where the response is not received (step S1102: No), the first acceleration device 202 returns the process to step S1101.

Meanwhile, in a case where the response is received (step S1102: Yes), the first acceleration device 202 determines n number of transmission rates $S_1$ to $S_n$ used when the test packets are transmitted based on the preset maximum transmission rate and minimum transmission rate (step S1103).

Subsequently, the first acceleration device 202 increments a variable i, and selects a transmission rate $S_i$ from the transmission rate $S_1$ to $S_n$ (step S1104). An initial value of the variable i is 0. The first acceleration device 202 transmits the test packets to the second acceleration device 204 at the selected transmission rate $S_i$ (step S1105).

Subsequently, the first acceleration device 202 receives a reception rate $P_i$ and a packet loss rate $Per_i$ measured by the second acceleration device 204 from the second acceleration device 204 (step S1106). The first acceleration device 202 determines whether or not i≥n is satisfied (step S1107). Here, in a case where i≥n is not satisfied (step S1107: No), the first acceleration device 202 returns the process to step S1104.

Meanwhile, in a case where i≥n is satisfied (step S1107: Yes), the first acceleration device 202 classifies the transmission rates $S_1$ to $S_n$, and stores the classified transmission rates in the management table 500 (step S1108). Here, for example, the first acceleration device 202 classifies the transmission rates $S_1$ to $S_n$ into the transmission rates $S_{max}$ to $S_n$ in a case where the transmission rate and the packet loss rate have the proportional relation and the transmission rates $S_1$ to $S_{min}$ in a case where the transmission rate and the packet loss rate do not have the proportional relation. Thereafter, the first acceleration device 202 performs the process of step S1201 of FIG. 12.

In FIG. 12, the first acceleration device 202 determines whether or not $S_{max}-S_{min}<T$ is satisfied (step S1201). Here, in a case where $S_{max}-S_{min}<T$ is satisfied (step S1201: Yes), the first acceleration device 202 specifies the upper limit of the vacant band based on the management table 500, and stores the specified upper limit (step S1202). The first acceleration device 202 ends the specification process.

Meanwhile, in a case where $S_{max}-S_{min}<T$ is not satisfied (step S1201: No), the first acceleration device 202 sets the transmission rate $S_a=(S_{min}+S_{max})/2$, and transmits the test packets to the second acceleration device 204 at the transmission rate $S_a$ (step S1203). Subsequently, the first acceleration device 202 receives a reception rate $P_a$ and a packet loss rate $Per_a$ measured by the second acceleration device 204 from the second acceleration device 204 (step S1204). The first acceleration device 202 calculates the slope $I_{a,n}$ between the transmission rate $S_a$ and the transmission rate $S_n$ (step S1205).

Subsequently, the first acceleration device 202 determines whether or not a difference between the slope $I_{a,n}$ and the slope of the transmission rate in which the transmission rate and the packet loss rate have the proportional relation is less than the threshold e (step S1206). Here, in a case where the difference is not less than the threshold e (step S1206: No), the first acceleration device 202 updates the fields of the transmission rates associated with the proportion determination "x" of the management table 500, and sets $S_{min}=S_a$ (step S1207). The first acceleration device 202 returns the process to step S1201.

Meanwhile, in a case where the difference is less than the threshold e (step S1206: Yes), the first acceleration device 202 updates the fields of the transmission rates associated with the proportion determination "o" of the management table 500, and sets $S_{max}=S_a$ (step S1208). The first acceleration device 202 returns the process to step S1201. Accordingly, the first acceleration device 202 can accurately specify the upper limit of the vacant band.

Operation Example of Communication System 200 According to Embodiment 1

Hereinafter, an operation example of the communication system 200 according to Embodiment 1 will be described with reference to FIGS. 13 and 14.

Figure 13:
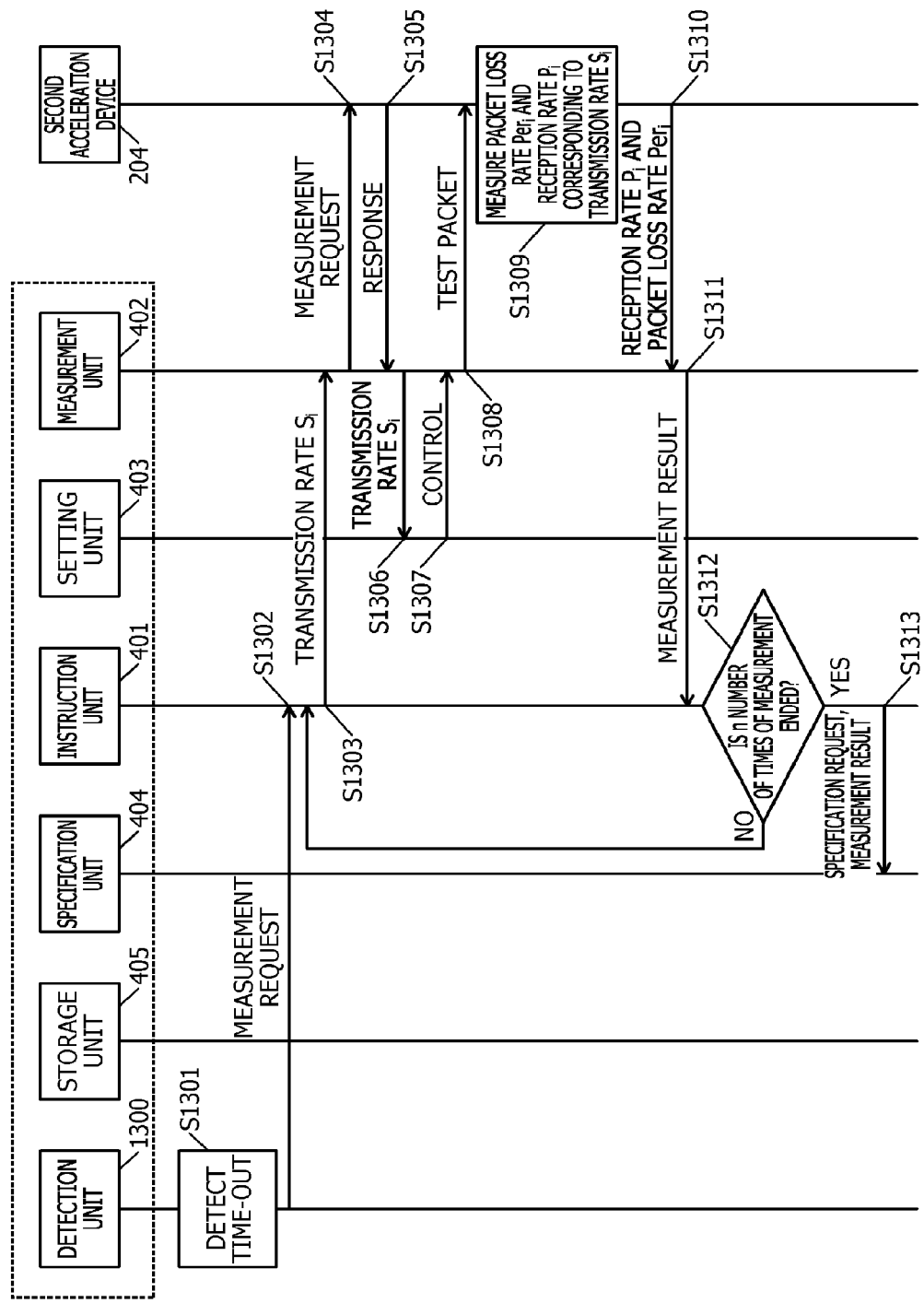
FIG. 13 is a (first) sequence diagram illustrating an operation example of the communication system according to Embodiment 1.
Figure 14:
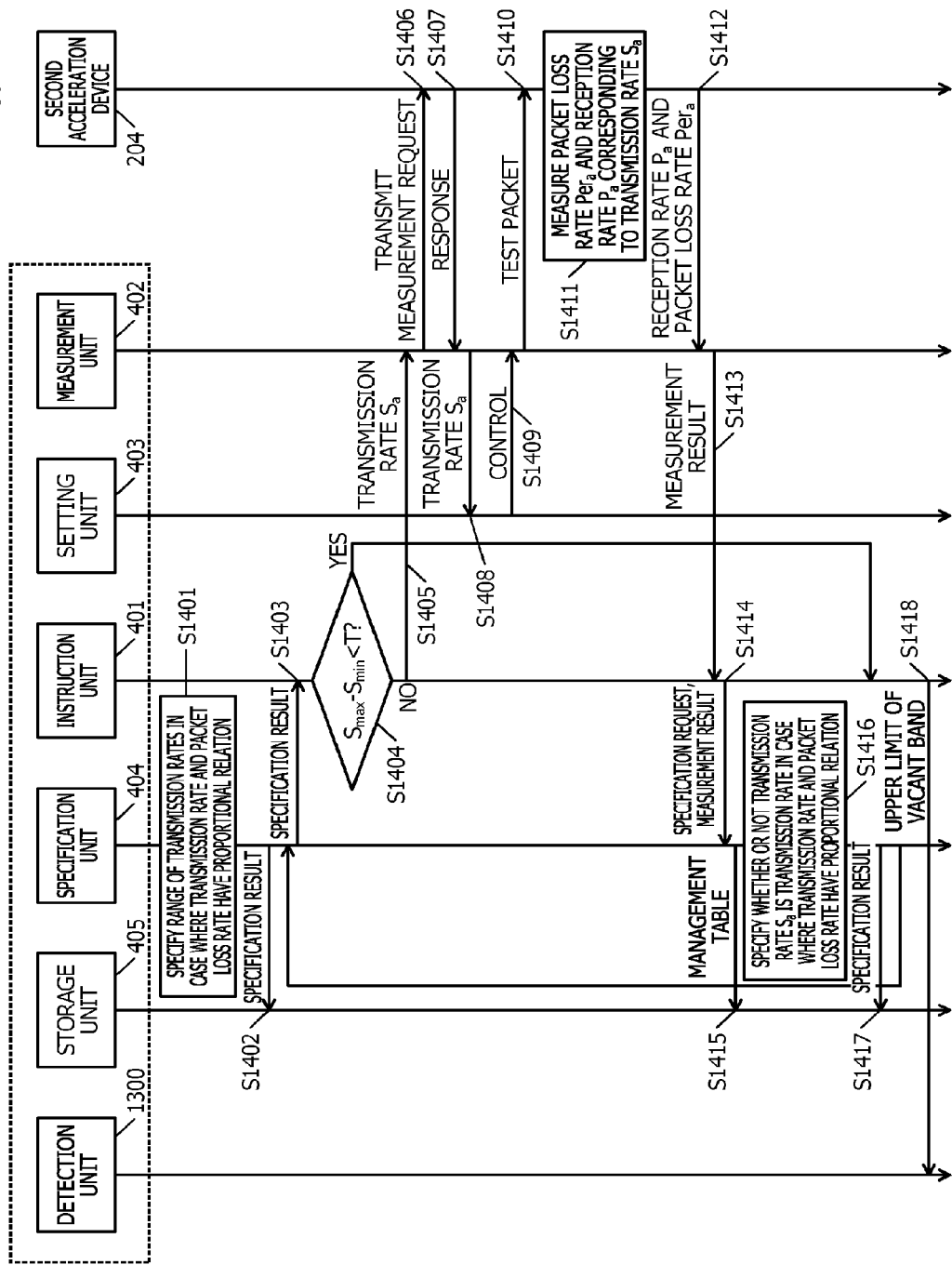
FIG. 14 is a (second) sequence diagram illustrating an operation example of the communication system according to Embodiment 1.

FIGS. 13 and 14 are sequence diagrams illustrating operation examples of the communication system 200 according to Embodiment 1. In FIG. 13, the first acceleration device 202 further includes a detection unit 1300. For example, the detection unit 1300 generates triggers for causing the instruction unit 401 to the storage unit 405 to start the processes.

In FIG. 13, the detection unit 1300 of the first acceleration device 202 detects that the communication with the second acceleration device 204 is time out (step S1301). If the time-out is detected, the detection unit 1300 inputs the measurement request to the instruction unit 401 (step S1302). If the measurement request is received, the instruction unit 401 determines n number of transmission rates $S_1$ to $S_n$, and notifies the measurement unit 402 of the transmission rate $S_i$ of the transmission rates $S_1$ to $S_n$ (step S1303).

If the transmission rate $S_i$ is notified, the measurement unit 402 transmits the measurement request of the reception rate and the packet loss rate to the second acceleration device 204 (step S1304). Meanwhile, if the measurement request is received, the second acceleration device 204 transmits the response to the measurement unit 402 (step S1305).

If the response is received, the measurement unit 402 notifies the setting unit 403 of the transmission rates $S_i$ (step S1306). Subsequently, the measurement unit 402 accepts the control of the transmission rate $S_i$ performed by the setting unit 403 (step S1307). The measurement unit 402 transmits the test packets to the second acceleration device 204 at the transmission rate $S_i$ under the control of the setting unit 403 (step S1308).

If the test packets are received, the second acceleration device 204 measures the reception rates $P_i$ and the packet loss rate $Per_i$ corresponding to the transmission rate $S_i$ (step S1309). The second acceleration device 204 transmits the reception rate $P_i$ and the packet loss rate $Per_i$ corresponding to the measured transmission rate $S_i$ to the measurement unit 402 (step S1310).

If the reception rate $P_i$ and the packet loss rate $Per_i$ corresponding to the transmission rate $S_i$ are received, the measurement unit 402 notifies the instruction unit 401 of the measurement result including the reception rate $P_i$ and the packet loss rate $Per_i$ (step S1311).

If the measurement result is received, the instruction unit 401 determines whether or not n number of times of the measurement is ended by using the transmission rates $S_1$ to $S_n$ (step S1312). Here, in a case where n number of times of the measurement is not ended (step S1312: No), the instruction unit 401 returns the process to step S1303.

Meanwhile, in a case where n number of times of the measurement is ended (step S1312: Yes), the instruction unit 401 notifies the specification unit 404 of a specification request for the range of the transmission rates in a case where the transmission rate and the packet loss rate have the proportional relation and the measurement result (step S1313). Here, FIG. 14 will be described.

In FIG. 14, if the specification request and the measurement result are received, the specification unit 404 specifies the range of the transmission rates in a case where the transmission rate and the packet loss rate have the proportional relation (step S1401). The specification unit 404 notifies the storage unit 405 of the specification result, and stores the management table 500 in the storage unit 405 (step S1402).

The specification unit 404 notifies the instruction unit 401 of the specification result (step S1403). If the specification result is received, the instruction unit 401 determines whether or not $S_{max}-S_{min}<T$ is satisfied (step S1404). Here, in a case where $S_{max}-S_{min}<T$ is satisfied (step S1404: Yes), the instruction unit 401 performs the process of step S1418.

Meanwhile, in a case where $S_{max}-S_{min}<T$ is not satisfied (step S1404: No), the instruction unit 401 notifies the measurement unit 402 of the transmission rate $S_a=(S_{min}+S_{max})/2$ (step S1405).

If the transmission rate $S_a$ is notified, the measurement unit 402 transmits the measurement request of the reception rate and the packet loss rate to the second acceleration device 204 (step S1406). Meanwhile, if the measurement request is received, the second acceleration device 204 transmits the response to the measurement unit 402 (step S1407).

If the response is received, the measurement unit 402 notifies the setting unit 403 of the transmission rates $S_a$ (step S1408). Subsequently, the measurement unit 402 accepts the control of the transmission rate $S_a$ performed by the setting unit 403 (step S1409). The measurement unit 402 transmits the test packets to the second acceleration device 204 at the transmission rate $S_a$ under the control of the setting unit 403 (step S1410).

If the test packets are received, the second acceleration device 204 measures the reception rates $P_a$ and the packet loss rate $Per_a$ corresponding to the transmission rate $S_a$ (step S1411). The second acceleration device 204 transmits the reception rate $P_a$ and the packet loss rate $Per_a$ corresponding to the measured transmission rate $S_a$ to the measurement unit 402 (step S1412).

If the reception rate $P_a$ and the packet loss rate $Per_a$ corresponding to the transmission rate $S_a$ are received, the measurement unit 402 notifies the instruction unit 401 of the measurement result including the reception rate $P_a$ and the packet loss rate $Per_a$ (step S1413).

In a case where the measurement result is received, the instruction unit 401 notifies the specification unit 404 of a specification request for the range of the transmission rates in a case where the transmission rate and the packet loss rate have the proportional relation and the measurement result (step S1414).

If the specification request and the measurement result are received, the specification unit 404 refers to the management table 500 stored in the storage unit 405 (step S1415). If the management table 500 is referred to, the specification unit 404 specifies whether or not the transmission rate $S_a$ is the transmission rate in a case where the transmission rate and the packet loss rate have the proportional relation (step S1416). The specification unit 404 notifies the storage unit 405 of the specification result, and updates the management table 500 in the storage unit 405 (step S1417). The specification unit 404 returns the process to step S1403.

In a case where $S_{max} - S_{min} < T$ is satisfied and the process of step S1418 is performed, the instruction unit 401 outputs the upper limit of the vacant band (step S1418). Accordingly, the first acceleration device 202 can accurately specify the upper limit of the vacant band.

Description of Embodiment 2

Hereinafter, Embodiment 2 will be described. In the following description, the same elements as those of Embodiment 1 will be assigned the same reference signs as those of Embodiment 1, and the redundant description thereof will be omitted in some cases.

Example of Communication System 200 According to Embodiment 2

Hereinafter, an example of the communication system 200 according to Embodiment 2 to which the vacant band specification device 100 illustrated in FIG. 1 is applied will be described with reference to FIG. 15.

Figure 15:
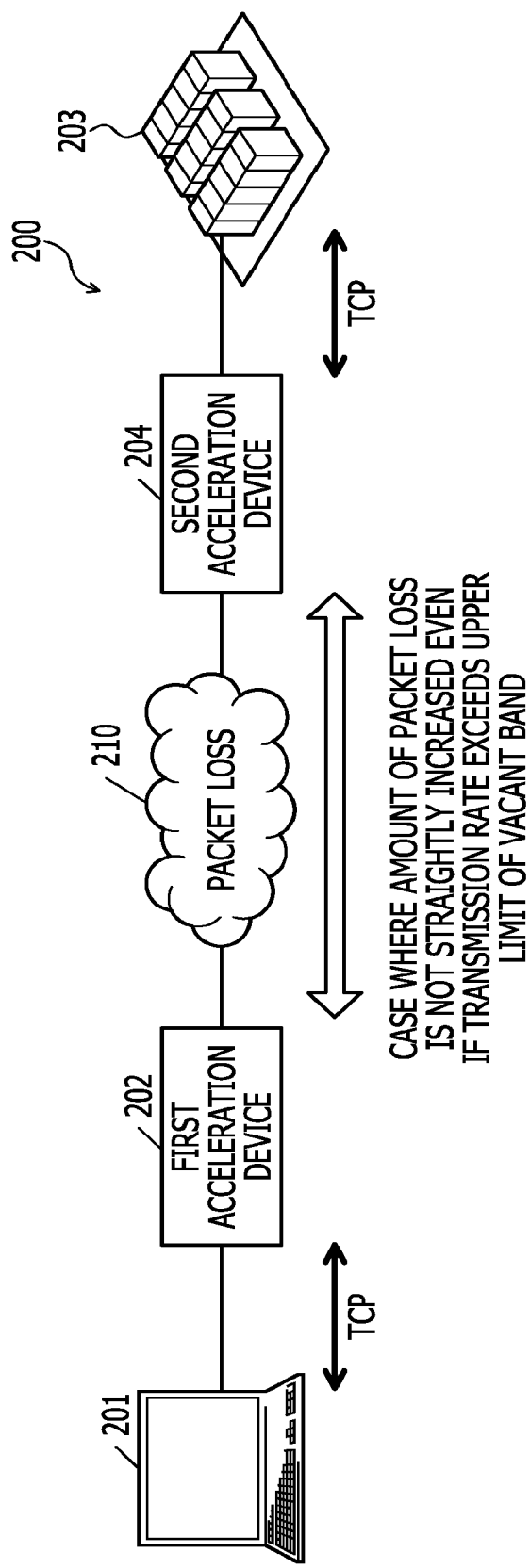
FIG. 15 is an explanatory diagram illustrating an example of a communication system according to Embodiment 2.

FIG. 15 is an explanatory diagram illustrating an example of the communication system 200 according to Embodiment 2. In FIG. 15, the communication system 200 includes the first calculation device 201, the first acceleration device 202, the second calculation device 203, and the second acceleration device 204. In the communication system 200, the first acceleration device 202 and the second acceleration device 204 are connected via a wired or wireless network 210.

Here, similarly to FIG. 2, the first acceleration device 202 tends to be desired to specify the upper limit of the vacant band of the network 210. Thus, in the following description, a case where the first acceleration device 202 operates as the vacant band specification device 100 and specifies the upper limit of the vacant band of the network 210 will be described.

Here, in the network 210, if the transmission rate is increased, the index value indicating the amount of packet loss tends to be also increased. However, the index value indicating the amount of packet loss is not necessarily increased in a straight line with respect to the increase in the transmission rate in some types of the index value indicating the amount of packet loss or some statuses of the network 210. The packet loss is comparatively small immediately after the transmission rate exceeds the upper limit of the vacant band in some cases. Thus, it is difficult to specify the range of the transmission rates in a case where the transmission rate and the index value indicating the amount of packet loss have the proportional relation.

Thus, in Embodiment 2, the first acceleration device 202 uses the correlation between the transmission rate and the index value indicating the amount of packet loss instead of the proportional relation, as the dependence relation between the transmission rate and the index value indicating the amount of packet loss. Accordingly, the first acceleration device 202 can improve the accuracy in specifying the upper limit of the vacant band.

(Functional Configuration Example of Vacant Band Specification Device 100)

Hereinafter, a functional configuration example of the vacant band specification device 100 according to Embodiment 2 will be described. Similarly to FIG. 4, the vacant band specification device 100 includes the instruction unit 401, the measurement unit 402, the setting unit 403, the specification unit 404, and the storage unit 405. The functional units are the same as those of FIG. 4, and thus, the description thereof will be described.

(Flow for Specifying Upper Limit of Vacant Band of Network 210)

Hereinafter, a flow for specifying the upper limit of the vacant band of the network 210 according to Embodiment 2 will be described with reference to FIGS. 16 to 20.

FIG. 16 is an explanatory diagram illustrating an example of the stored content of the management table 1600 according to Embodiment 2. For example, the management table 1600 is realized by the storage area such as the memory 302 or the disk 305 illustrated in FIG. 3. As illustrated in FIG. 16, the management table 1600 includes fields such as the transmission rate, the reception rate, the packet loss rate, and correlation determination.

The correlation determination is a flag indicating whether or not the transmission rate, the reception rate, and the packet loss rate associated with the correlation determination are information in a case where the transmission rate and the packet loss rate have the correlation. For example, the correlation determination is "o" if the transmission rate and the packet loss rate have the correlation, and is "x" if the transmission rate and the packet loss rate do not have the correlation. The transmission rate is a transmission rate range in a case where the correlation is expressed by the correlation determination. The reception rate is a reception rate range in a case where the correlation is expressed by the correlation determination. The packet loss rate is a packet loss rate in which the correlation is expressed by the correlation determination.

The management table 1600 may classify the transmission rates into a range of the transmission rates in a case where the transmission rate and the packet loss rate have the correlation and a range of the transmission rates in a case where the transmission rate and the packet loss rate do not have the correlation, and may manage the classified ranges. In other words, the management table 1600 may classify the transmission rates into a range of transmission rates which are equal to or greater than the upper limit of the vacant band and a range of transmission rates which are less than the upper limit of the vacant band, and may manage the classified ranges.

Figure 17:
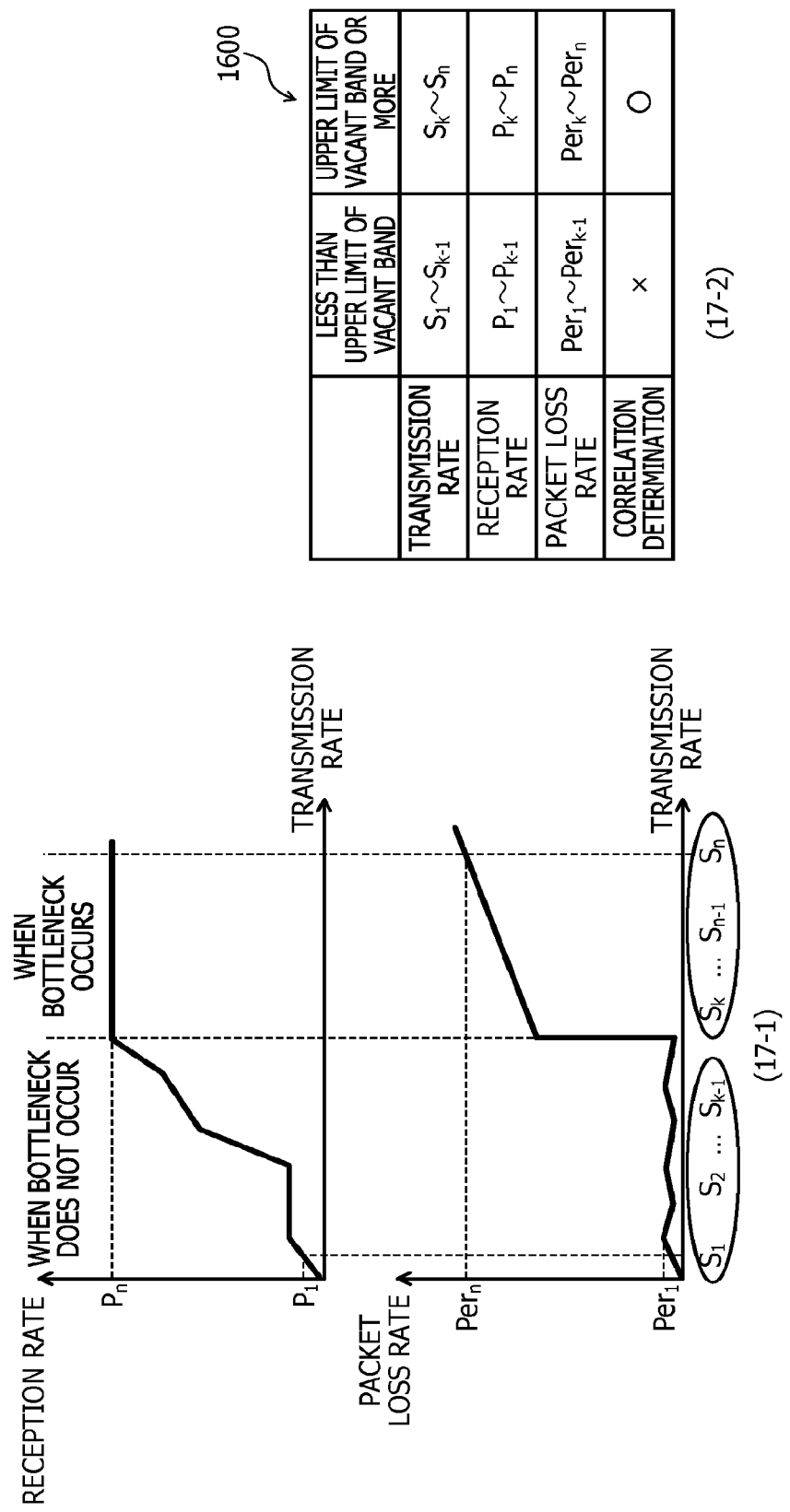
FIG. 17 is an explanatory diagram illustrating an example in which the upper limit of the vacant band according to Embodiment 2 is specified.

FIG. 17 is an explanatory diagram illustrating an example in which the upper limit of the vacant band according to Embodiment 2 is specified. In FIG. 17, (17-1) the first acceleration device 202 receives the packet loss rates $Per_1$ to $Per_n$ and the reception rates $P_1$ to $P_n$ corresponding to n number of transmission rates $S_1$ to $S_n$ from the second acceleration device 204, similarly to FIG. 6.

As illustrated in FIG. 17, a case where the transmission rates $S_1$ to $S_{k-1}$ of n number of transmission rates $S_1$ to $S_n$ are equal to or less than the vacant band and the transmission rates $S_k$ to $S_n$ are equal to or greater than the vacant band will be described. In the following description, the first acceleration device 202 may classify n number of transmission rates $S_1$ to $S_n$ into the transmission rates $S_1$ to $S_{k-1}$ which are equal to or less than the vacant band and the transmission rates $S_k$ to $S_n$ which are equal to or greater than the vacant band.

Here, the first acceleration device 202 specifies the transmission rate of the transmission rates $S_1$ to $S_n$, in a case where the transmission rate and the packet loss rate have the correlation based on the received packet loss rates $Per_1$ to $Per_n$. In other words, the first acceleration device 202 may specify the transmission rates in a case where the transmission rate and the packet loss rate do not have the correlation. Here, FIG. 18 will be described.

Figure 18:
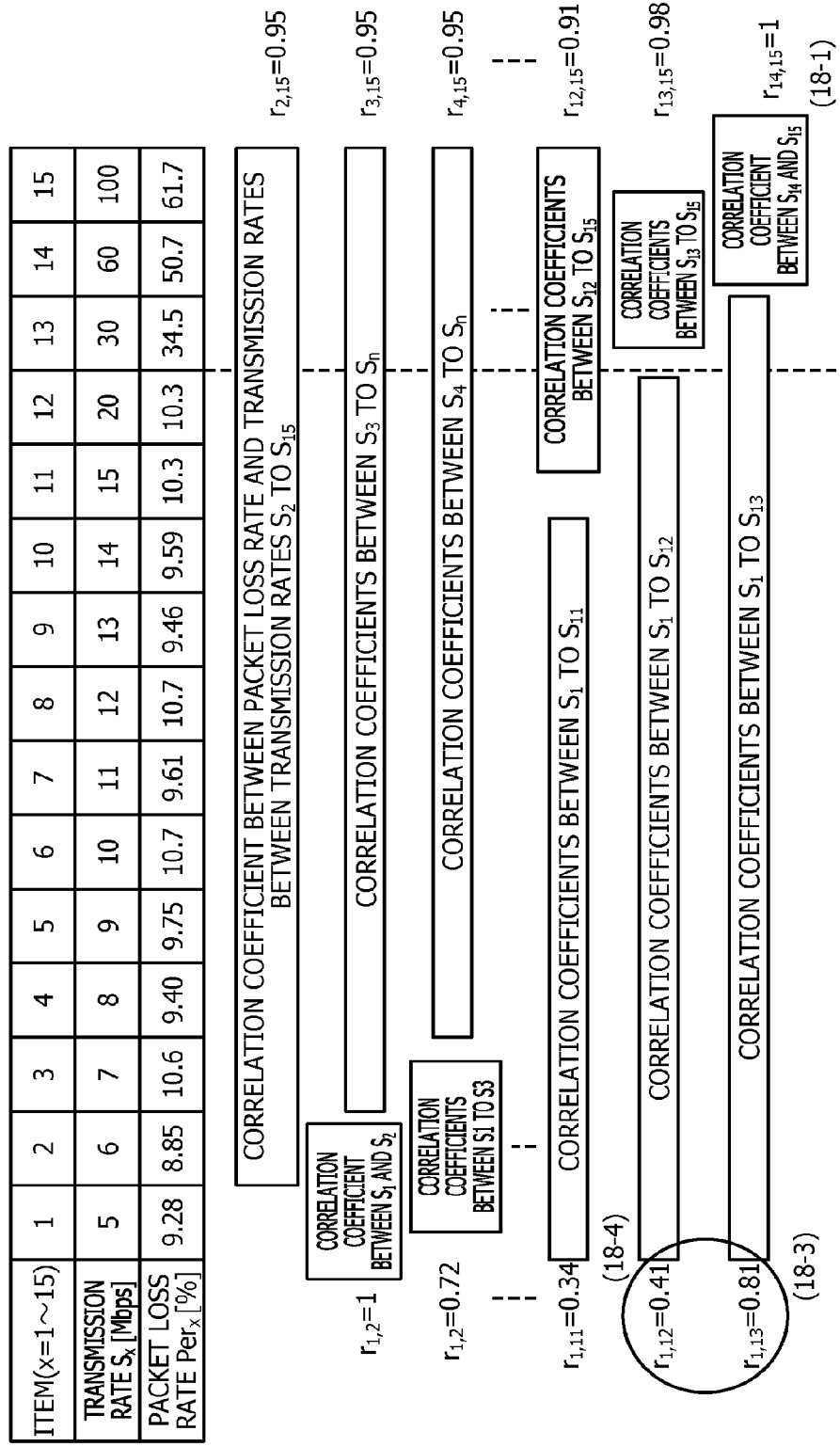
FIG. 18 is an explanatory diagram illustrating an example in which the transmission rate in a case where the transmission rate and the packet loss rate have the correlation is specified.

FIG. 18 is an explanatory diagram illustrating an example in which the transmission rate in a case where the transmission rate and the packet loss rate have the correlation is specified. A table illustrated in FIG. 18 is a measurement result using the test packets, and data of the transmission rates and the packet loss rates at measurement points of time defined by the respective item number are stored.

In FIG. 18, (18-1) the first acceleration device 202 calculates the correlation coefficient $r_{x,n}$ between the transmission rate $S_n$ and the transmission rate $S_k$ by using Expression (5) while sequentially changing the variable x to n−1, n−2, . . . , and 1.

For example, the first acceleration device 202 substitutes the transmission rates $S_k$ to $S_n$, an average value $S_{avg}$ of the transmission rates $S_k$ to $S_n$, the packet loss rates $Per_k$ to $Per_n$, and an average $Per_{avg}$ of the packet loss rates $Per_k$ to $Per_n$ in the following expression (5). Accordingly, the first acceleration device 202 calculates the correlation coefficient $r_{x,n}$ between the transmission rate $S_n$ and the transmission rate $S_k$ for each of x=n−1, n−2, . . . , and 1.

$$r_{x,n} = \frac{\sum_{i=x}^{n}(S_i - S_{avg}) - \sum_{i=x}^{n}(Per_i - Per_{avg})}{\sqrt{\sum_{i=x}^{n}(S_i - S_{avg})^2} \sqrt{\sum_{i=x}^{n}(Per_i - Per_{avg})^2}} \quad (5)$$

Here, when the variable x is sequentially changed to n−1, n−2, . . . , and 1, since the transmission rate in which the transmission rate and the packet loss rate have the correlation is within a section "upper limit of vacant band to $S_n$" for a period during which the transmission rate $S_x$ is equal to or greater than the upper limit of the vacant band, the correlation coefficient $r_{x,n}$ tends to have a fixed value or to be comparatively great. When the transmission rate $S_x$ is less than the upper limit of the vacant band, the correlation coefficient $r_{x,n}$ tends to be changed.

(18-2) Thus, the first acceleration device 202 specifies the transmission rates $S_k$ to $S_n$ until the correlation coefficient $r_{x,n}$ has a fixed value and the correlation coefficient $r_{x,n}$ is changed, based on the correlation coefficient $r_{x,n}$. The first acceleration device 202 sets the specified transmission rates $S_k$ to $S_n$ as the transmission rate in which the transmission rate and the packet loss rate have the correlation. Meanwhile, the first acceleration device 202 specifies the remaining transmission rates $S_1$ to $S_{k-1}$, as the transmission rates in a case where the transmission rate and the packet loss rate do not have the correlation.

For example, the first acceleration device 202 calculates the difference between the correlation coefficient $r_{x,n}$ and the correlation coefficient $r_{x-1,n}$ and determines whether or not the correlation coefficient $r_{x,n}$ is equal to or greater than the threshold R and the difference is equal to or greater than the threshold e. The threshold R is, for example, 0.9. The threshold e is, for example, 0.4. Here, since the difference is not equal to or greater than the threshold e, the first acceleration device 202 is not able to specify the transmission rates in a case where the transmission rate and the packet loss rate have the correlation.

(18-3) The first acceleration device 202 is not able to specify the transmission rate in a case where the transmission rate and the packet loss rate have the correlation, the first acceleration device calculates the correlation coefficient $r_{1,x}$ between the transmission rates $S_x$ and $S_1$ by using the following expression (6) while sequentially changing the variable x to 2, 3, . . . , and n.

For example, the first acceleration device 202 substitutes the transmission rates $S_1$ to $S_x$, an average value $S_{avg}$ of the transmission rates $S_1$ to $S_x$, the packet loss rates $Per_1$ to $Per_k$, and an average $Per_{avg}$ of the packet loss rates $Per_1$ to $Per_k$ in the following expression (6). Accordingly, the first acceleration device 202 calculates the correlation coefficient $r_{1,x}$ between the transmission rate $S_x$ and the transmission rate $S_1$ for each of x=2, 3, . . . , and n.

$$r_{1,x} = \frac{\sum_{i=1}^{x}(S_i - S_{avg}) - \sum_{i=1}^{x}(Per_i - Per_{avg})}{\sqrt{\sum_{i=1}^{x}(S_i - S_{avg})^2} \sqrt{\sum_{i=1}^{x}(Per_i - Per_{avg})^2}} \quad (6)$$

Here, when the variable x is sequentially changed to 2, 3, . . . , and n, since the transmission rate in which the transmission rate and the packet loss rate do not have the correlation is within a section of "$S_1$ to upper limit of vacant band" for a period during which the transmission rate $S_x$ is less than the upper limit of the vacant band, there are many packet loss rates having no regularity, and the correlation coefficient $r_{1,x}$ tends to be decreased. When the transmission rate $S_x$ is greater than the upper limit of the vacant band, the correlation coefficient $r_{1,x}$ tends to be comparatively greatly changed.

(18-4) Thus, the first acceleration device 202 specifies the transmission rates $S_1$ to $S_{k-1}$ until the correlation coefficient $r_{1,x}$ is decreased and the correlation coefficient $r_{1,x}$ is comparatively greatly changed, based on the correlation coefficient $r_{1,x}$. The first acceleration device 202 sets the specified transmission rates $S_1$ to $S_{k-1}$ as the transmission rates in a case where the transmission rate and the packet loss rate do not have the correlation. Meanwhile, the first acceleration device 202 specifies the remaining transmission rates $S_k$ to $S_n$, as the transmission rates in a case where the transmission rate and the packet loss rate have the correlation.

For example, the first acceleration device 202 calculates the difference between the correlation coefficient $r_{1,x}$ and the correlation coefficient $r_{1,x-1}$, and determines whether or not the correlation coefficient $r_{1,x}$ is equal to or greater than the threshold R and the difference is equal to or greater than the threshold e. Here, the first acceleration device 202 determines that the correlation coefficient $r_{1,x}$ is equal to or greater than the threshold R and the difference is equal to or greater than the threshold e. The first acceleration device 202 specifies the transmission rate $S_x$ to the maximum transmission rate $S_n$ corresponding to the correlation coefficient $r_{1,x}$ when the difference is equal to or greater than the threshold e, as the transmission rates in a case where the transmission rate and the packet loss rate have the proportional relation. The first acceleration device 202 specifies the minimum transmission rate $S_1$ to the transmission rate $S_{x-1}$ corresponding to the correlation coefficient $r_{1,x-1}$ when the difference is equal to or greater than the threshold e, as the transmission rates in a case where the transmission rate and the packet loss rate do not have the proportional relation. Now, the description is referred back to FIG. 17.

In FIG. 17, (17-2) the first acceleration device 202 stores the specified result in the management table 1600, similarly to FIG. 6. For example, the first acceleration device 202 sets the transmission rates $S_k$ to $S_n$ in a case where the transmission rate and the packet loss rate have the specified correlation in the fields of the transmission rates corresponding to the correlation determination "o".

For example, the first acceleration device 202 sets the reception rates $P_k$ to $P_n$ corresponding to the transmission rates $S_k$ to $S_n$ in a case where the transmission rate and the packet loss rate have the specified correlation in the fields of the reception rates corresponding to the correlation determination "o". The first acceleration device 202 sets the packet loss rates $Per_k$ to $Per_n$ corresponding to the transmission rates $S_k$ to $S_n$ in a case where the transmission rate and the packet loss rate have the specified correlation in the fields of the packet loss rates corresponding to the correlation determination "o".

Meanwhile, for example, the first acceleration device 202 sets the transmission rates $S_1$ to $S_{k-1}$ in a case where the transmission rate and the packet loss rate have the specified correlation in the fields of the transmission rates corresponding to the correlation determination "x".

For example, the first acceleration device 202 sets the reception rates $P_1$ to $P_{k-1}$ corresponding to the transmission rates $S_1$ to $S_{k-1}$ in a case where the transmission rate and the packet loss rate have the specified correlation in the fields of the reception rates corresponding to the correlation determination "x". For example, the first acceleration device 202 sets the packet loss rates $Per_1$ to $Per_{k-1}$ corresponding to the transmission rates $S_1$ to $S_{k-1}$ in a case where the transmission rate and the packet loss rate do not have the specified correlation in the fields of the packet loss rates corresponding to the correlation determination "x".

Accordingly, the first acceleration device 202 can manage the transmission rates $S_k$ to $S_n$ which are equal to or greater than the upper limit of the vacant band and the transmission rates $S_1$ to $S_{k-1}$ which are less than the upper limit of the vacant band. In other words, the first acceleration device 202 can store the range of the transmission rates $S_{k-1}$ to $S_k$, as the range of the transmission rates $S_{min}$ to $S_{max}$ which may become the upper limit of the vacant band.

Here, the first acceleration device 202 may specify any one transmission rate within the range of the transmission rates $S_{min}$ to $S_{max}$ which may become the upper limit of the vacant band, as the upper limit of the vacant band. For example, the first acceleration device 202 specifies the $S_{max}=S_k$, as the upper limit of the vacant band. For example, the first acceleration device 202 may specify $(S_{min}+S_{max})/2$, the upper limit of the vacant band.

As a result, the first acceleration device 202 can accurately specify the upper limit of the vacant band of the network 210 in which the packet loss easily occurs and the reception rate is easily disturbed. The first acceleration device 202 can accurately specify the upper limit of the vacant band even though the change in the slope of the graph of the transmission rate and the index value indicating the amount of packet loss is comparatively small immediately after the transmission rate exceeds the upper limit of the vacant band. The first acceleration device 202 may further narrow the range of the transmission rates $S_{min}$ to $S_{max}$ which may become the upper limit of the vacant band, and may further improve the accuracy in specifying the upper limit of the vacant band. Here, FIGS. 19 and 20 will be described.

Figure 19:
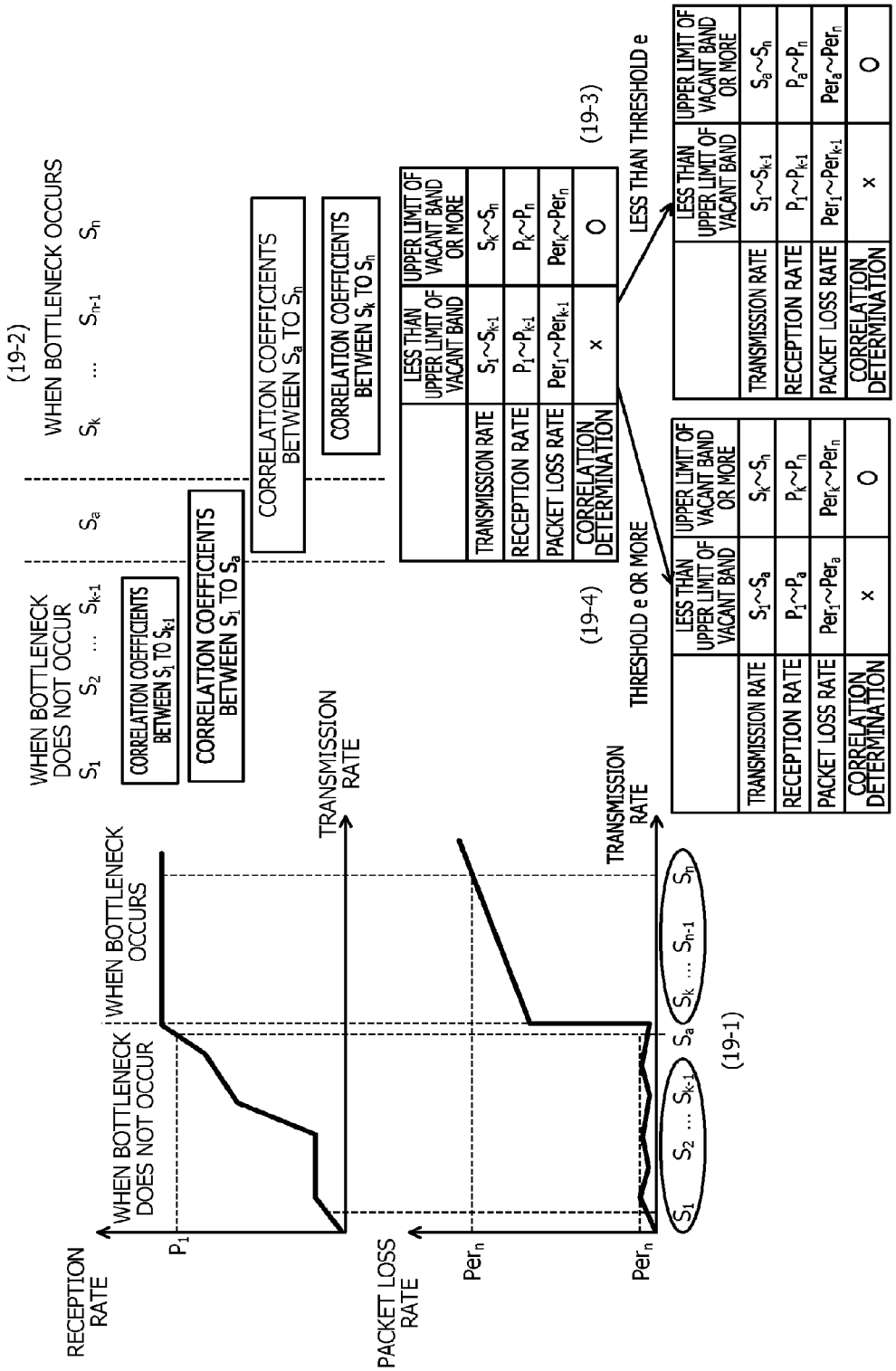
FIG. 19 is a (first) explanatory diagram illustrating an example in which the upper limit of the vacant band according to Embodiment 2 is more accurately specified.
Figure 20:
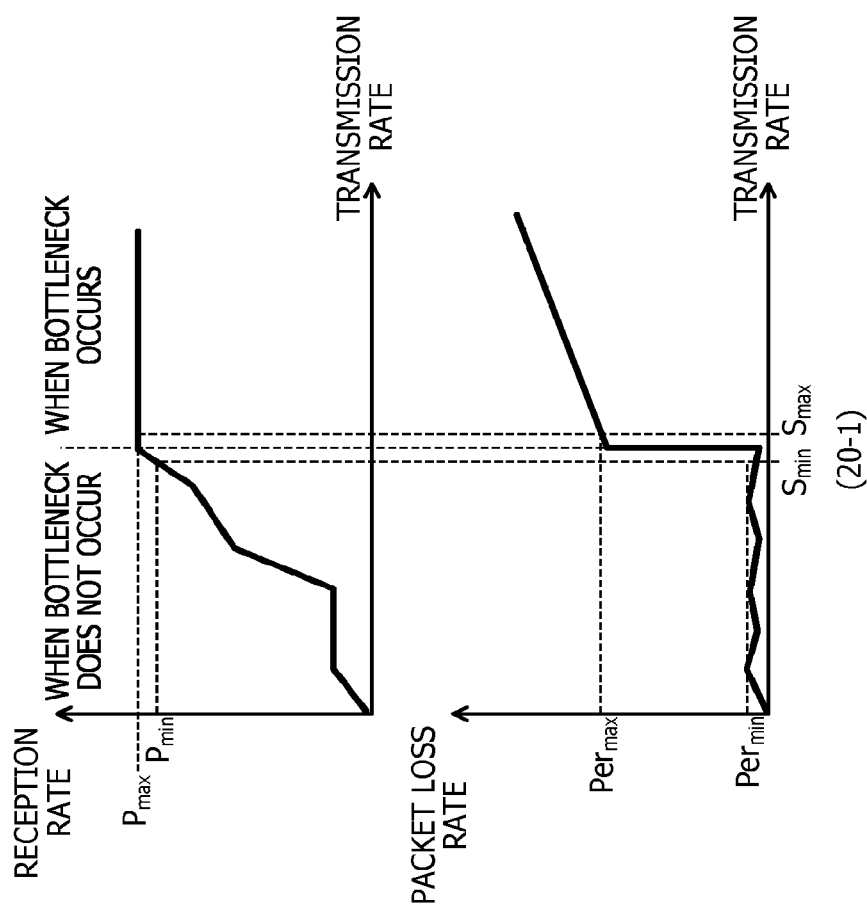
FIG. 20 is a (second) explanatory diagram illustrating an example in which the upper limit of the vacant band according to Embodiment 2 is more accurately specified.

FIGS. 19 and 20 are explanatory diagrams illustrating examples in which the upper limit of the vacant band according to Embodiment 2 is more accurately specified. In FIG. 19, (19-1) the first acceleration device 202 acquires the packet loss rates of the transmission rate $S_a$ which is a center value of the range of the transmission rates $S_{min}$ to $S_{max}=S_{k-1}$ to $S_k$ which may become the upper limit of the vacant band.

For example, the first acceleration device 202 transmits the measurement request of the reception rate and the packet loss rate to the second acceleration device 204. The first acceleration device 202 transmits the test packets to the second acceleration device 204 at the transmission rate $S_a$ after the measurement request is transmitted.

Meanwhile, the second acceleration device 204 measures the packet loss rate $Per_a$ and the reception rate $P_a$ corresponding to the transmission rate $S_a$, and transmits the measured result to the first acceleration device 202. The first acceleration device 202 receives the packet loss rate $Per_a$ and the reception rate $P_a$ corresponding to the transmission rate $S_a$.

(19-2) The first acceleration device 202 specifies whether the transmission rate $S_a$ is the transmission rate in a case where the transmission rate and the packet loss rate have the correlation or the transmission rate in which the transmission rate and the packet loss rate do not have the correlation, based on the received packet loss rate $Per_a$. Specifically, the first acceleration device 202 calculates the correlation coefficient $r_{a,n}$ between the transmission rate $S_n$ and the transmission rate $S_a$, similarly to FIG. 18.

The first acceleration device 202 specifies whether the range of the transmission rates $S_{min}$ to $S_{max}$ that may be the upper limit of the vacant band is the range of the transmission rates $S_{k-1}$ to Sa or the range of the transmission rates $S_a$ to $S_k$.

(19-3) if the correlation coefficient $r_{x,a}$ is equal to or greater than threshold R and the change between the correlation coefficient $r_{x,k}$ and the correlation coefficient $r_{x,a}$ is comparatively small, the first acceleration device 202 specifies the transmission rates $S_a$ to $S_n$, as the transmission rates in which the transmission rate and the packet loss rate have the correlation. For example, if the correlation coefficient $r_{x,a}$ is equal to or greater than the threshold R and the difference between the correlation coefficient $r_{x,k}$ and the correlation coefficient $r_{x,a}$ is less than the threshold e, the first acceleration device 202 specifies the transmission rates $S_a$ to $S_n$, as the transmission rates in a case where the transmission rate and the packet loss rate have the correlation. The first acceleration device 202 specifies the remaining transmission rates $S_1$ to $S_{k-1}$, as the transmission rates in a case where the transmission rate and the packet loss rate do not have the correlation.

The first acceleration device 202 updates the management table 1600 based on the specified result. For example, since the transmission rates $S_a$ to $S_n$ are specified as the transmission rates in a case where the transmission rate and the packet loss rate have the correlation, the first acceleration device 202 updates the fields of the transmission rates corresponding to the correlation determination "o" with the transmission rates $S_a$ to $S_n$.

For example, the first acceleration device 202 sets the reception rates $P_a$ to $P_n$ corresponding to the transmission rates $S_a$ to $S_n$ in a case where the transmission rate and the packet loss rate have the specified correlation in the fields of the reception rates corresponding to the correlation determination "o". The first acceleration device 202 sets the packet loss rates $Per_a$ to $Per_n$ corresponding to the transmission rates $S_a$ to $S_n$ in a case where the transmission rate and the packet loss rate have the specified correlation in the fields of the packet loss rates corresponding to the correlation determination "o".

(19-4) if the correlation coefficient $r_{x,a}$ is less than threshold R and the change between the correlation coefficient $r_{x,k}$ and the correlation coefficient $r_{x,a}$ is comparatively great, the first acceleration device 202 specifies the transmission rates $S_k$ to $S_n$, as the transmission rates in which the transmission rate and the packet loss rate have the correlation. For example, if the correlation coefficient $r_{x,a}$ is less than the threshold R and the difference between the correlation coefficient $r_{x,k}$ and the correlation coefficient $r_{x,a}$ is equal to or greater than the threshold e, the first acceleration device 202 specifies the transmission rates $S_k$ to $S_n$, as the transmission rates in a case where the transmission rate and the packet loss rate have the correlation. The first acceleration device 202 specifies the remaining transmission rates $S_1$ to $S_a$, as the transmission rates in a case where the transmission rate and the packet loss rate do not have the correlation.

For example, since the transmission rates $S_1$ to $S_a$ are specified as the transmission rate in which the transmission rate and the packet loss rate do not have the correlation, the first acceleration device 202 updates the fields of the transmission rates corresponding to the correlation determination "x" with the transmission rates $S_1$ to $S_a$.

For example, the first acceleration device 202 sets the reception rates $P_1$ to $P_a$ corresponding to the transmission rates $S_1$ to $S_a$ in a case where the transmission rate and the packet loss rate do not have the specified correlation in the fields of the reception rates corresponding to the correlation determination "x". For example, the first acceleration device 202 sets the packet loss rates $Per_1$ to $Per_a$ corresponding to the transmission rates $S_1$ to $S_a$ in a case where the transmission rate and the packet loss rate do not have the specified correlation in the fields of the packet loss rates corresponding to the correlation determination "x".

Accordingly, the first acceleration device 202 can specify whether the range of the transmission rates $S_{min}$ to $S_{max}$ which may become the upper limit of the vacant band is the range of the transmission rates $S_a$ to $S_k$ or the range of the transmission rates $S_{k-1}$ to $S_a$, and may store the specified range. In other words, the first acceleration device 202 can narrow the range of the transmission rates $S_{min}$ to $S_{max}$ which may become the upper limit of the vacant band to the range of the transmission rates $S_a$ to $S_k$ or the range of the transmission rates $S_{k-1}$ to $S_a$ from the range of the transmission rates $S_{k-1}$ to $S_k$.

Here, the first acceleration device 202 may specify any one transmission rate within the range of the transmission rates $S_{min}$ to $S_{max}$ which may become the upper limit of the vacant band, as the upper limit of the vacant band. For example, the first acceleration device 202 specifies the $S_{max}=S_k$, as the upper limit of the vacant band. Here, FIG. 20 will be described.

In FIG. 20, (20-1) the first acceleration device 202 determines whether or not to further narrow the range of the transmission rates $S_{min}$ to $S_{max}$ which may become the upper limit of the vacant band. For example, if the difference between $S_{min}$ and $S_{max}$ is equal to or greater than a threshold T, the first acceleration device 202 determines to further narrow the range of the transmission rates $S_{min}$ to $S_{max}$ which may become the upper limit of the vacant band. In a case where it is determined to further narrow the range, the first acceleration device 202 further narrows the range of the transmission rates $S_{min}$ to $S_{max}$, similarly to FIG. 19.

Meanwhile, if the difference between $S_{min}$ and $S_{max}$ is less than the threshold T, the first acceleration device 202 determines not to narrow the range of the transmission rates $S_{min}$ to $S_{max}$ which may become the upper limit of the vacant band.

(20-2) If it is determined not to narrow the range, the first acceleration device 202 specifies any one transmission rate within the range of the transmission rates $S_{min}$ to $S_{max}$ which may become the upper limit of the vacant band, as the upper limit of the vacant band. For example, the first acceleration device 202 specifies the $S_{max}=S_k$, as the upper limit of the vacant band.

As a result, the first acceleration device 202 can more accurately specify the upper limit of the vacant band of the network 210 in which the packet loss easily occurs and the reception rate is easily disturbed. Thus, the first acceleration device 202 can efficiently utilize the network 210.

Example of Specification Process Procedure According to Embodiment 2

Hereinafter, an example of a specification process procedure according to Embodiment 2 for specifying the upper limit of the vacant band of the network 210 will be described with reference to FIGS. 21 and 22.

Figure 21:
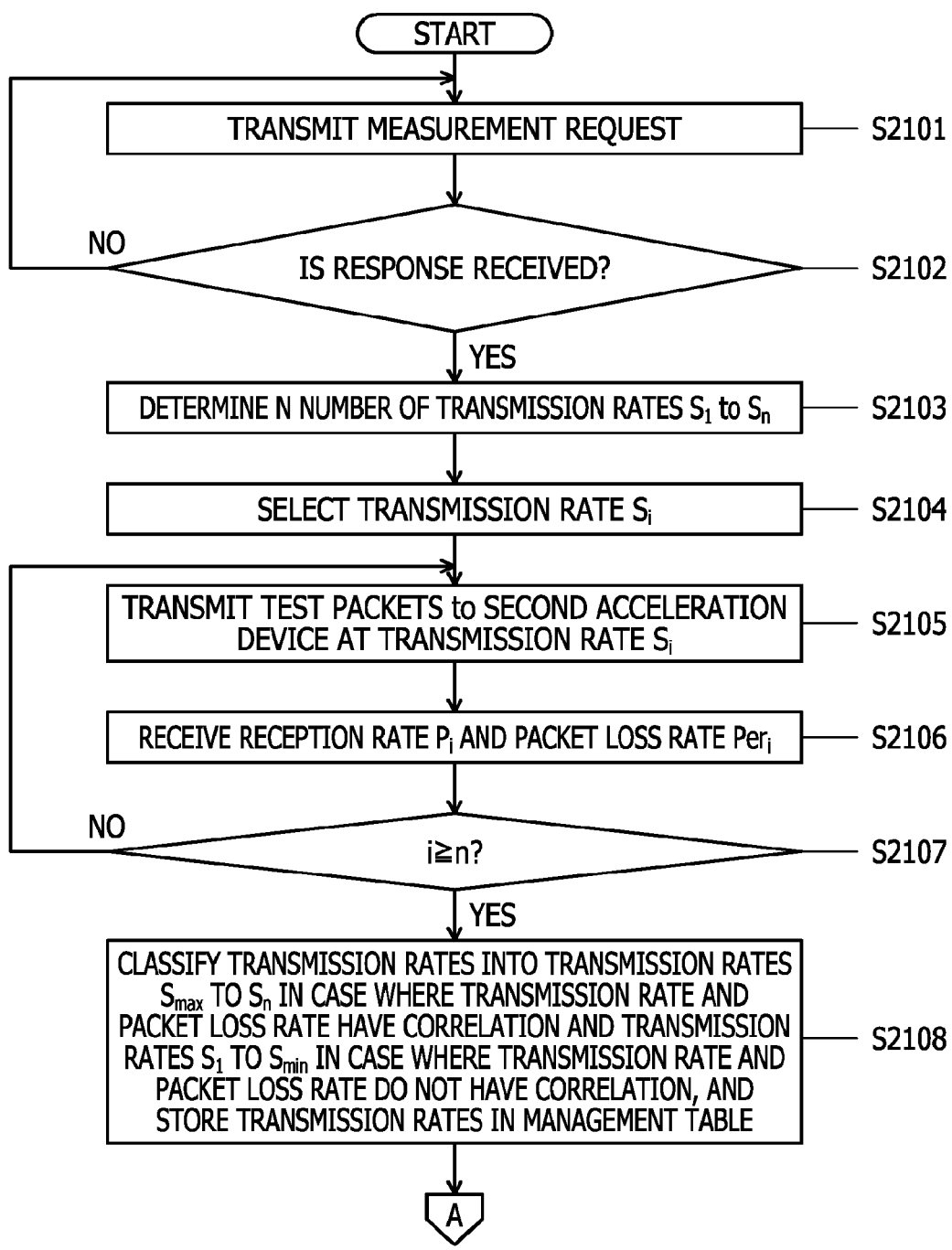
FIG. 21 is a (first) flowchart illustrating an example of a specification process procedure according to Embodiment 2.
Figure 22:
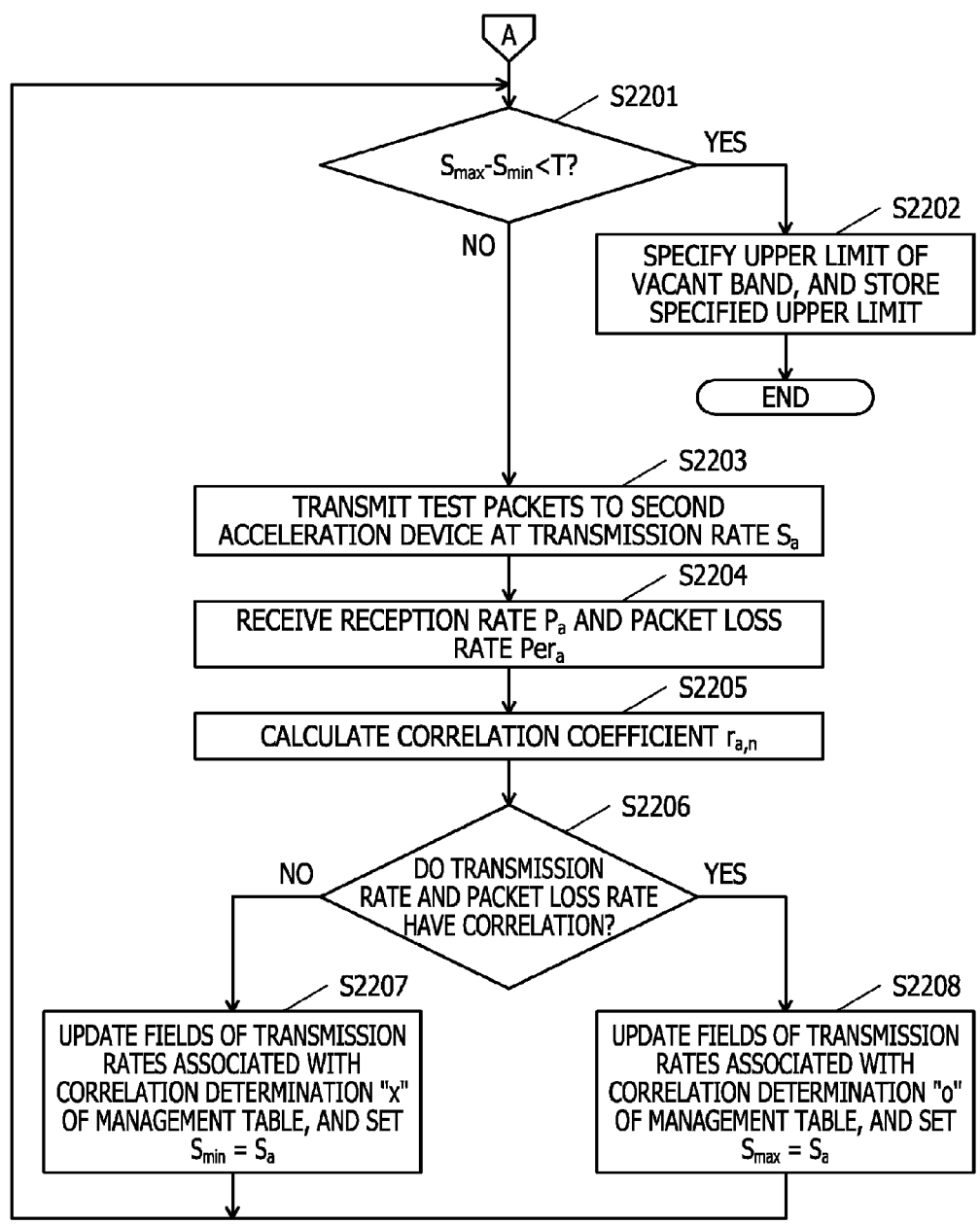
FIG. 22 is a (second) flowchart illustrating an example of the specification process procedure according to Embodiment 2.

FIGS. 21 and 22 are flowcharts illustrating examples of the specification process procedure according to Embodiment 2. In FIG. 21, the processes of steps S2101 to S2107 are the same as the processes of steps S1101 to S1107 illustrated in FIG. 11, and thus, the description thereof will be omitted. Here, the process of step S2108 will be described.

The first acceleration device 202 classifies the transmission rates $S_1$ to $S_n$, and stores the classified transmission rates in the management table 1600 (step S2108). Here, for example, the first acceleration device 202 classifies the transmission rates $S_1$ to $S_n$ into the transmission rates $S_{max}$ to $S_n$ in a case where the transmission rate and the packet loss rate have the correlation and the transmission rates $S_1$ to $S_{min}$ in a case where the transmission rate and the packet loss rate do not have the correlation. Thereafter, the first acceleration device 202 performs the process of step S2201 of FIG. 22.

In FIG. 22, the first acceleration device 202 determines whether or not $S_{max}-S_{min}<T$ is satisfied (step S2201). Here, in a case where $S_{max}-S_{min}<T$ is satisfied (step S2201: Yes), the first acceleration device 202 specifies the upper limit of the vacant band based on the management table 1600, and stores the specified upper limit (step S2202). The first acceleration device 202 ends the specification process.

Meanwhile, in a case where $S_{max}-S_{min}<T$ is not satisfied (step S2201: No), the first acceleration device 202 sets the transmission rate $S_a=(S_{min}\ S_{max})/2$, and transmits the test packets to the second acceleration device 204 at the transmission rate $S_a$ (step S2203). Subsequently, the first acceleration device 202 receives the reception rate $P_a$ and the packet loss rate $Per_a$ measured by the second acceleration device 204 from the second acceleration device 204 (step S2204). The first acceleration device 202 calculates the correlation coefficient $r_{a,n}$ between the transmission rate $S_a$ and the transmission rate $S_n$ (step S2205).

Subsequently, the first acceleration device 202 determines whether or not the correlation coefficient $r_{a,n}$ is equal to or greater than the threshold R, and the difference between the correlation coefficient $r_{a,n}$ and the correlation coefficient of the transmission rate in a case where the transmission rate and the packet loss rate have the correlation is less than threshold e and have the correlation (step S2206). Here, in a case where the transmission rate and the packet loss rate do not have the correlation (step S2206: No), the first acceleration device 202 updates the fields of the transmission rates associated with the correlation determination "x" of the management table 1600, and sets $S_{min}=S_a$ (step S2207). The first acceleration device 202 returns the process to step S2201.

Meanwhile, in a case where the transmission rate and the packet loss rate have the correlation (step S2206: Yes), the first acceleration device 202 updates the fields of the transmission rates associated with the correlation determination "o" of the management table 1600, and sets $S_{max}=S_a$ (step S2208). The first acceleration device 202 returns the process to step S2201. Accordingly, the first acceleration device 202 can accurately specify the upper limit of the vacant band.

Operation Example of Communication System 200 According to Embodiment 2

Hereinafter, an operation example of the communication system 200 according to Embodiment 2 will be described with reference to FIGS. 23 and 24.

Figure 23:
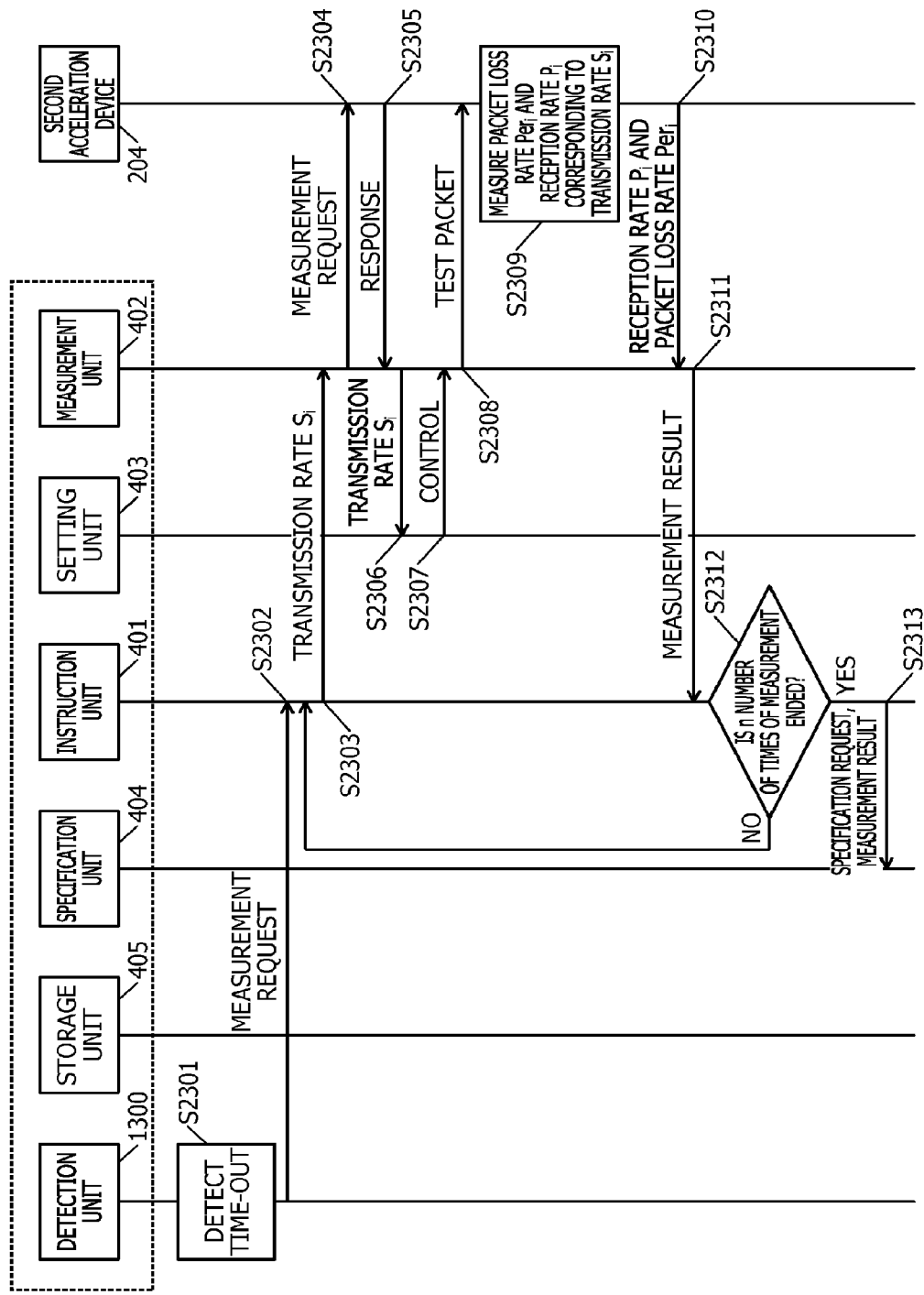
FIG. 23 is a (first) sequence diagram illustrating an operation example of the communication system according to Embodiment 2.
Figure 24:
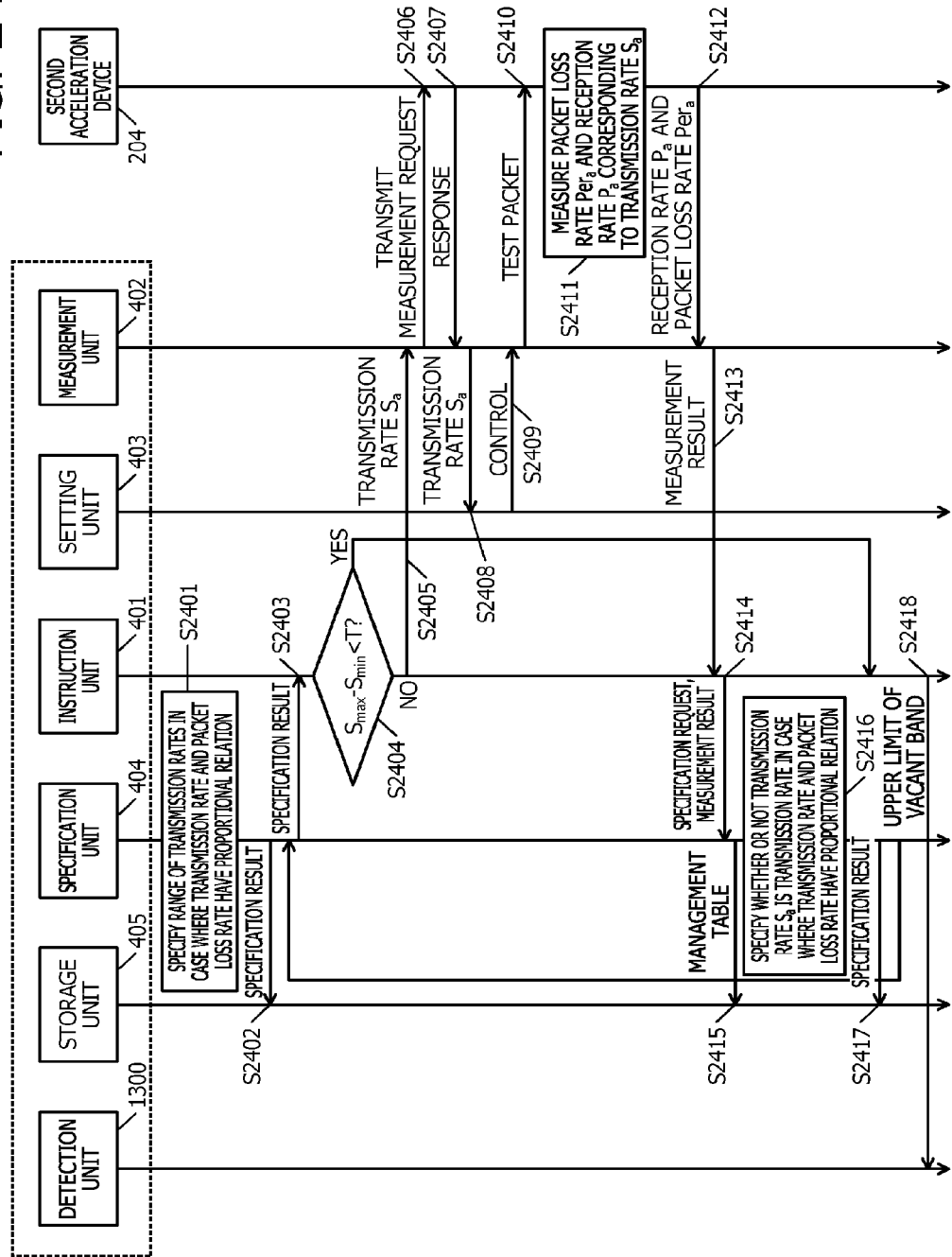
FIG. 24 is a (second) sequence diagram illustrating an operation example of the communication system according to Embodiment 2.

FIGS. 23 and 24 are sequence diagrams illustrating operation examples of the communication system 200 according to Embodiment 2. In FIG. 23, the processes of steps S2301 to S2312 are the same as the processes of steps S1301 to S1312 illustrated in FIG. 13, and thus, the description thereof will be omitted. Here, the process of step S2313 will be described.

The instruction unit 401 notifies the specification unit 404 of the specification request for the range of the transmission rates in a case where the transmission rate and the packet loss rate have the correlation and the measurement result (step S2313). Here, FIG. 24 will be described.

In FIG. 24, if the specification request and the measurement result are received, the specification unit 404 specifies the range of the transmission rates in a case where the transmission rate and the packet loss rate have the correlation (step S2401). The specification unit 404 notifies the storage unit 405 of the specification result, and updates the management table 1600 in the storage unit 405 (step S2402).

The specification unit 404 notifies the instruction unit 401 of the specification result (step S2403). If the specification result is received, the instruction unit 401 determines whether or not $S_{max}-S_{min}<T$ is satisfied (step S2404). Here, in a case where $S_{max}-S_{min}<T$ is satisfied (step S2404: Yes), the instruction unit 401 performs the process of step S2418.

Meanwhile, in a case where $S_{max}-S_{min}<T$ is not satisfied (step S2404: No), the instruction unit 401 notifies the measurement unit 402 of the transmission rate $S_a=(S_{min}+S_{max})/2$ (step S2405).

If the transmission rate $S_a$ is notified, the measurement unit 402 transmits the measurement request of the reception rate and the packet loss rate to the second acceleration device 204 (step S2406). Meanwhile, if the measurement request is received, the second acceleration device 204 transmits the response to the measurement unit 402 (step S2407).

If the response is received, the measurement unit 402 notifies the setting unit 403 of the transmission rates $S_a$ (step S2408). Subsequently, the measurement unit 402 accepts the control of the transmission rate $S_a$ performed by the setting unit 403 (step S2409). The measurement unit 402 transmits the test packets to the second acceleration device 204 at the transmission rate Sa under the control of the setting unit 403 (step S2410).

If the test packets are received, the second acceleration device 204 measures the reception rates $P_a$ and the packet loss rate $Per_a$ corresponding to the transmission rate $S_a$ (step S2411). The second acceleration device 204 transmits the reception rate $P_a$ and the packet loss rate $Per_a$ corresponding to the measured transmission rate $S_a$ to the measurement unit 402 (step S2412).

If the reception rate $P_a$ and the packet loss rate $Per_a$ corresponding to the transmission rate $S_a$ are received, the measurement unit 402 notifies the instruction unit 401 of the measurement result including the reception rate $P_a$ and the packet loss rate $Per_a$ (step S2413).

In a case where the measurement result is received, the instruction unit 401 notifies the specification unit 404 of a specification request for the range of the transmission rates in a case where the transmission rate and the packet loss rate have the correlation and the measurement result (step S2414).

If the specification request and the measurement result are received, the specification unit 404 refers to the management table 1600 stored in the storage unit 405 (step S2415). If the management table 1600 is referred to, the specification unit 404 specifies whether or not the transmission rate $S_a$ is the transmission rate in a case where the transmission rate and the packet loss rate have the correlation (step S2416). The specification unit 404 notifies the storage unit 405 of the specification result, and updates the management table 1600 in the storage unit 405 (step S2417). The specification unit 404 returns the process to step S2403.

In a case where $S_{max}-S_{min}<T$ is satisfied and the process of step S2418 is performed, the instruction unit 401 outputs the upper limit of the vacant band (step S2418). Accordingly, the first acceleration device 202 can accurately specify the upper limit of the vacant band.

Description of Embodiment 3

Hereinafter, Embodiment 3 will be described. In the following description, the same elements as those of Embodiment 1 or Embodiment 2 will be assigned the same reference signs as those of Embodiment 1 or Embodiment 2, and the redundant description thereof will be omitted in some cases.

Example of Communication System 200 According to Embodiment 3

Hereinafter, an example of the communication system 200 according to Embodiment 3 to which the vacant band specification device 100 illustrated in FIG. 1 is applied will be described with reference to FIG. 25.

Figure 25:
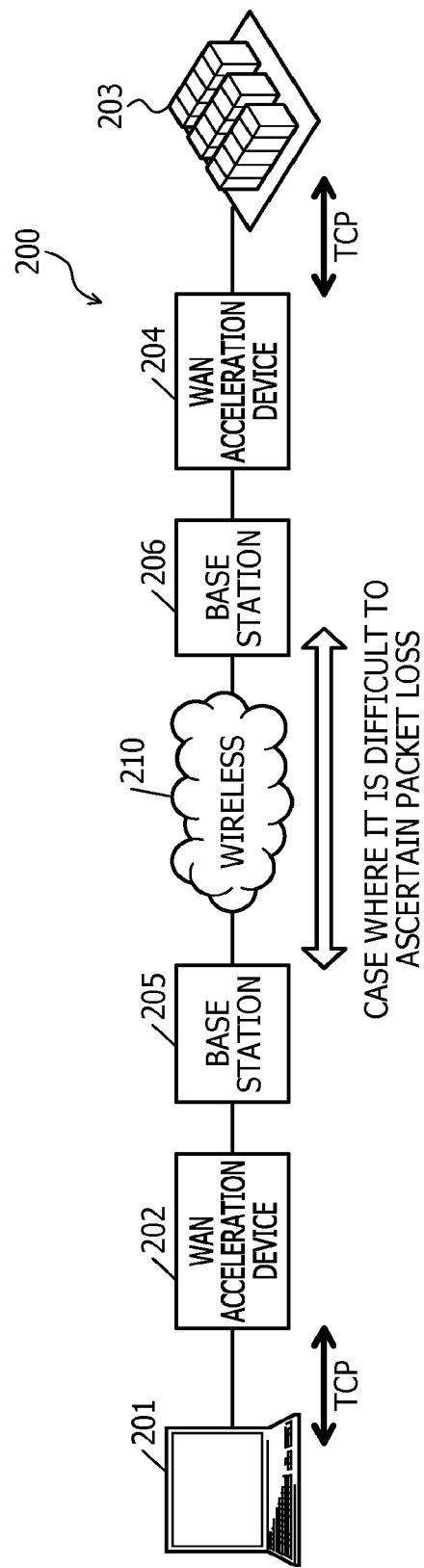
FIG. 25 is an explanatory diagram illustrating an example of a communication system according to Embodiment 3.

FIG. 25 is an explanatory diagram illustrating an example of the communication system 200 according to Embodiment 3. In FIG. 25, the communication system 200 includes the first calculation device 201, the first acceleration device 202, a first base station 205, the second calculation device 203, the second acceleration device 204, and a second base station 206. In the communication system 200, the first base station 205 and the second base station 206 are connected via a wireless network 210.

Here, similarly to FIG. 2, the first acceleration device 202 tends to be desired to specify the upper limit of the vacant band of the network 210. Thus, in the following description, a case where the first acceleration device 202 operates as the vacant band specification device 100 and specifies the upper limit of the vacant band of the network 210 will be described.

Here, a case where the first base station 205 or the second base station 206 have functions of Automatic Repeat reQuest (ARQ), or hybrid ARQ (HARQ) is considered. For example, in a case the packet loss occurs in the wireless network 210, the first base station 205 may retransmit the packets.

However, in this case, the second acceleration device 204 is difficult to detect that the packet loss occurs, and is difficult to accurately measure the packet loss rate. As a result, the first acceleration device 202 is difficult to use the packet loss rate as the index value indicating the amount of packet loss.

Meanwhile, in a case where the packet loss occurs and the first base station 205 retransmits the packets, a time taken for the packets transmitted from the first acceleration device 202 to be received by the second acceleration device 204 tends to be further increased than that in a case where the first base station does not retransmit the packets. As a result, a time taken for the second acceleration device 204 to transmit a response indicating that the packets are received to the first acceleration device 202 tends to be increased.

As stated above, as the packet loss is increased, the RTT which is a time taken for the second acceleration device 204 to transmit the response indicating that the packets are received to the first acceleration device 202 tends to be increased. In other words, the RU may become the index value indicating the amount of packet loss.

Thus, in Embodiment 3, the first acceleration device 202 uses the RU as the index value indicating the amount of packet loss, instead of the packet loss rate. Accordingly, the first acceleration device 202 can improve the accuracy in specifying the upper limit of the vacant band even though there is the wireless network 210.

In Embodiment 3, the first acceleration device 202 may use the proportional relation as in Embodiment 1 as the dependence relation between the transmission rate and the index value indicating the amount of packet loss, or may use the correlation as in Embodiment 2. In the following description, a case where the first acceleration device 202 uses the correlation as in Embodiment 2 as the dependence relation between the transmission rate and the index value indicating the amount of packet loss will be described.

(Functional Configuration Example of Vacant Band Specification Device 100)

Hereinafter, a functional configuration example of the vacant band specification device 100 according to Embodiment 3 will be described. Similarly to FIG. 4, the vacant band specification device 100 includes the instruction unit 401, the measurement unit 402, the setting unit 403, the specification unit 404, and the storage unit 405. The functional units are the same as those of FIG. 4, and thus, the description thereof will be described.

(Flow for Specifying Upper Limit of Vacant Band of Network 210)

Hereinafter, a flow for specifying the upper limit of the vacant band of the network 210 according to Embodiment 3 will be described with reference to FIGS. 26 and 27.

FIG. 26 is an explanatory diagram illustrating an example of the stored content of the management table 2600 according to Embodiment 3. For example, the management table 2600 is realized by the storage area such as the memory 302 or the disk 305 illustrated in FIG. 3. As illustrated in FIG. 26, the management table 2600 includes fields such as the transmission rate, the reception rate, the packet loss rate, the average RTT, and the correlation determination.

The correlation determination is a flag indicating whether or not the transmission rate, the reception rate, and the packet loss rate associated with the correlation determination are information in a case where the transmission rate and the packet loss rate have the proportional relation. For example, the correlation determination is "o" if the transmission rate and the packet loss rate have the correlation, and is "x" if the transmission rate and the packet loss rate do not have the correlation. The transmission rate is a transmission rate range in a case where the correlation is expressed by the correlation determination. The reception rate is a reception rate range in a case where the correlation is expressed by the correlation determination. The average RTT is an average RTT range in a case where the correlation is expressed by the correlation determination.

The management table 2600 may classify the transmission rates into a range of the transmission rates in a case where the transmission rate and the average RTT have the correlation and a range of the transmission rates in a case where the transmission rate and the average RTT do not have the correlation, and may manage the classified ranges. In other words, the management table 2600 may classify the transmission rates into a range of transmission rates which are equal to or greater than the upper limit of the vacant band and a range of transmission rates which are less than the upper limit of the vacant band, and may manage the classified ranges.

Figure 27:
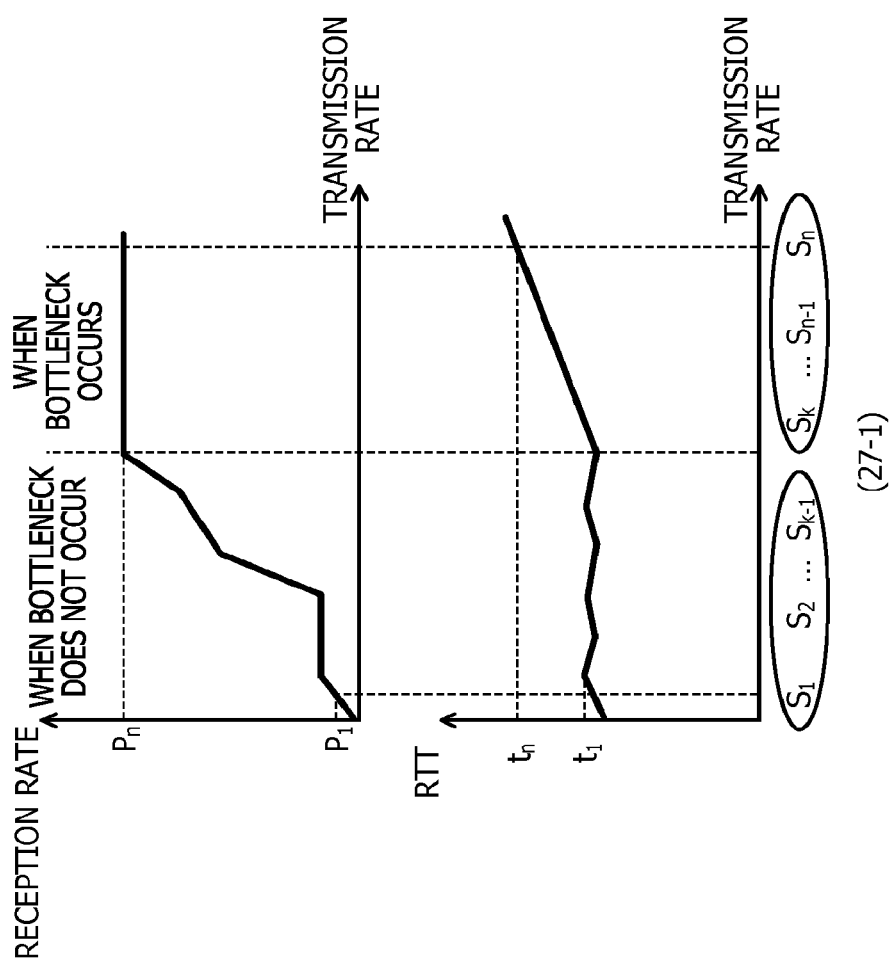
FIG. 27 is an explanatory diagram illustrating an example in which the upper limit of the vacant band according to Embodiment 3 is specified.

FIG. 27 is an explanatory diagram illustrating an example in which the upper limit of the vacant band according to Embodiment 3 is specified. In FIG. 27, (27-1) the first acceleration device 202 acquires the preset maximum transmission rate $S_n$ and minimum transmission rate $S_1$. Subsequently, the first acceleration device 202 divides the transmission rates between the maximum transmission rate $S_n$ and the minimum transmission rate 51, and calculates n number of transmission rates 51 to $S_n$.

As illustrated in FIG. 27, a case where the transmission rates $S_1$ to $S_{k-1}$ of n number of transmission rates $S_1$ to $S_n$ are equal to or less than the vacant band and the transmission rates $S_k$ to $S_n$ are equal to or greater than the vacant band will be described. In the following description, the first acceleration device 202 may classify n number of transmission rates $S_1$ to $S_n$ into the transmission rates $S_1$ to $S_{k-1}$ which are equal to or less than the vacant band and the transmission rates $S_k$ to $S_n$ which are equal to or greater than the vacant band.

The first acceleration device 202 transmits a measurement request of the reception rate to the second acceleration device 204. The first acceleration device 202 transmits the test packets to the second acceleration device 204 at n number of calculated transmission rates $S_1$ to $S_n$ after the measurement request is transmitted.

Meanwhile, if the test packets is received, the second acceleration device 204 transmits a response indicating that the test packets are received to the first acceleration device 202. If the response is received, the first acceleration device 202 calculates the RTT of the test packets, and calculates the average RTT of n number of transmission rates $S_1$ to $S_n$.

The second acceleration device 204 measures the reception rates $P_1$ to $P_n$ corresponding to the transmission rates $S_1$ to $S_n$, and transmits the measurement rates to the first acceleration device 202. The first acceleration device 202 receives the reception rates $P_1$ to $P_n$ corresponding to the transmission rates $S_1$ to $S_n$.

Here, the first acceleration device 202 specifies the transmission rate of the transmission rates $S_1$ to $S_n$, in a case where the transmission rate and the average RTT have the correlation based on the calculated average RTTs $t_1$ to $T_n$. In other words, the first acceleration device 202 may specify the transmission rates in a case where the transmission rate and the average RTT do not have the correlation.

The first acceleration device 202 substitutes the transmission rate $S_n$, the transmission rates $S_x$ to $S_n$, the average value $S_{avg}$ of the transmission rates $S_x$ to $S_n$, the average RTTs $t_x$ to $t_n$, and the average value $t_{avg}$ of the average RTTs $t_x$ to $t_n$ in the following expression (7) while sequentially changing the variable x to n−1, n−2, . . . , and 1. Accordingly, the first acceleration device 202 calculates the correlation coefficients $r_{x,n}$ of the transmission rates $S_x$ to $S_n$ for each of x=n−1, n−2, . . . , and 1.

$$r_{x,n} = \frac{\sum_{i=x}^{n}(S_i - S_{avg}) - \sum_{i=x}^{n}(t_i - t_{avg})}{\sqrt{\sum_{i=x}^{n}(S_i - S_{avg})^2} \sqrt{\sum_{i=x}^{n}(t_i - t_{avg})^2}} \quad (7)$$

Here, when the variable x is sequentially changed to n−1, n−2, . . . , and 1, since the transmission rate in which the transmission rate and the average RTT have the correlation is within a section "upper limit of vacant band to $S_n$," for a period during which the transmission rate $S_x$ is equal to or greater than the upper limit of the vacant band, the correlation coefficient $r_{x,n}$ tends to have a fixed value or to be comparatively great. When the transmission rate $S_x$ is less than the upper limit of the vacant band, the correlation coefficient $r_{x,n}$ tends to be changed.

Thus, the first acceleration device 202 specifies the transmission rates $S_k$ to $S_n$ until the correlation coefficient $r_{x,n}$ has a fixed value and the correlation coefficient $r_{x,n}$ is changed, based on the correlation coefficient $r_{x,n}$. The first acceleration device 202 sets the specified transmission rates $S_k$ to $S_n$ as the transmission rate in which the transmission rate and the average RTT have the correlation. Meanwhile, the first acceleration device 202 specifies the remaining transmission rates $S_1$ to $S_{k-1}$, as the transmission rates in a case where the transmission rate and the average RTT do not have the correlation.

The first acceleration device 202 may substitute the transmission rates $S_1$ to $S_x$, the average value $S_{avg}$ of the transmission rates $S_1$ to $S_x$, the average RTTs $t_1$ to $t_x$, and an average value $t_{avg}$ of the average RTTs $t_1$ to $t_x$ in the following expression (8) while sequentially changing the variable x to 2, 3, . . . , and n. Accordingly, the first acceleration device 202 calculates the correlation coefficient $r_{1,x}$ between the transmission rate $S_x$ and the transmission rate $S_1$ for each of x=2, 3, . . . , and n.

$$r_{1,x} = \frac{\sum_{i=1}^{x}(S_i - S_{avg}) - \sum_{i=1}^{x}(t_i - t_{avg})}{\sqrt{\sum_{i=1}^{x}(S_i - S_{avg})^2} \sqrt{\sum_{i=1}^{x}(t_i - t_{avg})^2}} \quad (8)$$

Here, when the variable x is sequentially changed to 2, 3, . . . , and n, since the transmission rate in which the transmission rate and the average RTT do not have the correlation is within a section of "$S_1$ to upper limit of vacant band" for a period during which the transmission rate $S_x$ is less than the upper limit of the vacant band, there are many average RTT having no regularity, and the correlation coefficient $r_{1,x}$ tends to be decreased. When the transmission rate $S_x$ is greater than the upper limit of the vacant band, the correlation coefficient $r_{1,x}$ tends to be comparatively greatly changed.

Thus, the first acceleration device 202 specifies the transmission rates $S_1$ to $S_{k-1}$ until the correlation coefficient $r_{1,x}$ is decreased and the correlation coefficient $r_{1,x}$ is comparatively greatly changed, based on the correlation coefficient $r_{1,x}$. The first acceleration device 202 sets the specified transmission rates $S_1$ to $S_{k-1}$ as the transmission rate in which the transmission rate and the average RTT do not have the correlation. Meanwhile, the first acceleration device 202 specifies the remaining transmission rates $S_k$ to $S_n$, as the transmission rates in a case where the transmission rate and the average RTT have the correlation.

(27-2) The first acceleration device 202 stores the specified result in the management table 2600. For example, the first acceleration device 202 sets the transmission rates $S_k$ to $S_n$ in a case where the transmission rate and the packet loss rate have the specified correlation in the fields of the transmission rates corresponding to the correlation determination "o".

For example, the first acceleration device 202 sets the reception rates $P_k$ to $P_n$ corresponding to the transmission rates $S_k$ to $S_n$ in a case where the transmission rate and the packet loss rate have the specified correlation in the fields of the reception rates corresponding to the correlation determination "o". For example, the first acceleration device 202 sets the average RTTs $t_k$ to $t_n$ corresponding to the transmission rates $S_k$ to $S_n$ in a case where the transmission rate and the packet loss rate have the specified correlation in the fields of the average RTTs rates corresponding to the correlation determination "o".

Meanwhile, for example, the first acceleration device 202 sets the transmission rates $S_1$ to $S_{k-1}$ in a case where the transmission rate and the packet loss rate have the specified correlation in the fields of the transmission rates corresponding to the correlation determination "x".

For example, the first acceleration device 202 sets the reception rates $P_1$ to $P_{k-1}$ corresponding to the transmission rates $S_1$ to $S_{k-1}$ in a case where the transmission rate and the packet loss rate have the specified correlation in the fields of the reception rates corresponding to the correlation determination "x". For example, the first acceleration device 202 sets the average RTTs $t_1$ to $t_{k-1}$ corresponding to the transmission rates $S_1$ to $S_{k-1}$ in a case where the transmission rate and the packet loss rate have the specified correlation in the fields of the average RTTs corresponding to the correlation determination "x".

Accordingly, the first acceleration device 202 can manage the transmission rates $S_k$ to $S_n$ which are equal to or greater than the upper limit of the vacant band and the transmission rates $S_1$ to $S_{k-1}$ which are less than the upper limit of the vacant band. In other words, the first acceleration device 202 can store the range of the transmission rates $S_{k-1}$ to $S_k$, as the range of the transmission rates $S_{min}$ to $S_{max}$ which may become the upper limit of the vacant band.

Here, the first acceleration device 202 may specify any one transmission rate within the range of the transmission rates $S_{min}$ to $S_{max}$ which may become the upper limit of the vacant band, as the upper limit of the vacant band. For example, the first acceleration device 202 specifies the $S_{max}=S_k$, as the upper limit of the vacant band. For example, the first acceleration device 202 may specify $(S_{min} S_{max})/2$, the upper limit of the vacant band.

As a result, the first acceleration device 202 can accurately specify the upper limit of the vacant band of the network 210 in which the packet loss easily occurs and the reception rate is easily disturbed. The first acceleration device 202 can accurately specify the upper limit of the vacant band even though the change in the slope of the graph of the transmission rate and the index value indicating the amount of packet loss is comparatively small immediately after the transmission rate exceeds the upper limit of the vacant band.

The first acceleration device 202 may further narrow the range of the transmission rates $S_{min}$ to $S_{max}$ which may become the upper limit of the vacant band, and may further improve the accuracy in specifying the upper limit of the vacant band. An example in which the upper limit of the vacant band is accurately specified is the same as that of FIGS. 19 and 20, and the description thereof will be omitted.

Example of Specification Process Procedure According to Embodiment 3

Hereinafter, an example of a specification process procedure according to Embodiment 3 for specifying the upper limit of the vacant band of the network 210 will be described with reference to FIGS. 28 and 29.

Figure 28:
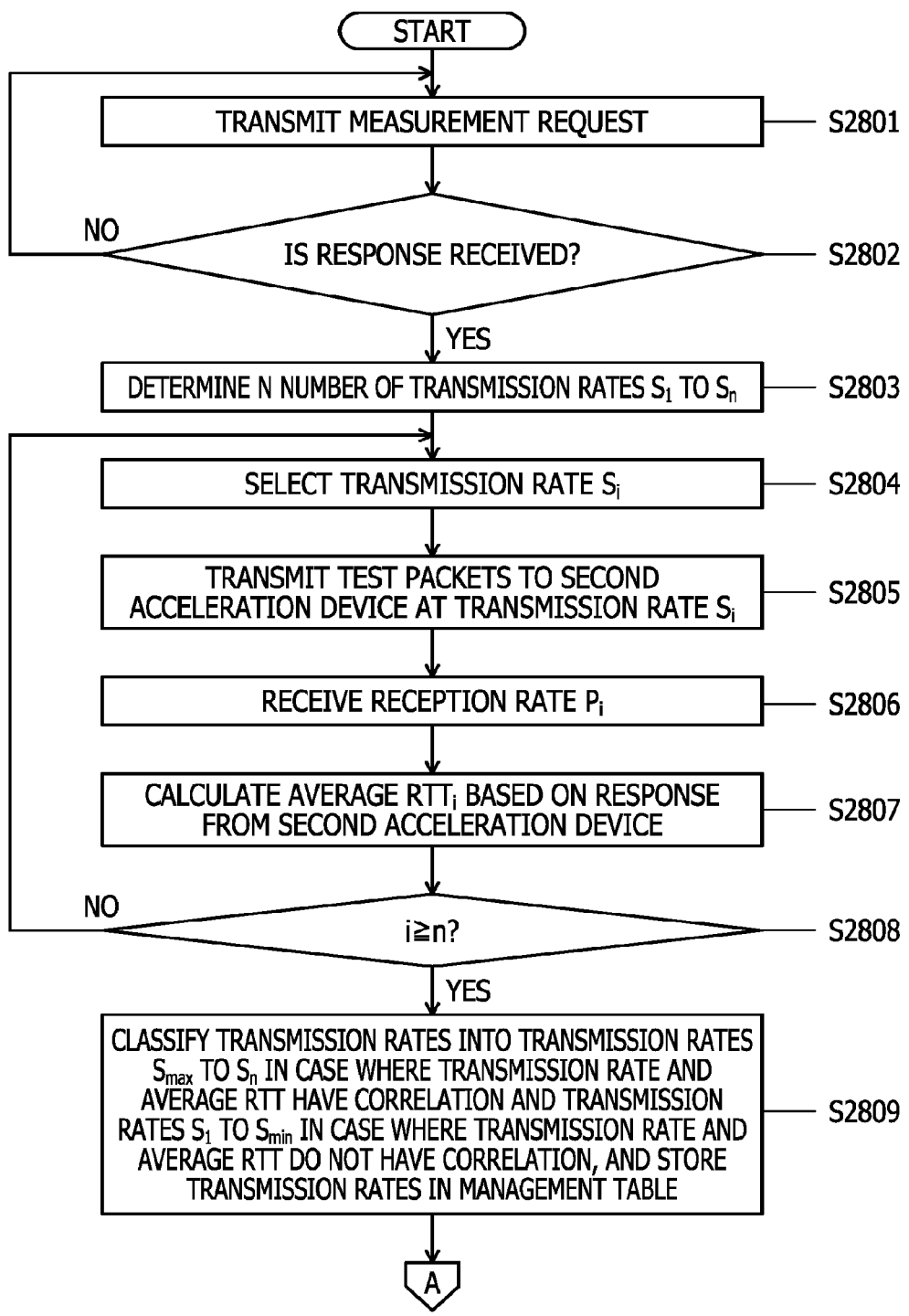
FIG. 28 is a (first) flowchart illustrating an example of a specification process procedure according to Embodiment 3.
Figure 29:
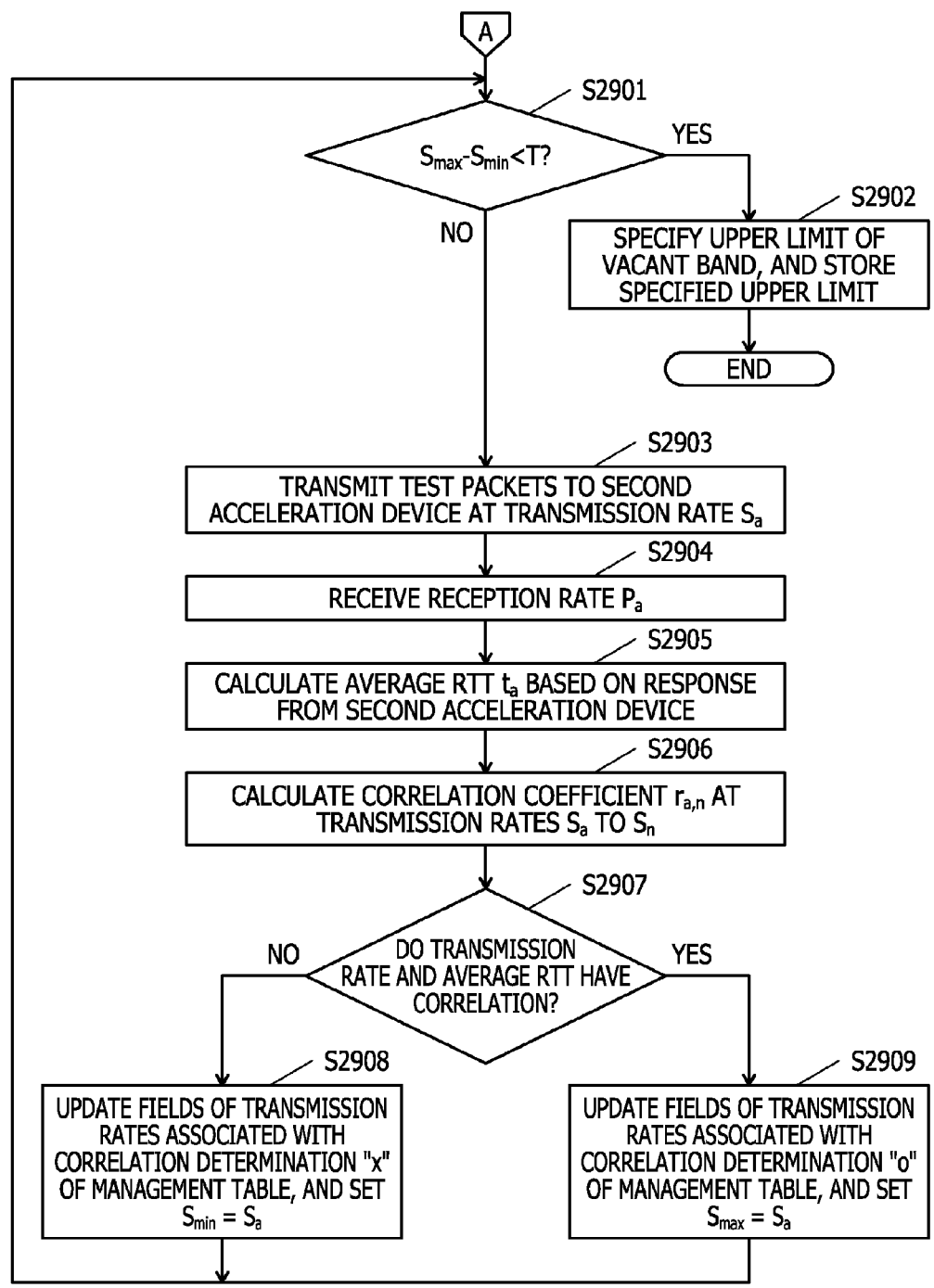
FIG. 29 is a (second) flowchart illustrating an example of the specification process procedure according to Embodiment 3.

FIGS. 28 and 29 are flowcharts illustrating examples of the specification process procedure according to Embodiment 3. In FIG. 28, the first acceleration device 202 transmits a measurement request of the reception rate to the second acceleration device 204 (step S2801). Subsequently, the first acceleration device 202 determines whether or not the response is received from the second acceleration device 204 (step S2802). Here, in a case where the response is not received (step S2802: No), the first acceleration device 202 returns the process to step S2801.

Meanwhile, in a case where the response is received (step S2802: Yes), the first acceleration device 202 determines n number of transmission rates $S_1$ to $S_n$ used when the test packets are transmitted based on the preset maximum transmission rate and minimum transmission rate (step S2803).

Subsequently, the first acceleration device 202 increments a variable i, and selects a transmission rate $S_i$ from the transmission rate $S_1$ to $S_n$ (step S2804). An initial value of the variable i is 0. The first acceleration device 202 transmits the test packets to the second acceleration device 204 at the selected transmission rate $S_i$ (step S2805).

Subsequently, the first acceleration device 202 receives the reception rate $P_i$ measured by the second acceleration device 204 from the second acceleration device 204 (step S2806). The first acceleration device 202 calculates an average $RTT_i$ corresponding to the transmission rate $S_1$ based on the response which indicates that the test packets are received and is received from the second acceleration device 204 (step S2807).

The first acceleration device 202 determines whether or not i≥n is satisfied (step S2808). Here, in a case where i≥n is not satisfied (step S2808: No), the first acceleration device 202 returns the process to step S2804.

Meanwhile, in a case where i≥n is satisfied (step S2808: Yes), the first acceleration device 202 classifies the transmission rates $S_1$ to $S_n$, and stores the classified transmission rates in the management table 2600 (step S2809). Here, for example, the first acceleration device 202 classifies the transmission rates $S_1$ to $S_n$ into the transmission rates $S_{max}$ to $S_n$ in a case where the transmission rate and the average RTT have the correlation and the transmission rates $S_1$ to $S_{min}$ in a case where the transmission rate and the packet loss rate do not have the correlation. Thereafter, the first acceleration device 202 performs the process of step S2901 of FIG. 29.

In FIG. 29, the first acceleration device 202 determines whether or not $S_{max}-S_{min}<T$ is satisfied (step S2901). Here, in a case where $S_{max}-S_{min}<T$ is satisfied (step S2901: Yes), the first acceleration device 202 specifies the upper limit of the vacant band based on the management table 2600, and stores the specified upper limit (step S2902). The first acceleration device 202 ends the specification process.

Meanwhile, in a case where $S_{max}-S_{min}<T$ is not satisfied (step S2901: No), the first acceleration device 202 sets the transmission rate $S_a=(S_{min} S_{max})/2$, and transmits the test packets to the second acceleration device 204 at the transmission rate $S_a$ (step S2903). Subsequently, the first acceleration device 202 receives the reception rate $P_a$ measured by the second acceleration device 204 from the second acceleration device 204 (step S2904).

The first acceleration device 202 calculates an average RTT $t_a$ corresponding to the transmission rate $S_a$ based on the response which indicates that the test packets are received and is received from the second acceleration device 204 (step S2905). The first acceleration device 202 calculates the correlation coefficient $r_{a,n}$ between the transmission rates $S_a$ to $S_n$ (step S2906).

Subsequently, the first acceleration device 202 determines whether or not the correlation coefficient $r_{a,n}$ is equal to or greater than the threshold R, and the difference between the correlation coefficient $r_{a,n}$ and the correlation coefficient of the transmission rate in a case where the transmission rate and the packet loss rate have the correlation is less than threshold e and have the correlation (step S2907). Here, in a case where the transmission rate and the packet loss rate do not have the correlation (step S2907: No), the first acceleration device 202 updates the fields of the transmission rates associated with the correlation determination "x" of the management table 2600, and sets $S_{min}=S_a$ (step S2908). The first acceleration device 202 returns the process to step S2901.

Meanwhile, in a case where the transmission rate and the packet loss rate have the correlation (step S2907: Yes), the first acceleration device 202 updates the fields of the transmission rates associated with the correlation determination "o" of the management table 2600, and sets $S_{max}=S_a$ (step S2909). The first acceleration device 202 returns the process to step S2901. Accordingly, the first acceleration device 202 can accurately specify the upper limit of the vacant band.

Operation Example of Communication System 200 According to Embodiment 3

Hereinafter, an operation example of the communication system 200 according to Embodiment 3 will be described with reference to FIGS. 30 and 31.

Figure 30:
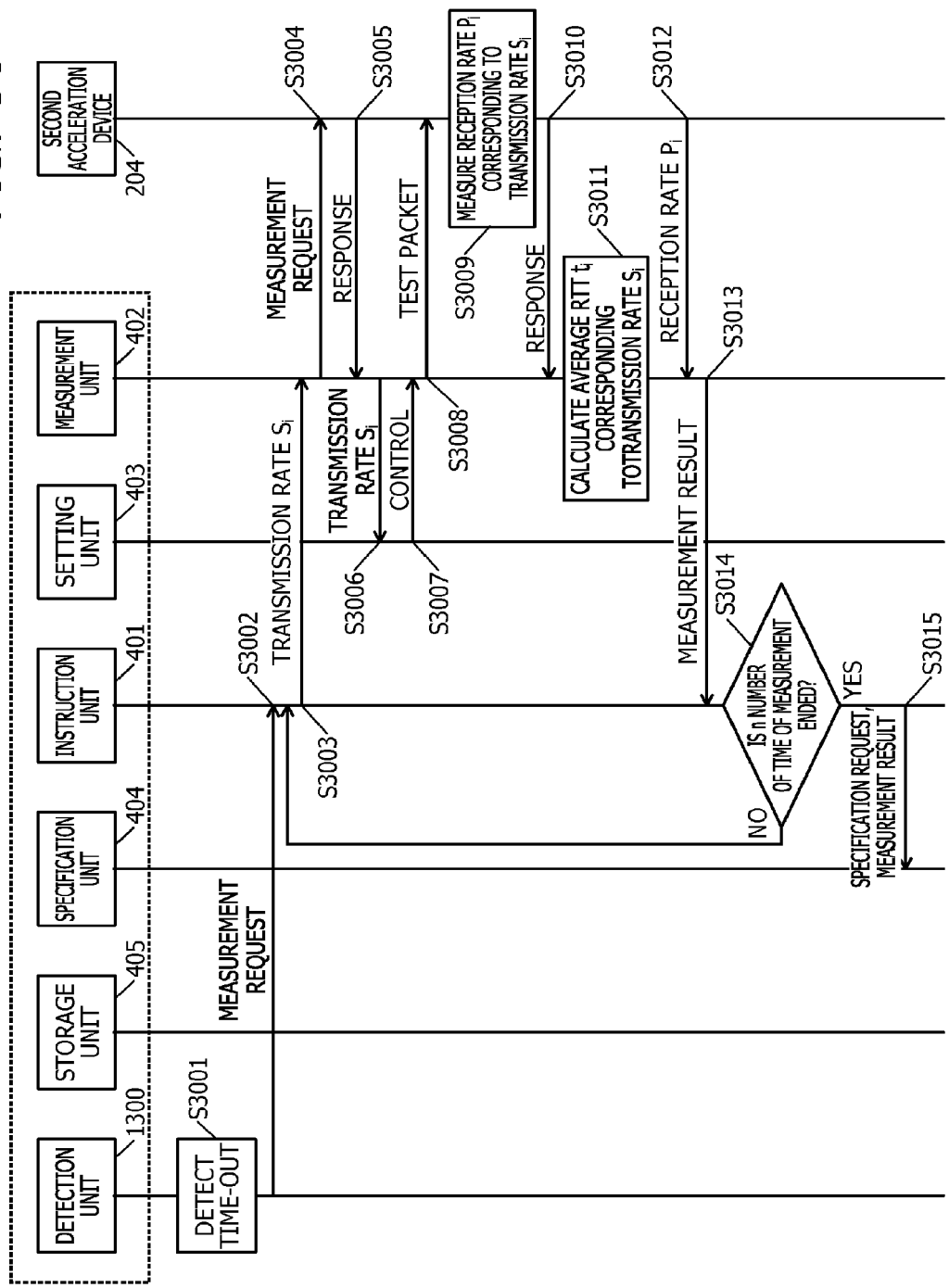
FIG. 30 is a (first) sequence diagram illustrating an operation example of the communication system according to Embodiment 3.
Figure 31:
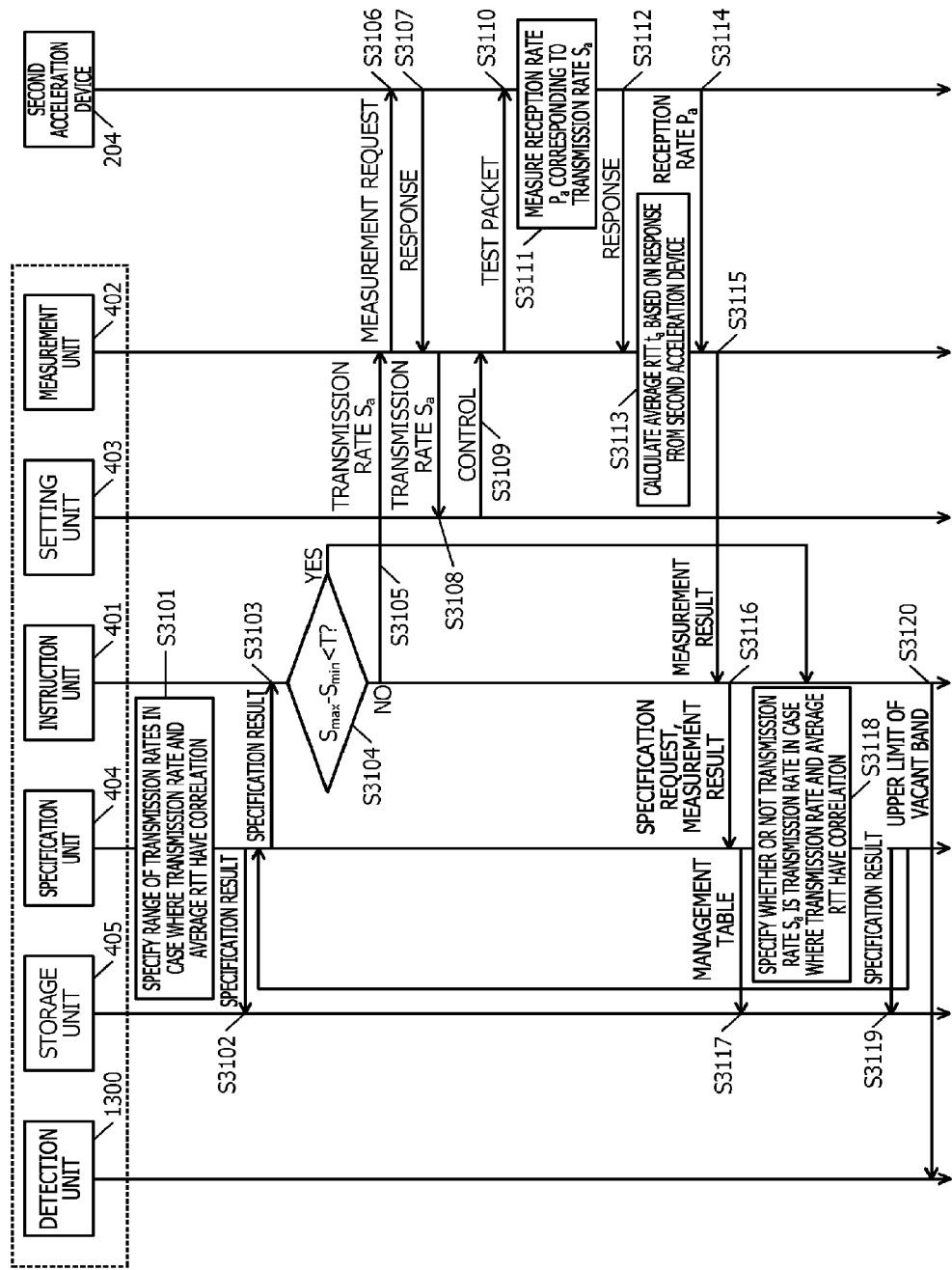
FIG. 31 is a (second) sequence diagram illustrating an operation example of the communication system according to Embodiment 3.

FIGS. 30 and 31 are sequence diagrams illustrating operation examples of the communication system 200 according to Embodiment 3. In FIG. 30, the detection unit 1300 of the first acceleration device 202 detects that the communication with the second acceleration device 204 is time out (step S3001).

If the time-out is detected, the detection unit 1300 inputs the measurement request to the instruction unit 401 (step S3002). If the measurement request is received, the instruction unit 401 determines n number of transmission rates $S_1$ to $S_n$, and notifies the measurement unit 402 of the transmission rate Si of the transmission rates $S_1$ to $S_n$ (step S3003).

If the transmission rate $S_i$ is notified, the measurement unit 402 transmits the measurement request of the reception rate to the second acceleration device 204 (step S3004). Meanwhile, if the measurement request is received, the second acceleration device 204 transmits the response to the measurement unit 402 (step S3005).

If the response is received, the measurement unit 402 notifies the setting unit 403 of the transmission rates $S_i$ (step S3006). Subsequently, the measurement unit 402 accepts the control of the transmission rate $S_i$ performed by the setting unit 403 (step S3007). The measurement unit 402 transmits the test packets to the second acceleration device 204 at the transmission rate $S_i$ under the control of the setting unit 403 (step S3008).

If the test packets are received, the second acceleration device 204 measures the reception rate $P_i$ corresponding to the transmission rate $S_i$ (step S3009). The second acceleration device 204 transmits the response indicating that the test packets are received to the measurement unit 402 (step S3010). The measurement unit 402 calculates an average RTT t corresponding to the transmission rate Si based on the response which indicates that the test packets are received and is received from the second acceleration device 204 (step S3011).

The second acceleration device 204 transmits the reception rate $P_i$ corresponding to the measured transmission rate $S_i$ to the measurement unit 402 (step S3012). If the reception rate $P_i$ corresponding to the transmission rate $S_i$ is received and the average $RTT_i$ is calculated, the measurement unit 402 notifies the instruction unit 401 the measurement result including the average $RTT_i$ and the reception rate $P_i$ corresponding to the transmission rates $S_i$ (step S3013).

If the measurement result is received, the instruction unit 401 determines whether or not n number of times of the measurement is ended by using the transmission rates $S_1$ to $S_n$ (step S3014). Here, in a case where n number of times of the measurement is not ended (step S3014: No), the instruction unit 401 returns the process to step S3003.

Meanwhile, in a case where n number of times of the measurement is ended (step S3014: Yes), the instruction unit 401 notifies the specification unit 404 of a specification request for the range of the transmission rates in a case where the transmission rate and the average RTT have the correlation and the measurement result (step S3015). Here, FIG. 31 will be described.

In FIG. 31, if the specification request and the measurement result are received, the specification unit 404 specifies the range of the transmission rates in a case where the transmission rate and the average RTT have the correlation (step S3101). The specification unit 404 notifies the storage unit 405 of the specification result, and updates the management table 2600 in the storage unit 405 (step S3102).

The specification unit 404 notifies the instruction unit 401 of the specification result (step S3103). If the specification result is received, the instruction unit 401 determines whether or not $S_{max}-S_{min}<T$ is satisfied (step S3104). Here, in a case where $S_{max}-S_{min}<T$ is satisfied (step S3104: Yes), the instruction unit 401 performs the process of step S3120.

Meanwhile, in a case where $S_{max}-S_{mm}<T$ is not satisfied (step S3104: No), the instruction unit 401 notifies the measurement unit 402 of the transmission rate $S_a=(S_{min} S_{max})/2$ (step S3105).

If the transmission rate $S_a$ is notified, the measurement unit 402 transmits the measurement request of the reception rate to the second acceleration device 204 (step S3106). Meanwhile, if the measurement request is received, the second acceleration device 204 transmits the response to the measurement unit 402 (step S3107).

If the response is received, the measurement unit 402 notifies the setting unit 403 of the transmission rates $S_a$ (step S3108). Subsequently, the measurement unit 402 accepts the control of the transmission rate $S_a$ performed by the setting unit 403 (step S3109). The measurement unit 402 transmits the test packets to the second acceleration device 204 at the transmission rate $S_a$ under the control of the setting unit 403 (step S3110).

If the test packets are received, the second acceleration device 204 measures the reception rates $P_a$ corresponding to the transmission rate $S_a$ (step S3111). The second acceleration device 204 transmits the response indicating that the test packets are received to the measurement unit 402 (step S3112). The measurement unit 402 calculates an average RTT $t_a$ corresponding to the transmission rate $S_a$ based on the response which indicates that the test packets are received and is received from the second acceleration device 204 (step S3113).

The second acceleration device 204 transmits the reception rate $P_a$ corresponding to the measured transmission rate $S_a$ to the measurement unit 402 (step S3114). If the reception rate $P_a$ corresponding to the transmission rate $S_a$ is received and the average RTT $t_a$ is calculated, the measurement unit 402 notifies the instruction unit 401 of the measurement result including the average RTT $t_a$ and the reception rate $P_a$ corresponding to the transmission rate $S_a$ (step S3115).

In a case where the measurement result is received, the instruction unit 401 notifies the specification unit 404 of a specification request for the range of the transmission rates in a case where the transmission rate and the average RTT have the correlation and the measurement result (step S3116).

If the specification request and the measurement result are received, the specification unit 404 refers to the management table 2600 stored in the storage unit 405 (step S3117). If the management table 2600 is referred to, the specification unit 404 specifies whether or not the transmission rate $S_a$ is the transmission rate in a case where the transmission rate and the average RTT have the correlation (step S3118). The specification unit 404 notifies the storage unit 405 of the specification result, and updates the management table 2600 in the storage unit 405 (step S3119). The specification unit 404 returns the process to step S3103.

In a case where $S_{max}-S_{min}<T$ is satisfied and the process of step S3120 is performed, the instruction unit 401 outputs the upper limit of the vacant band (step S3120). Accordingly, the first acceleration device 202 can accurately specify the upper limit of the vacant band.

Description of Embodiment 4

Hereinafter, Embodiment 4 will be described. In the following description, the same elements as those of Embodiments 1 to 3 will be assigned the same reference signs as those of Embodiments 1 to 3, and the redundant description thereof will be omitted in some cases.

Example of Communication System 200 According to Embodiment 4

Hereinafter, an example of the communication system 200 according to Embodiment 4 to which the vacant band specification device 100 illustrated in FIG. 1 is applied will be described with reference to FIG. 32.

Figure 32:
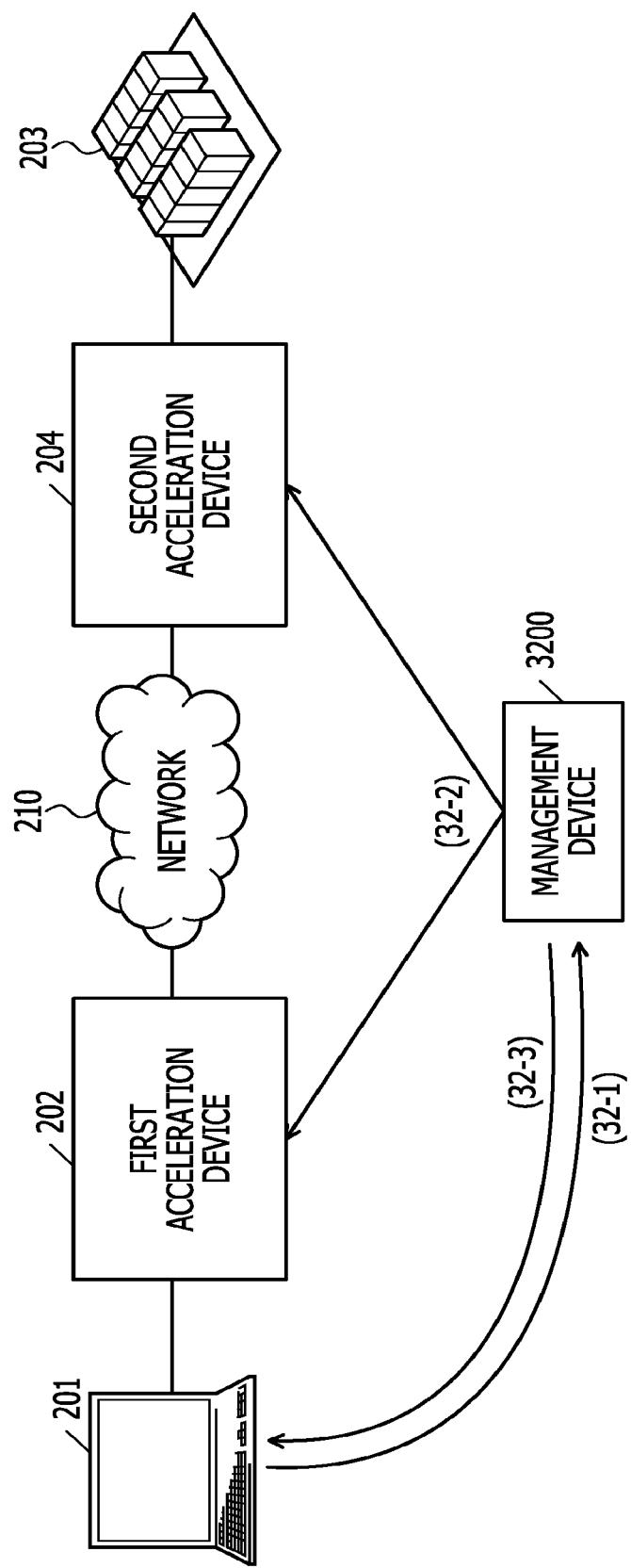
FIG. 32 is an explanatory diagram illustrating an example of a communication system according to Embodiment 4.

FIG. 32 is an explanatory diagram illustrating an example of the communication system 200 according to Embodiment 4. In FIG. 32, the communication system 200 includes the first calculation device 201, the first acceleration device 202, the second calculation device 203, the second acceleration device 204, and the management device 3200. In the communication system 200, the first acceleration device 202 and the second acceleration device 204 are connected via the wireless network 210.

Here, similarly to FIG. 2, the first acceleration device 202 tends to be desired to specify the upper limit of the vacant band of the network 210. Thus, in the following description, a case where the first acceleration device 202 operates as the vacant band specification device 100 and specifies the upper limit of the vacant band of the network 210 will be described.

In Embodiment 4, the first acceleration device 202 specifies the upper limit of the vacant band under the control of the management device 3200. In FIG. 32, (32-1) the first calculation device 201 transmits an inquiry about channel quality to the management device 3200.

(32-2) If the inquiry about the channel quality is received, the management device 3200 transmits the measurement request including the maximum transmission rate, the minimum transmission rate, and information for specifying the second acceleration device 204 to the first acceleration device 202. The management device 3200 transmits the measurement request to the second acceleration device 204. The management device 3200 causes the first acceleration device 202 to specify the upper limit of the vacant band, and receives the upper limit of the vacant band from the first acceleration device 202.

(32-3) The management device 3200 transmits the upper limit of the vacant band to the first calculation device 201.

(Functional Configuration Example of Vacant Band Specification Device 100)

Hereinafter, a functional configuration example of the vacant band specification device 100 according to Embodiment 4 will be described. Similarly to FIG. 4, the vacant band specification device 100 includes the instruction unit 401, the measurement unit 402, the setting unit 403, the specification unit 404, and the storage unit 405. The functional units are the same as those of FIG. 4, and thus, the description thereof will be described.

(Flow for Specifying Upper Limit of Vacant Band of Network 210)

Hereinafter, a flow for specifying the upper limit of the vacant band of the network 210 according to Embodiment 4 will be described.

Example of Specification Process Procedure According to Embodiment 4

Hereinafter, an example of a specification process procedure according to Embodiment 4 for specifying the upper limit of the vacant band of the network 210 will be described with reference to FIGS. 33 and 34.

Figure 33:
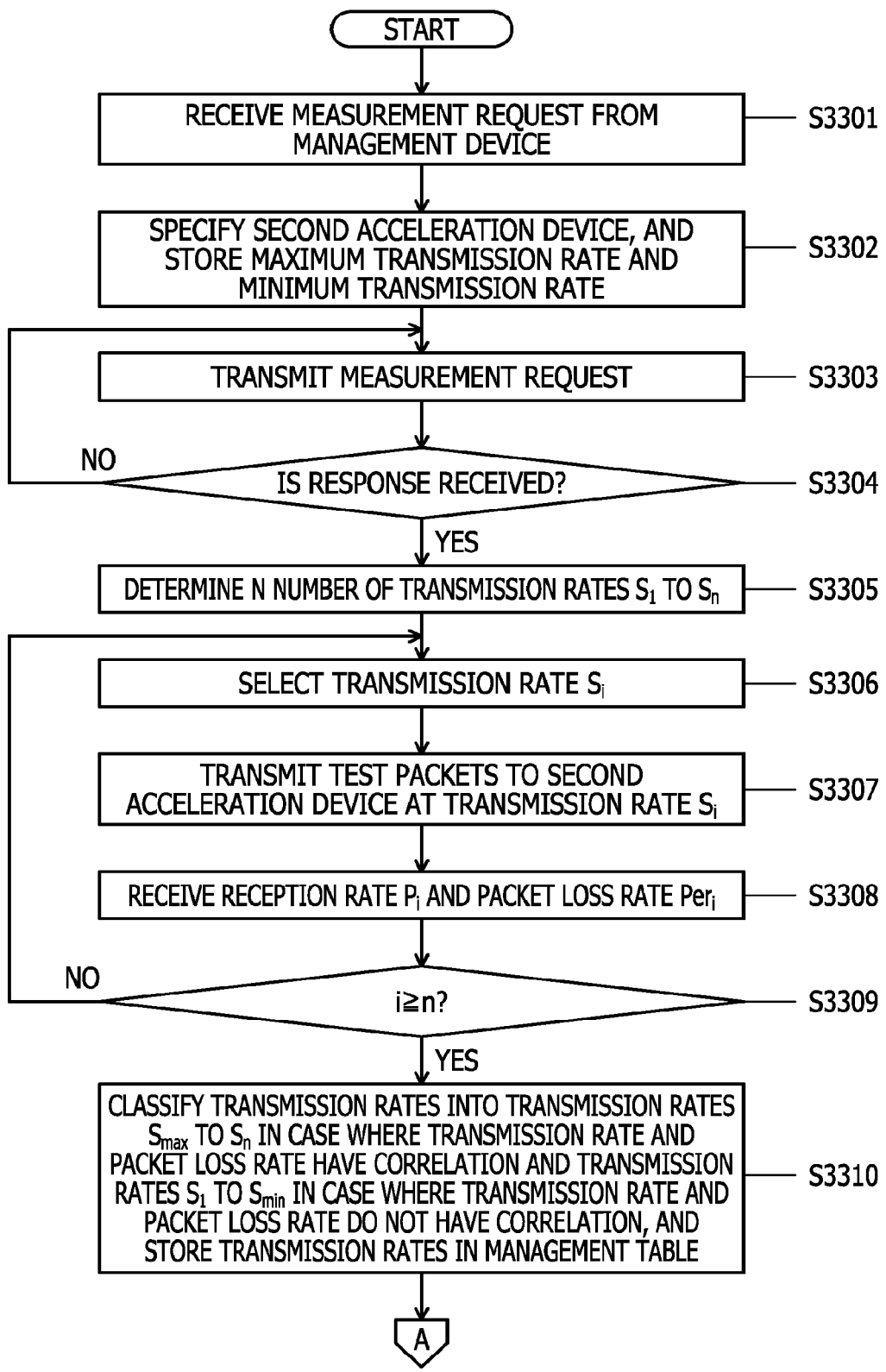
FIG. 33 is a (first) flowchart illustrating an example of a specification process procedure according to Embodiment 4.
Figure 34:
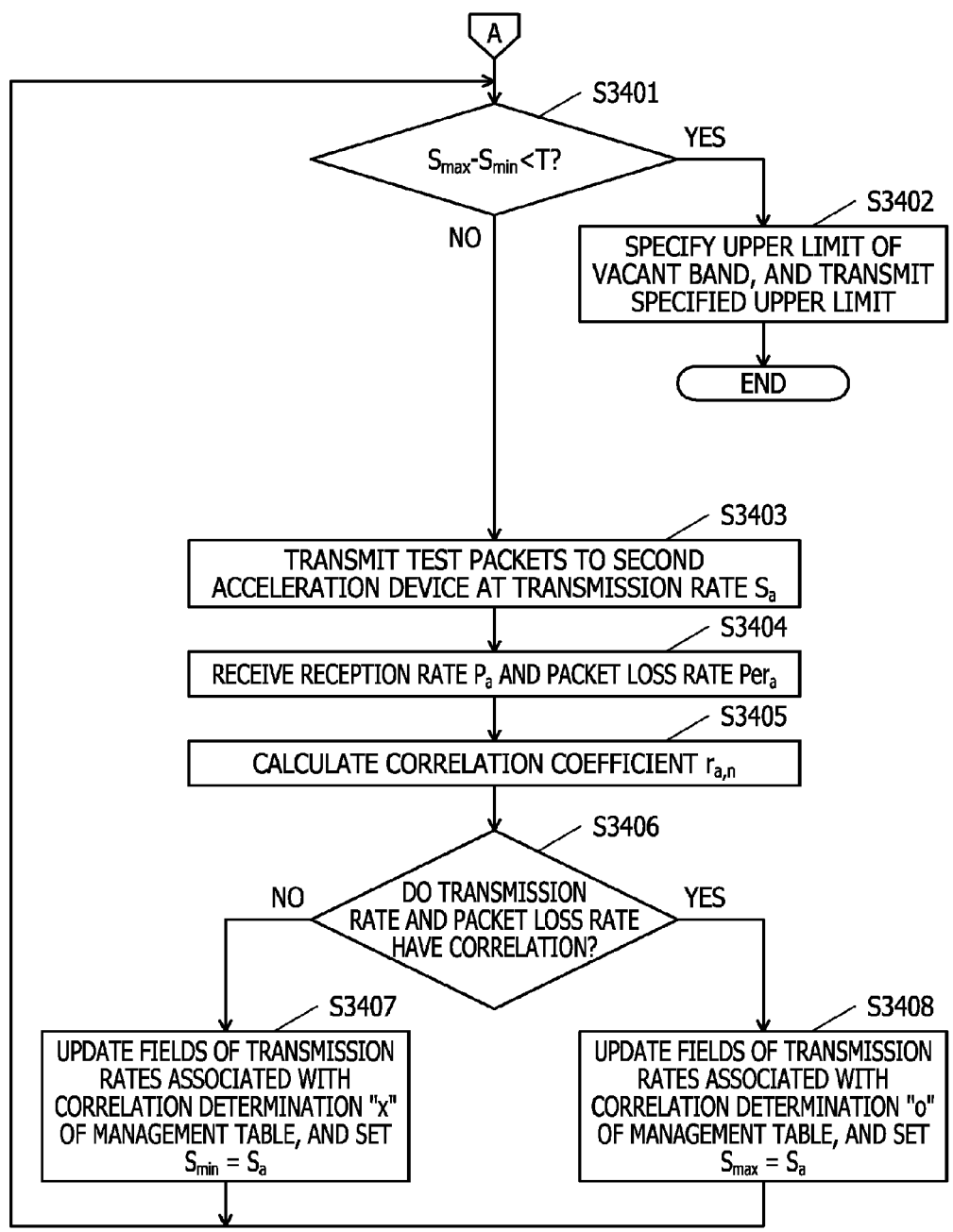
FIG. 34 is a (second) flowchart illustrating an example of the specification process procedure according to Embodiment 4.

FIGS. 33 and 34 are flowcharts illustrating examples of the specification process procedure according to Embodiment 4. In FIG. 33, the first acceleration device 202 receives the measurement request including the maximum transmission rate, the minimum transmission rate, and the information for specifying the second acceleration device 204 from the management device 3200 that receives the inquiry about the channel quality from the first calculation device 201 (step S3301).

Subsequently, the first acceleration device 202 specifies the second acceleration device 204 and stores the maximum transmission rate and the minimum transmission rate, based on the received measurement request (step S3302). Here, the processes of steps S3303 to S3310 are the same as the processes of steps S2101 to S2108 illustrated in FIG. 21, and thus, the description thereof will be omitted. Thereafter, the first acceleration device 202 performs the process of step S3401 of FIG. 34.

In FIG. 34, the processes of steps S3401 to S3408 are the same as the processes of steps S2201 to S2208 illustrated in FIG. 22, and thus, the description thereof will be omitted. Accordingly, the first acceleration device 202 can accurately specify the upper limit of the vacant band.

Operation Example of Communication System 200 According to Embodiment 4

Hereinafter, an operation example of the communication system 200 according to Embodiment 4 will be described with reference to FIGS. 35 and 36.

Figure 35:
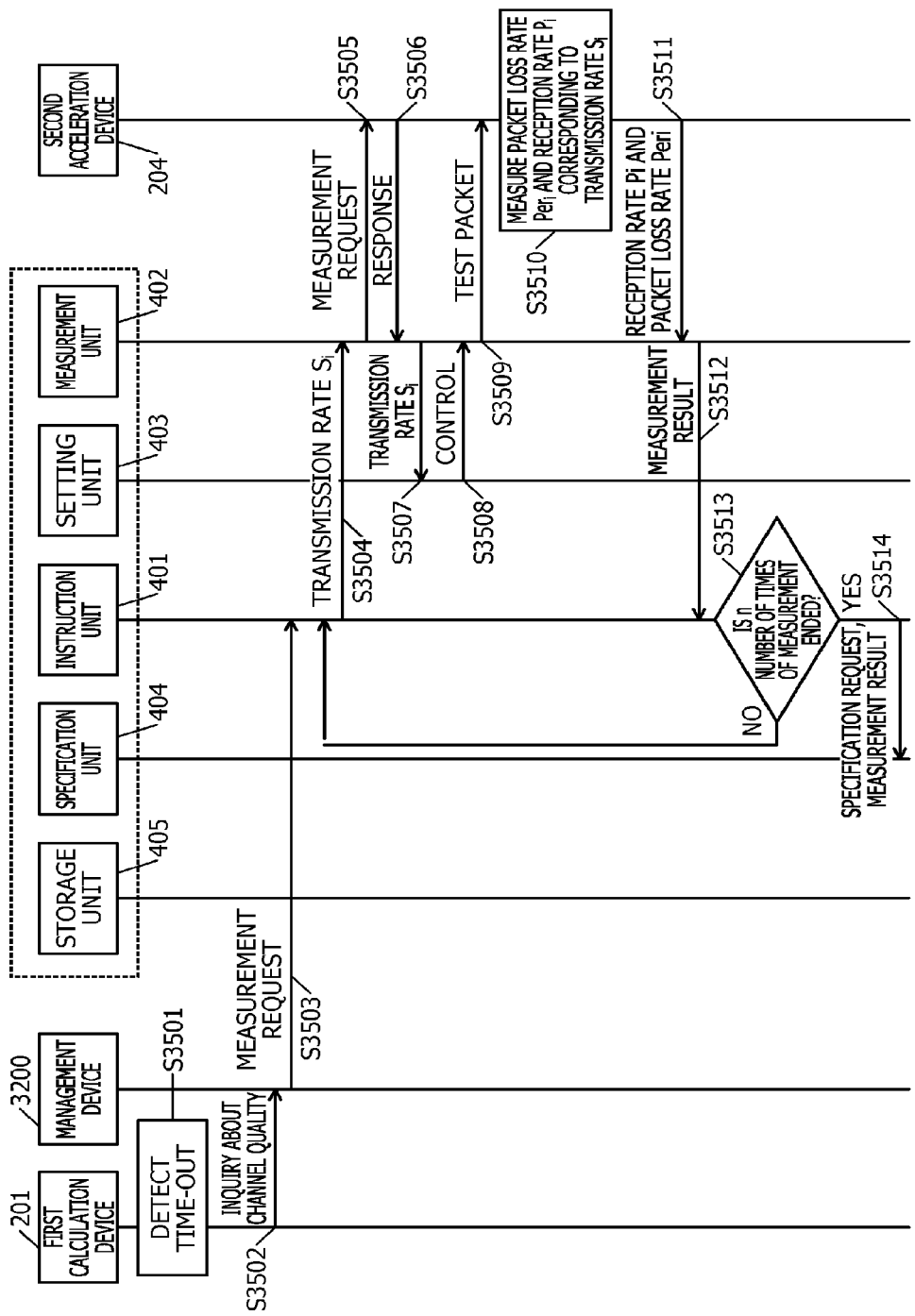
FIG. 35 is a (first) sequence diagram illustrating an operation example of the communication system according to Embodiment 4.
Figure 36:
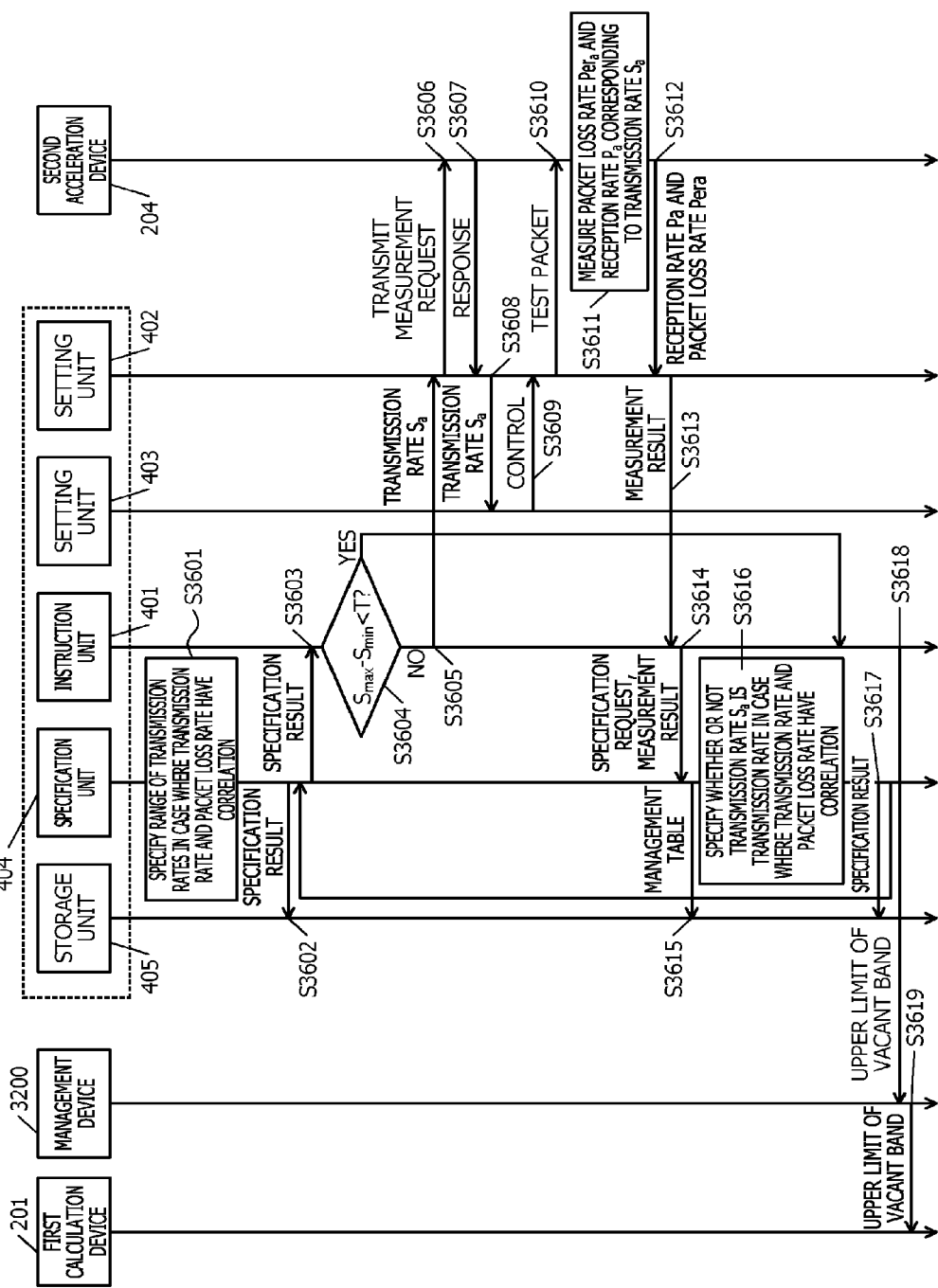
FIG. 36 is a (second) sequence diagram illustrating an operation example of the communication system according to Embodiment 4.

FIGS. 35 and 36 are sequence diagrams illustrating operation examples of the communication system 200 according to Embodiment 4. In FIG. 35, the first calculation device 201 detects that the communication of the second calculation device 203 is time out (step S3501).

If the time-out is detected, the first calculation device 201 transmits an inquiry about channel quality to the management device 3200 (step S3502). If the inquiry about the channel quality is received, the management device 3200 transmits the measurement request including the maximum transmission rate, the minimum transmission rate, and the information for specifying the second acceleration device 204 to the instruction unit 401 (step S3503). Here, the processes of steps S3504 to S3514 are the same as the processes of steps S2304 to S2313 illustrated in FIG. 23, and thus, the description thereof will be omitted. Hereinafter, FIG. 36 will be described.

In FIG. 36, the processes of steps S3601 to S3617 are the same as the processes of steps S2401 to S2417 illustrated in FIG. 24, and thus, the description thereof will be omitted. Here, the process of steps S3618 and S3619 will be described.

In a case where $S_{max}-S_{min}<T$ is satisfied and the process of step S3618 is performed, the instruction unit 401 transmits the upper limit of the vacant band to the management device 3200 (step S3618). If the upper limit of the vacant band is received, the management device 3200 transmits the upper limit of the vacant band to the first calculation device 201 (step S3619). Accordingly, the first acceleration device 202 can accurately specify the upper limit of the vacant band.

As described in the respective embodiments, according to the vacant band specification device 100, it is possible to acquire the index value indicating the amount of packet loss for each transmission rate by transmitting the packets from the first device 130 to the second device 140 at each of the plurality of transmission rates. According to the vacant band specification device 100, it is possible to specify the transmission rate, among the plurality of transmission rates, in a case where the transmission rate and the index value indicating the amount of packet loss have the dependence relation based on the index value for each transmission rate. According to the vacant band specification device 100, it is possible to specify the upper limit of the vacant band between the first device 130 and the second device 140 based on the specified result.

Accordingly, the vacant band specification device 100 can specify the range of the values which may become the upper limit of the vacant band. The vacant band specification device 100 can improve the accuracy in specifying the upper limit of the vacant band even though the packet loss easily occurs and it is difficult to ascertain the relationship between the transmission rate and the reception rate in magnitude.

According to the vacant band specification device 100, it is possible to transmit the packets from the first device 130 to the second device 140 at another transmission rate which is less than the transmission rate in a case where the transmission rate and the index value have the dependence relation and is greater than the transmission rate in a case where the transmission rate and the index value do not have the dependence relation. According to the vacant band specification device 100, it is possible to acquire the index value indicating the amount of packet loss at another transmission rate, and it is possible to specify whether or not another transmission rate is the transmission rate in a case where the transmission rate and the packet loss rate have the dependence relation based on the index value at another transmission rate.

Accordingly, the vacant band specification device 100 can further narrow the range of the values which may become the upper limit of the vacant band. The vacant band specification device 100 can specify the upper limit of the vacant band from the narrowed range, and can improve the accuracy in specifying the upper limit of the vacant band.

According to the vacant band specification device 100, it is possible to acquire the reception rate corresponding to the transmission rate when the packets are transmitted whenever the packets are transmitted. According to the vacant band specification device 100, it is possible to transmit the packets from the first device 130 to the second device 140 while gradually increasing the transmission rate from the minimum transmission rate by the predetermined amount until the ratio of the increase in the reception rate to the increase in the transmission rate is equal to or less than the predetermined value. Accordingly, the vacant band specification device 100 can reduce the number of times the packets are transmitted.

According to the vacant band specification device 100, it is possible to transmit the packets from the first device 130 to the second device 140 while gradually decreasing the transmission rate from the maximum transmission rate by the predetermined amount until the ratio of the decrease in the reception rate to the decrease in the transmission rate is equal to or greater than the predetermined value. Accordingly, the vacant band specification device 100 can reduce the number of times the packets are transmitted.

According to the vacant band specification device 100, it is possible to acquire the reception rate for each transmission rate. According to the vacant band specification device 100, it is possible to specify the transmission rate in a case where the transmission rate and the packet loss rate have the dependence relation based on the index value of the index values of the respective transmission rates in a case where the ratio of the increase in the reception rate to the increase in the transmission rate is equal to or less than the predetermined value. Accordingly, the vacant band specification device 100 can reduce the number of index values used when the transmission rate in a case where the transmission rate and the packet loss rate have the dependence relation is specified, and can reduce the number of processes.

According to the vacant band specification device 100, it is possible to use the proportional relation in which the index value indicating the amount of packet loss becomes great as the transmission rate becomes great, as the dependence relation. Accordingly, the vacant band specification device 100 can improve the accuracy in specifying the upper limit of the vacant band in the network in which the transmission rate and the index value have the proportional relation.

According to the vacant band specification device 100, the relation in which the correlation coefficient between the transmission rate and the index value indicating the amount of packet loss is equal to or greater than the threshold can be used as the dependence relation. Accordingly, the vacant band specification device 100 can improve the accuracy in specifying the upper limit of the vacant band even in the network in which the transmission rate and the index value do not have the proportional relation.

According to the vacant band specification device 100, it is possible to acquire the index value indicating a value indicating a percentage of packets which are not received by the second device 140 with respect to the packets transmitted from the first device 130 to the second device 140. Accordingly, the vacant band specification device 100 can use the index value on which the amount of packet loss is comparatively accurately reflected, and can improve the accuracy in specifying the upper limit of the vacant band.

According to the vacant band specification device 100, it is possible to acquire the index value indicating the time from which the packets are transmitted from the first device 130 to when the response which corresponds to the packets transmitted from the first device 130 and is received from the second device 140 is received. Accordingly, the vacant band specification device 100 can improve the accuracy in specifying the upper limit of the vacant band even in the network including the radio section. The vacant band specification device 100 can cause the second device 140 not to perform the process of measuring the packet loss rate.

According to the vacant band specification device 100, it is possible to reduce the components having the predetermined frequency or more for the index value for each transmission rate, and it is possible to calculate another index value for each transmission rate. According to the vacant band specification device 100, it is possible to specify the transmission rate, among the plurality of transmission rates, in a case where the transmission rate and the index value have the dependence relation based on another index value for each transmission rate. Accordingly, in a case where the index value indicating the amount of packet loss is fluctuated due to a randomly occurred factor, the vacant band specification device 100 can change the index value to an index value of which the fluctuation is suppressed, and can improve the accuracy in specifying the upper limit of the vacant band.

Although it has been described in the embodiment that the vacant band specification device 100 uses the packet loss rate or the RTT as the index value, the disclosure is not limited thereto. For example, the vacant band specification device 100 may specify the upper limit of the vacant band by using the packet loss rate as the index value, and may specify the upper limit of the vacant band by using the RTT as the index value. The vacant band specification device 100 may statistically specify the upper limit of the vacant band from the specified upper limits of the vacant band.

The vacant band specification method described in the present embodiment may be realized by causing a computer such as a personal computer or a workstation to execute a previously prepared program. The present vacant band specification program is recorded in a computer-readable recording medium such as a hard disk, a flexible disk, a CD-ROM, a MO, or a DVD, and is executed by the computer by being read from the recording medium. The present vacant band specification program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control device comprising:
a memory; and
a processor coupled to the memory and the processor configured to:
transmit packets from the communication control device to a network device at each of a plurality of transmission rates,
acquire a plurality of index values respectively indicating amounts of packet loss at the plurality of transmission rates, the plurality of index values being determined based on the transmitted packets at each of the plurality of transmission rates,
specify a first transmission rate from among the plurality of transmission rates, the plurality of index values and the plurality of transmission rates higher than the first transmission rate having a dependence in that the plurality of index values increase as the plurality of transmission rates higher than the first transmission rate increase, and
specify an upper limit of a vacant band between the communication control device and the network device based on the first transmission rate.

2. The communication control device according to claim 1, wherein the processor is further configured to:
transmit packets from the communication control device to the network device at a second transmission rate that is less than the first transmission rate and is greater than a third transmission rate on which a corresponding index value of the plurality of index values has no dependence,
acquire index values indicating amounts of packet loss at the second transmission rate, and
determine whether an index value, indicating amounts of packet loss at the second transmission rate, has a dependence on the second transmission rate.

3. The communication control device according to claim 1, wherein
the processor is further configured to acquire reception rates corresponding to the plurality of transmission rates, and
the packets are transmitted from the communication control device to the network device while gradually increasing a transmission rate from a minimum transmission rate of the plurality of transmission rates by a predetermined amount until at least a ratio of an increase in reception rate to an increase in transmission rate is equal to or less than a predetermined value, or while gradually decreasing a transmission rate from a maximum transmission rate of the plurality of transmission rates by a predetermined amount until at least a ratio of a decrease in reception rate to a decrease in transmission rate is equal to or greater than a predetermined value.

4. The communication control device according to claim 1, wherein
the processor is further configured to acquire reception rates corresponding to the plurality of transmission rates, and
the first transmission rate is specified based on an index value, among the plurality of the index values, in a case where a ratio of an increase in reception rate to an increase in transmission rate is equal to or less than a predetermined value.

5. The communication control device according to claim 1, wherein
the first transmission rate is included in a range in which an index value, corresponding to the plurality of index values, monotonically increases depending on increase in a transmission rate corresponding to the plurality of transmission rates.

6. The communication control device according to claim 1, wherein
the first transmission rate is included in a range in which correlation coefficients between the plurality of transmission rates and the plurality of index values are fixed greater than a predetermined value.

7. The communication control device according to claim 1, wherein
each of the plurality of index values indicates a percentage of packets, among the packets transmitted from the communication control device to the network device, which are not received by the network device.

8. The communication control device according to claim 1, wherein
each of the plurality of index values indicates a time from when the packets are transmitted from the communication control device to when a response from the network device, which responds to the packets transmitted from the communication control device, is received.

9. The communication control device according to claim 1, wherein
the first transmission rate is specified based on an index value determined by removing components having a predetermined frequency or more frequency from the plurality of index values for the plurality of transmission rates.

10. A communication control method comprising:
transmitting packets from a communication control device to a network device at each of a plurality of transmission rates;
acquiring a plurality of index values respectively indicating amounts of packet loss at the plurality of transmission rates, the plurality of index values being determined based on the transmitted packets at each of the plurality of transmission rates;
specifying by the communication control device, a first transmission rate from among the plurality of transmission rates, the plurality of index values and the plurality of transmission rates higher than the first transmission rate having a dependence in that the plurality of index values increase as the plurality of transmission rates higher than the first transmission rate increase; and
specifying an upper limit of a vacant band between the communication control device and the network device based on the first transmission rate.

11. A non-transitory computer readable storage medium that stores an detection program that causes a communication control device to execute a process comprising:
transmitting packets from a communication control device to a network device at each of a plurality of transmission rates;
acquiring a plurality of index values respectively indicating amounts of packet loss at the plurality of transmission rates, the plurality of index values being determined based on the transmitted packets at each of the plurality of transmission rates;
specifying by the communication control device, a first transmission rate from among the plurality of transmission rates, the plurality of index values and the plurality of transmission rates higher than the first transmission rate having a dependence in that the plurality of index values increase as the plurality of transmission rates higher than the first transmission rate increase; and
specifying an upper limit of a vacant band between the communication control device and the network device based on the first transmission rate.

* * * * *